GENERAL PURPOSE DIGITAL COMPUTER

Filed Oct. 1, 1965 14 Sheets-Sheet 1

INVENTOR.
STANLEY P. FRANKEL
BY Smyth, Roston & Pavitt
ATTORNEYS.

GENERAL PURPOSE DIGITAL COMPUTER

Filed Oct. 1, 1965 14 Sheets-Sheet 2

INVENTOR.
STANLEY P. FRANKEL
BY Smyth, Roston & Pavitt
ATTORNEYS.

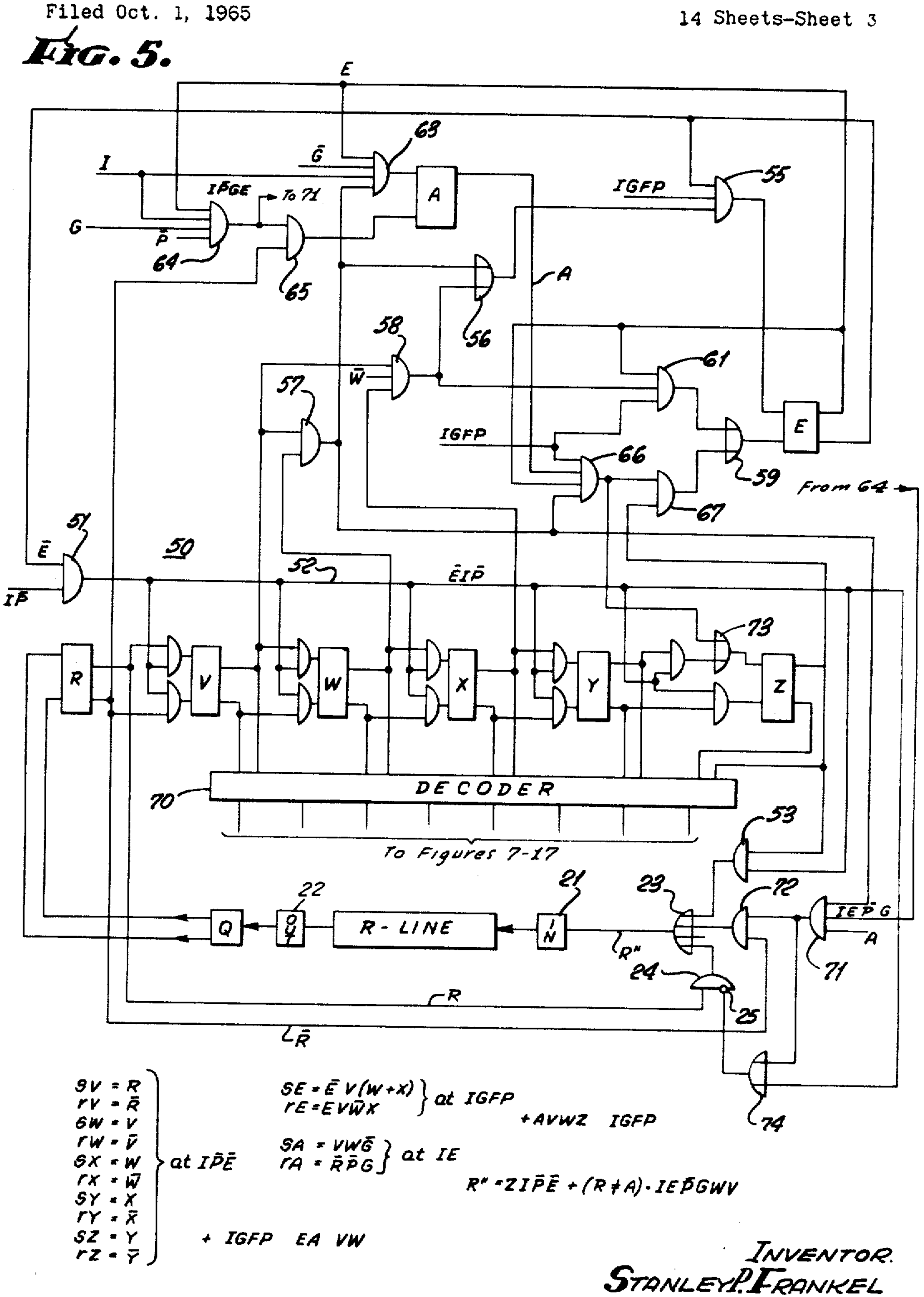
FIG. 5.

$$\left.\begin{array}{l} SV = R \\ rV = \bar{R} \\ SW = V \\ rW = \bar{V} \\ SX = W \\ rX = \bar{W} \\ SY = X \\ rY = \bar{X} \\ SZ = Y \\ rZ = \bar{Y} \end{array}\right\} \text{at } I\bar{P}\bar{E} \quad + IGFP \;\; EA \;\; VW$$

$$\left.\begin{array}{l} SE = \bar{E}\,V(W+X) \\ rE = EV\bar{W}X \end{array}\right\} \text{at } IGFP \quad + AVWZ \;\; IGFP$$

$$\left.\begin{array}{l} SA = VW\bar{G} \\ rA = \bar{R}\bar{P}G \end{array}\right\} \text{at } IE$$

$$R'' = ZI\bar{P}\bar{E} + (R \neq A)\cdot IE\bar{P}GWV$$

INVENTOR.
STANLEY P. FRANKEL
By Smyth, Roston & Pavitt
ATTORNEYS.

FIG. 6.

STATE CODES

| NAME | V | W | X | Y | Z | E |
|---|---|---|---|---|---|---|
| TRANSFER ORDERS - SINGLE | | | | | | |
| BRING P | 0 | 0 | 1 | 1 | 0 | 0 |
| BRING P̄ | 0 | 1 | 1 | 1 | 0 | 0 |
| RECORD P | 0 | 0 | 1 | 1 | 1 | 0 |
| RECORD P̄ | 0 | 1 | 1 | 1 | 1 | 0 |
| EXCHANGE | 0 | 1 | 1 | 0 | 0 | 0 |
| TRANSFER - DOUBLE | | | | | | |
| BRING - P (dbl.) | 1 | 0 | 1 | 1 | 0 | 1 |
| RECORD - P (dbl.) | 1 | 0 | 1 | 1 | 1 | 1 |
| FILL | 1 | 0 | 1 | 0 | 1 | 1 |
| CONDITION, FILL | 1 | 0 | 1 | 0 | 0 | 1 |
| SHIFT AND WAIT - SINGLE | | | | | | |
| SHIFT | 0 | 1 | 1 | 0 | 1 | 0 |
| BLANK | 0 | 0 | 0 | 0 | 0 | 0 |
| SHIFT AND WAIT - LONG | | | | | | |
| SHIFT LONG | | | | | | |
| (1-32 R cycles) | 1 | 1 | 0 | 1 | 1 | 1 |
| (33-64 R cycles) | 1 | 1 | 0 | 1 | 0 | 1 |
| WAIT - LONG | | | | | | |
| (1-32 R cycles) | 1 | 1 | 0 | 0 | 1 | 1 |
| (33-64 R cycles) | 1 | 1 | 0 | 0 | 0 | 1 |
| ARITHMETIC ORDERS SINGLE | | | | | | |
| ADD | 0 | 0 | 1 | 0 | 0 | 0 |
| SUBTRACT | 0 | 0 | 1 | 0 | 1 | 0 |
| ARITHMETIC ORDERS, LONG | | | | | | |
| MULTIPLY | | | | | | |
| (1-32 R-cycles) | 1 | 1 | 1 | 1 | 1 | 1 |
| (33-64 R-cycles) | 1 | 1 | 1 | 1 | 0 | 1 |
| DIVIDE | | | | | | |
| (1-32 R-cycles) | 1 | 1 | 1 | 0 | 1 | 1 |
| (33-64 R-cycles) | 1 | 1 | 1 | 0 | 0 | 1 |

| NAME | V | W | X | Y | Z | E |
|---|---|---|---|---|---|---|
| INPUT OR TEST ORDERS | | | | | | |
| SWITCH 411 | 0 | 0 | 0 | 0 | 1 | 0 |
| " 412 | 0 | 1 | 0 | 0 | 0 | 0 |
| " 413 | 0 | 1 | 0 | 0 | 1 | 0 |
| " 414 | 1 | 0 | 0 | 0 | 0 | 0 |
| " 415 | 1 | 0 | 0 | 0 | 1 | 0 |
| OUT PUT OR EFFECT ORDERS | | | | | | |
| E1 | 0 | 0 | 0 | 1 | 1 | 0 |
| E2 | 0 | 1 | 0 | 1 | 0 | 0 |
| E3 | 0 | 1 | 0 | 1 | 1 | 0 |
| E4 | 1 | 0 | 0 | 1 | 0 | X |
| E5 | 1 | 0 | 0 | 1 | 1 | X |
| INTERNAL EFFECT ORDER OR RELOAD PHASE | | | | | | |
| RELOAD | 0 | 0 | 0 | 1 | 0 | 0→1 |
| LOADING PHASES | | | | | | |
| INITIAL | 0 | 0 | 1 | 0 | 0 | 1 |
| MARKER | 0 | 0 | 0 | 0 | 0 | 1 |
| DISCRIMINATE | 0 | 0 | 0 | 0 | 1 | 1 |
| LOAD - R | 0 | 0 | 0 | 1 | 1 | 1 |
| CHECK - B | 0 | 0 | 1 | 1 | 1 | 1 |
| SEARCH - TAPE | 0 | 0 | 1 | 0 | 1 | 1 |
| SEARCH - M | 0 | 0 | 1 | 1 | 0 | 1 |

INVENTOR
STANLEY P. FRANKEL
BY Smyth, Roston & Pavitt
ATTORNEYS.

$R'' = M \cdot (\bar{I}\bar{E}\bar{V}XY\bar{Z}\ (W \neq P)) + R\,(\overline{\ \ })$ $M'' = R \cdot (\bar{I}\bar{E}\bar{V}XYZ\ (W \neq P)) + M\,[\overline{\ \ }]$ INVENTOR.
STANLEY P. FRANKEL
By Smyth, Roston & Pavitt
ATTORNEYS.

INVENTOR.
STANLEY P. FRANKEL
By Smyth, Roston & Pavitt
ATTORNEYS.

INVENTOR.
STANLEY P. FRANKEL
BY
Smyth, Roston & Pavitt
ATTORNEYS.

GENERAL PURPOSE DIGITAL COMPUTER

Filed Oct. 1, 1965 14 Sheets-Sheet 8

INVENTOR.
STANLEY P. FRANKEL
By Smyth, Roston & Pavitt
ATTORNEYS.

$rB = IGFP \cdot VWXY$ $SA = R$, $rA = \bar{R}$ } at $IGFP \cdot VWXY$ $SR = (B \neq C \neq RA\bar{I})$, $rR = (\overline{\quad})$ } $E\bar{P}VWXY$ $+Q$ / $+\bar{Q}$ } at $P$ $SC = B \cdot RA\bar{I}$ $rC = \bar{B}(\bar{R}+I)$ } $+ IGFP \cdot VWXY$ INVENTOR.
STANLEY P. FRANKEL
BY Smyth, Roston & Pavitt
ATTORNEYS.

SHIFT: 5C = R; rC = R̄; R" = C } at Īp · ε · V̄WXȲZ

INVENTOR.
STANLEY P. FRANKEL
By Smyth, Roston & Pavitt
ATTORNEYS.

INVENTOR
STANLEY P. FRANKEL
By Smyth, Roston & Pavitt
ATTORNEYS.

INVENTOR.
STANLEY P. FRANKEL
BY Smyth, Roston & Pavitt
ATTORNEYS.

INVENTOR.
STANLEY P. FRANKEL
By Smyth, Roston & Pavitt
ATTORNEYS.

INVENTOR.
STANLEY P. FRANKEL
BY
Smyth, Roston & Pavitt
ATTORNEYS.

3,404,377
Patented Oct. 1, 1968

3,404,377

GENERAL PURPOSE DIGITAL COMPUTER

Stanley P. Frankel, 411 N. Martel, Los Angeles, Calif. 90036

Filed Oct. 1, 1965, Ser. No. 491,953
63 Claims. (Cl. 340—172.5)

ABSTRACT OF THE DISCLOSURE

A general purpose, stored program, digital computer is disclosed in which a recirculating register in form of a delay line is provided as principal storage unit and a short recirculating delay line serves for temporary storage for control information and data information and also as accumulator. Through interleafing of bits, the short circulating register can handle three different numbers simultaneously for multiplication and division. Control information in the short register is sequentially set into an order register. All information is stored in the principal memory register in interleaved format, and at times transferred to or from the short delay line. The principal register is addressed by counting cycles of the short delay line in between sequential couplings for data transfer between the long delay line (memory) and the short delay line (operating register). All data processing including arithmetic is handled on a serial-by-bit basis. Data are fed externally into the computer by asynchronous coupling of an external memory extension to the circulating operating register. Output operations are performed by timing the presentation of pulses which can be withdrawn externally.

The present invention relates to a general purpose, stored program digital computer.

The term general purpose computer has been applied to a variety of instruments having the following general characteristics. The instrument should have the ability to perform basic arithmetic operations on numbers presented in digital form. These operations usually include addition, subtraction, multiplication and division. The instrument includes a memory store which holds the numbers taking part in a calculation; the memory will also hold the result of such a calculation until the result is used either for additional calculations or externally. The memory, furthermore, must hold code signals representing the operational states of the instrument, whereby the ability of the instrument to perform these arithmetic operations is expressable in terms of its ability to respond to such codes and to conduct operations the results of which include such arithmetic operations.

The complexity of modern general purpose computers has many reasons. Among these reasons, operational speed, the quantity of data to be handled and mathematical complexity probably are the most dominant ones. As the quantity of data to be handled increases and as the total number of arithmetic processes to which such data are to be subjected increases, a proportionate increase in computing time can be prevented by an increase in the number of different codes to which the instrument can respond in a specific manner to perform well defined but restricted tasks.

Considering first the conceivable course of development in the opposite direction it should be remembered that any number handling can be reduced to the simple operation of subtraction. The simplest general purpose computer conceivable is thus an instrument handling all computations by way of subtractions coupled with result-dependent program branching, but naturally requiring an extremely long time for any arithmetic operation. A program of such a computer would require many different subtracting steps involving many fixed numbers to be combined with input numbers by subtraction in many steps before any final result of, say, a multiplication can be obtained. Thus, the ultimate simplicity in "hardware" will necessarily require the largest amount of "software" and the largest number of processing steps before a final result is reached.

Basically, a more powerful computer obtains its sophistication from "short cuts," in that circuitry (hardware) is designed to respond to different operating codes each of which has the effect of combining predetermined groups of such subtracting operations into specific self-controlling machine operations of shorter duration; so that less "software" will be required. The introduction of multiplication and division operations are obvious "short cuts" of this type; others are shifting operations, large variations of conditioned program branching, and extensive communication systems between external data input and output devices. Hence, the trend here is to increase the amount of hardware so as to shorten the total number of operational steps required to obtain a desired result.

Here the general layout of a general purpose computer should be considered. It usually includes a memory section, holding all numbers as well as operational codes in what is usually called addressable locations. Operation codes and operand numbers are correlated by associating an operation code with a memory address which together form an instruction word, whereby the address defines the memory location holding the operand upon which such operation is performed. Such a system, in general, requires among others these two types of control systems: a first control system must respond to the address code in such an instruction and call on the thus specified memory address location to retrieve therefrom the operand upon which an operation has to be performed in accordance with the operation code portion of this instruction. The second control system must ensure that the system performs the various operational steps in a predetermined order, that is to say it must organize the sequence with which the instructions are executed. In many cases, this organization is performed by a program counter causing the sequential addressing of the memory locations which hold the instructions, or one can include the memory address code of the next instruction as part of the instruction word preceding. It will be explained below that the invention sets forth an entirely new way of such sequencing of operation codes.

A general purpose computer usually includes further a number of registers holding numbers, operation codes, and addresses for temporary storage including all data currently involved in specific operations performed by what is called the central processor. This latter circuit network basically includes all those operation code-responsive circuit networks which process the numbers currently held in one or more of these registers, whereby such processed numbers may be representative of true numbers or of addresses; often program branching is the result of computing one address out of others. The processing in general involves the shifting of data among the several registers as well as into or out of the memory, out of or into registers with or without data modification prior to, during, or subsequent to such transfer.

A high speed, highly powerful data processing system is extremely expensive and thus must be designed to perform a large variety of programs very rapidly, and either consecutively or on time sharing basis at different priority levels whereby the higher priority interrupts execution of lower priority programs to be resumed later. The reason for this requirement is predominantly one of economics so that, for example, a computer operating "on line" at specific instants can perform unrelated operations in between. On the other hand, it has been found that many computing problems do not require the high speed of which electronic devices are capable. Hence a simplification of "hardware" and a corresponding increase in software may prove suitable as long as the total processing time due to extensive employment of software does not exceed tolerable limits.

To give a brief example, a general purpose computer programmed for use as a desk calculator with manual input keying and output printing is fast enough if, for example, the printing of the result begins, say, at the instant the operator takes his finger from the "go"-key, such as a key commanding the performance of a multiplication of numbers previously keyed into the device.

Time sharing of elements and careful consideration of inter-relationship between hardware and software can result in a reduction in hardware without increase in processing time. Here suitable selection of data format, the mode of storage of data and the sequencing of operation in a manner that permits synchronization with memory access play important roles. A distinction is to be made here between the time sharing of executing different programs and the time sharing of circuit elements. A very powerful computer must be equipped to operate on different programs on a time sharing basis permitting interruption of a program if a higher priority program demands execution. If this requirement can be dispensed with and if the time sharing of elements for executing a single stored program can be developed to the utmost, the cost reduction can be so extensive that the restriction to an exchangeable, but single, stored program does not render the computer uneconomical.

With the object of saving hardware, the computer in accordance with the present invention is so designed that an addressing control system for the general or main memory store can be dispensed with entirely, and a specific format of data representation, transfer and storage can be used to shorten and to simplify the execution of processing steps, while the sequencing of the processing steps themselves is used directly for memory addressing.

The computer in accordance with the preferred embodiment of the invention is comprised of the following features. The principal operating register is a recirculating delay line having a predetermined recirculating period. This delay line normally recirculates four data words each comprised of a similar plurality of bits. These four words circulate in pairs in that the bits of two words are interleaved or interlaced, and the other two words have their bits similarly interleaved and follow the first pair and vice versa in the course of the recirculation. The principal operations are performed by modifying one or more of the words as they emerge from or prior to re-entry into the delay line or by substituting entire new strings of bits.

For example, the bits of a word as they emerge from the delay line (as alternate bits, interleaved in another word) will normally be set again into the delay line for recirculation. Alternatively, these bits may be suppressed completely and replaced by another string of bits, or the bits as they emerge may be combined with another concurrently presented string of bits with the string of resulting bits being set into the delay line in substitution for the emerging bits. The additionally presented string of bits may, for example, be the respectively interleaved bits, or they may be drawn from a second delay line. In most instances, when bits of one word as they emerge are modified, the respectively interleaved bits are recirculated unmodified; however, in one type of operation two words as they emerge from the first, principal delay line are caused to exchange places prior to their re-entry to the delay line in which case either word is substituted for the other.

The second delay line mentioned above also permits recirculation and is the principal memory store; it has a circulation period considerably in excess of that of the first, short, delay line but there is a definite number relation in the two circulating periods. Words also travel through the long delay line in pairs, with respectively interleaved bits. While, as mentioned above, the second delay line may at times furnish a word as a string of bits to be set into the first delay line, the reverse transfer of bits and words is also possible.

The various activities, involving principally the modification of recirculation of the first delay line, are controlled by codes held in a static register for periods commensurate with the time needed for executing the desired process. Such execution times are either half of the circulative period of the first, short, register or one full cycle thereof or an integral multiple of this cycle period. The description of the appended drawings is devoted basically to the activities as controlled by these various codes, also called order codes.

The static register receives order codes by temporary connection to the first day line. Only one particular word of this first delay line is involved; it is shifted through the static register with the effect that an order code previously held in the static register is exchanged for another order code which was previously part of this particular word. Hence, in this particular activity, one particular word as it emerges from the delay line is modified in that a part is taken out, other bits are substituted for the part that is taken out, and the remaining portion is changed in format.

This can be better understood if one considers this particular word as a mere assembly of code blocks. This assembly is enlarged by the code block currently held in the static register. These code blocks are sequentially exchanged by being shifted into the static register, one by one for a particular period of time, and then placed back into the first short delay line in a manner which does not interfere with the three other words which circulate in the short delay line. The duration of this changing of the order in the static register is half a circulation period of the short delay line and this bears a definite relationship in time to the execution period of any order. As a result of this relationship, the time from the placing of any order into the static register until the placement of the next order therein is always an integral multiple of the circulation period of the short delay line.

All code blocks that are shifted into the static register define order codes, but not all code blocks that are part of this particular code block assembly are order codes initially, because some of the code blocks represent numbers that are modified before they can be set into the static register to be interpreted as orders. The sequence of the code blocks as they circulate in the short register determines the sequence of their placement into the order register, and this in turn determines the sequence of the activities as controlled by the orders. The code of an order not only defines and controls specific activities but also the duration of such activities, i.e., the time span between the placement of such order code into the static register and its removal therefrom. For a certain class of orders this duration is additionally determined by a code block that is subject to modification before it is placed subsequently into the static register as an order.

As the second, long delay line is the main memory store, transfer of words between the two delay lines is frequently necessary. The selection (addressing) of any work in the main memory is exclusively controlled by pre-selecting (programming) the periods of execution of orders in between successive communications or word transfers between the two delay lines, and this timing, in turn, is controlled exclusively by selection of order codes other than communication order codes which require for execution as much time as is needed between different communication steps. Two basic aspects aid in this mode of addressing the memory as constituted by the second delay line; one is the fact that the length of the second delay line is not a fixed parameter in the system design, it may even be made variable to be selected ultimately by the programmer for optimum results in programming. The other aspect is that there are order codes which, when in the static register, do not control any activity but simply cause unmodified recirculation of all words in the two delay lines. This permits the interpositioning of suitable waiting periods in between communication or transfer orders. However, a skillful programmer should be able to write a program, i.e., order code assemblies, in which he makes only a minimum use of these "wait orders."

The basic arithmetic operations which the machine is capable of performing are addition, subtraction, multiplication and division; described in detail below with reference to the appended drawing. However, as a general comment it should be mentioned that the chosen circulation format in either delay line, by interleaving the bits of pairs of words, permits multiplication and division operation to be carried out and completely exclusively with the aid of words held in the short delay line, without intervening data transfer between the two delay lines. Other orders permit selective rearrangement of bits or entire words as they are held in the short delay line.

The inventive computer can communicate with external devices in various ways. A group of orders is set aside for this purpose so that this communication occurs as part of the sequence of processing steps as defined by the orders sequentially shifted into and out of the static register. Execution of these external communication orders causes either the testing of the state of an externally actuatable switch, or the delivery of a pulse to an external device to be used therein in combination with other such pulses as an expression of results obtained by the computer.

In a different mode of operation the static register is decoupled from the short delay line and phase code signals are simulated in the static register. Data is represented externally, in serial-by-bit format but asynchronously as far as the short delay line cycling is concerned. The phase code signals control the loading of such bits into the short delay line in synchronism with the short delay line recirculating period. According to a further aspect of the invention, as the short delay line is thus filled to capacity its content is then interpreted as four words, whereby one word is further interpreted as a control code assembly, the codes of which are sequentially loaded into the static register whenever interpretable as orders to cause the transfer of the three other words to the second, long, delay line (memory) at predeterminable instants of communication.

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawing, in which:

FIGURE 1 is a generalized schematic illustration of the principal components or building blocks of the computer in accordance with the present invention including a circulating memory register, a circulating operating register, a static register, connection logic, input-output devices and timing logic;

FIGURES 1*a*–1*e* illustrate logic symbols used in the following figures;

Figures 5A, 5B:
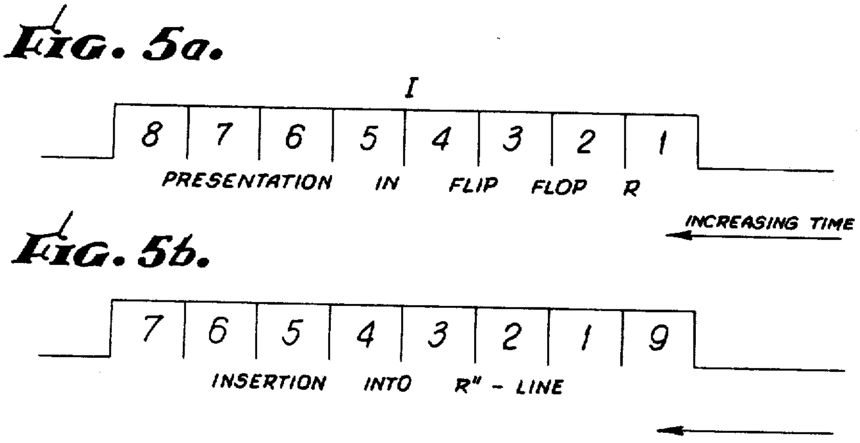
FIGURE 5 illustrates schematically the circuit network used to control the commencement, duration and termination of setting orders into the static register, which orders in turn control the activities of the computer.
Figure 7:
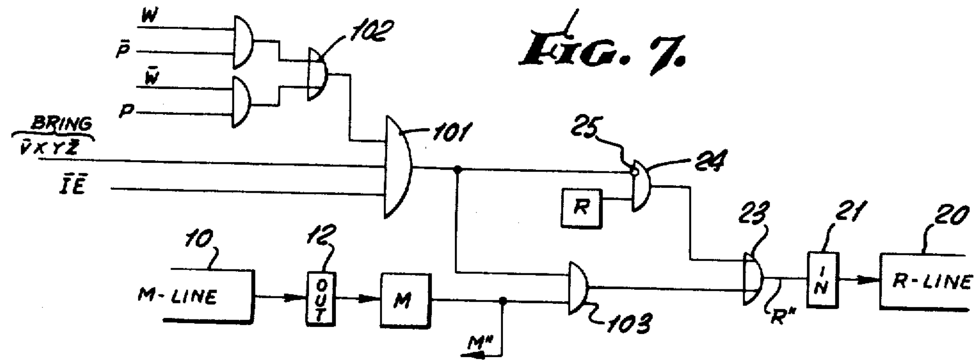
Figure 8:
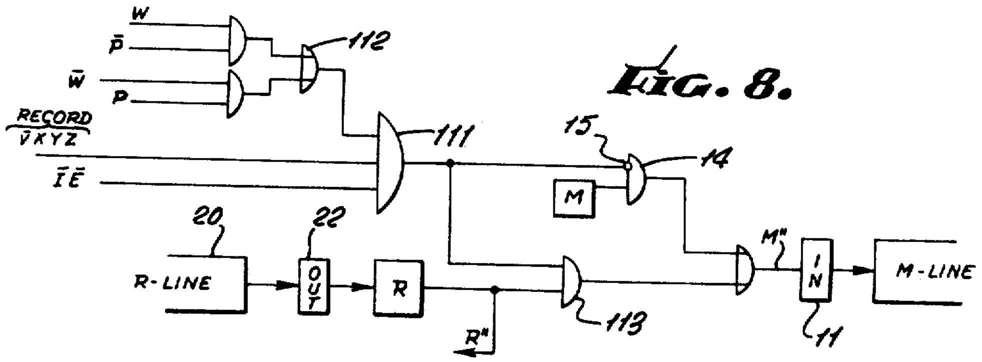
Figure 9:
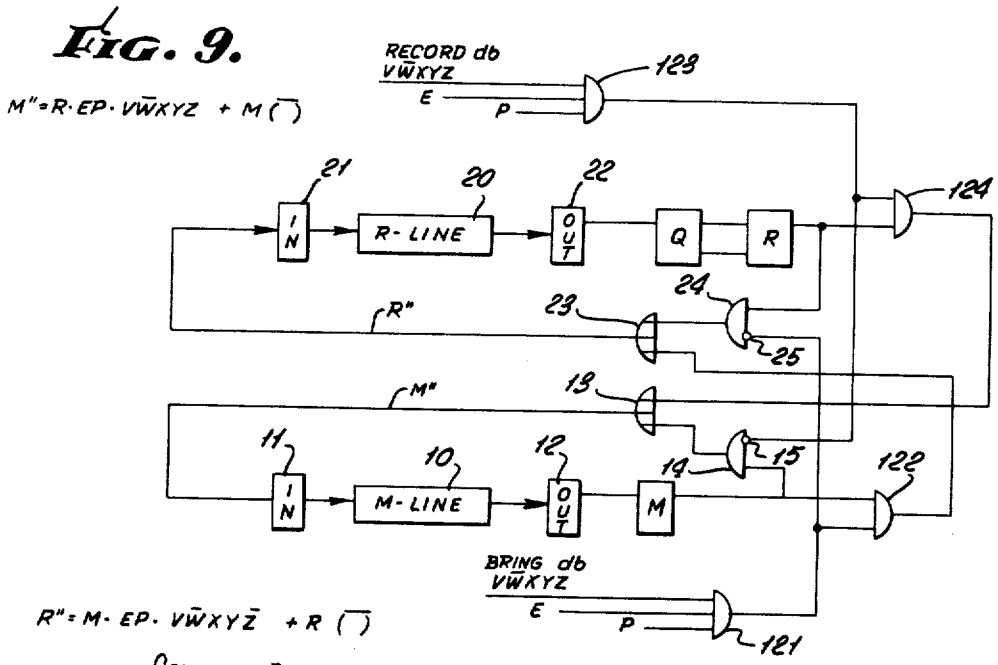
Figure 11:
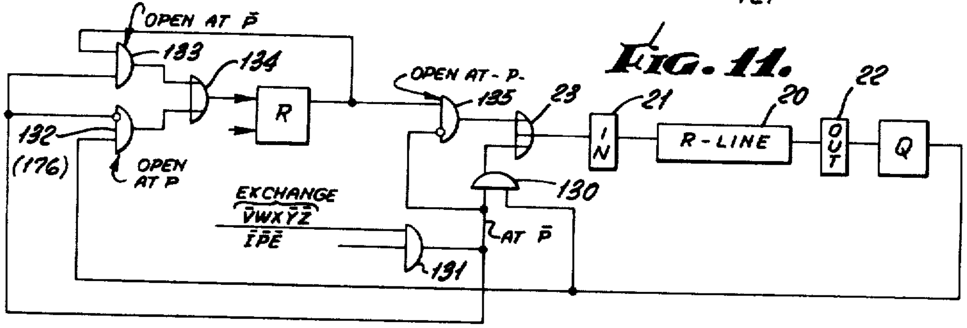
Figure 11A:
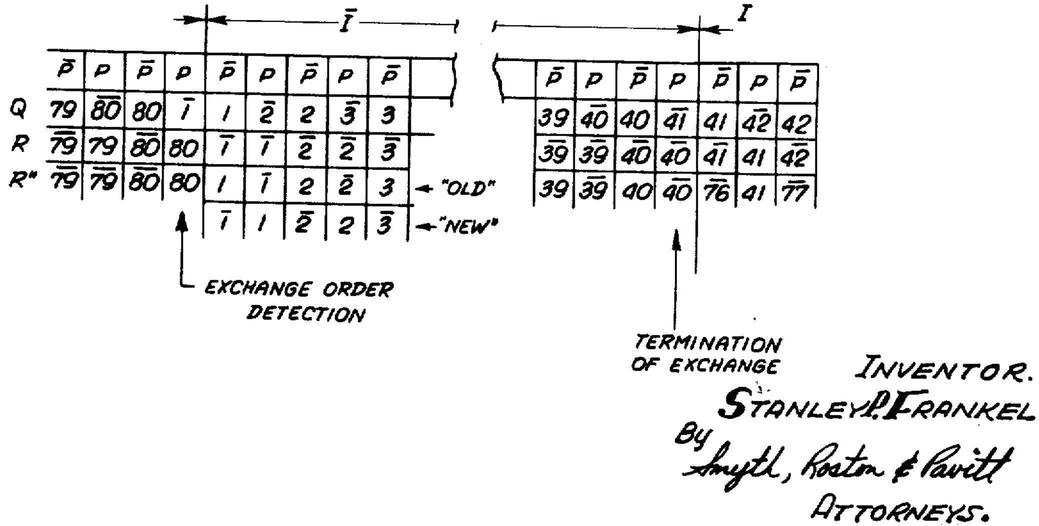
Figure 10:
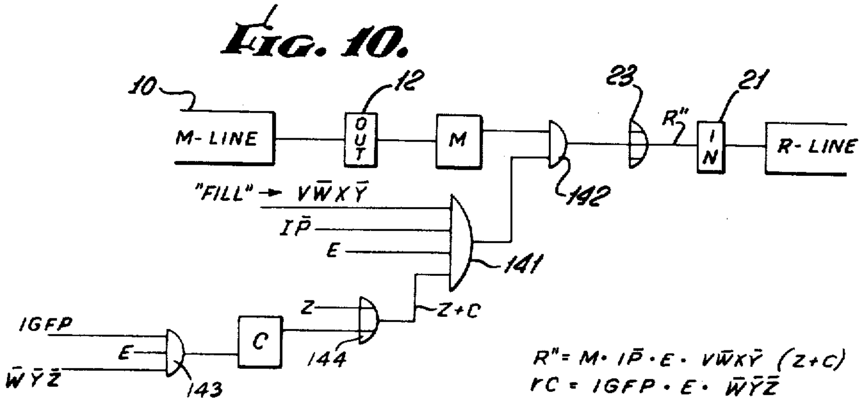
Figure 14:
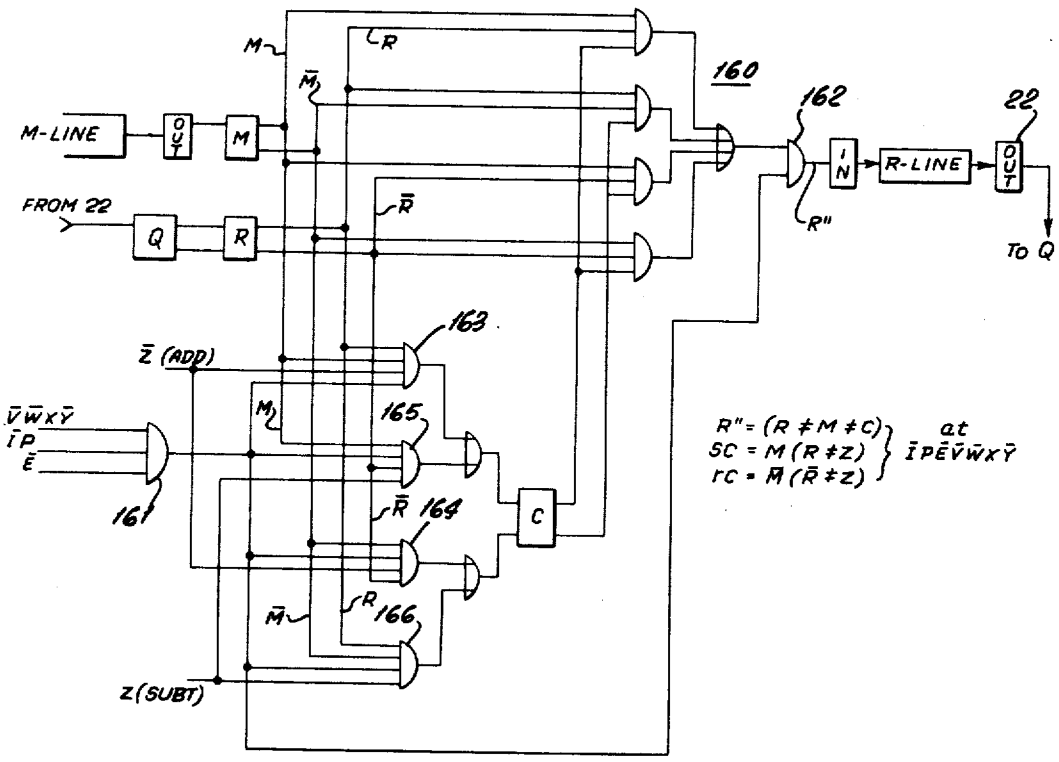
Figure 13:
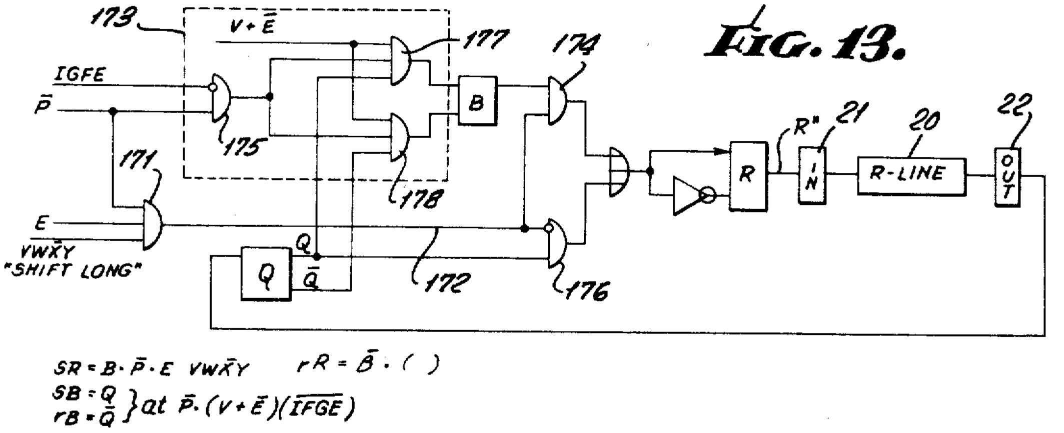
Figure 12:
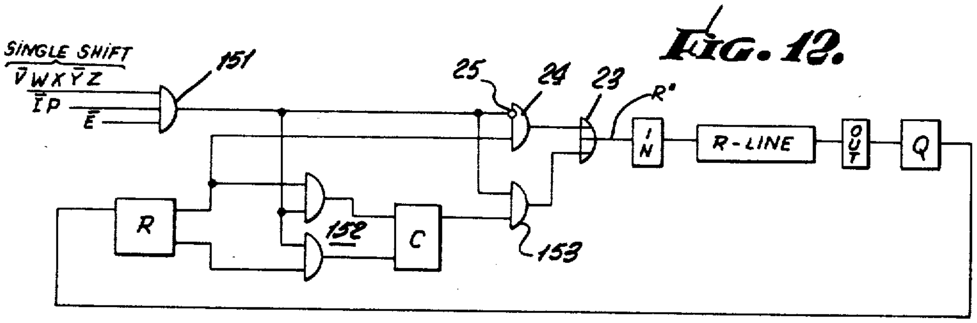
Figure 13A:
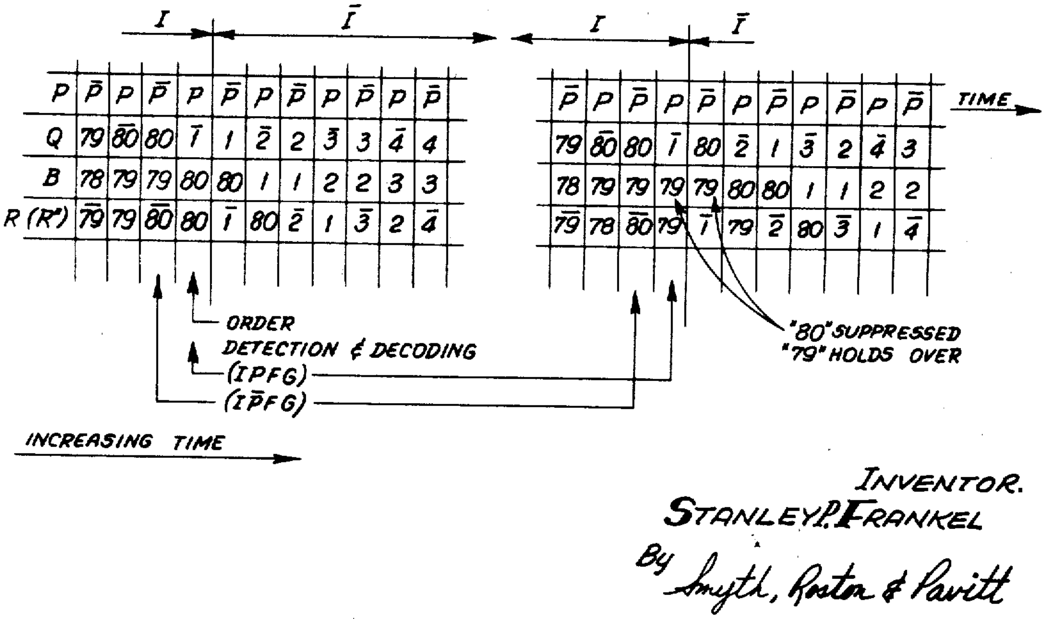
Figure 15:
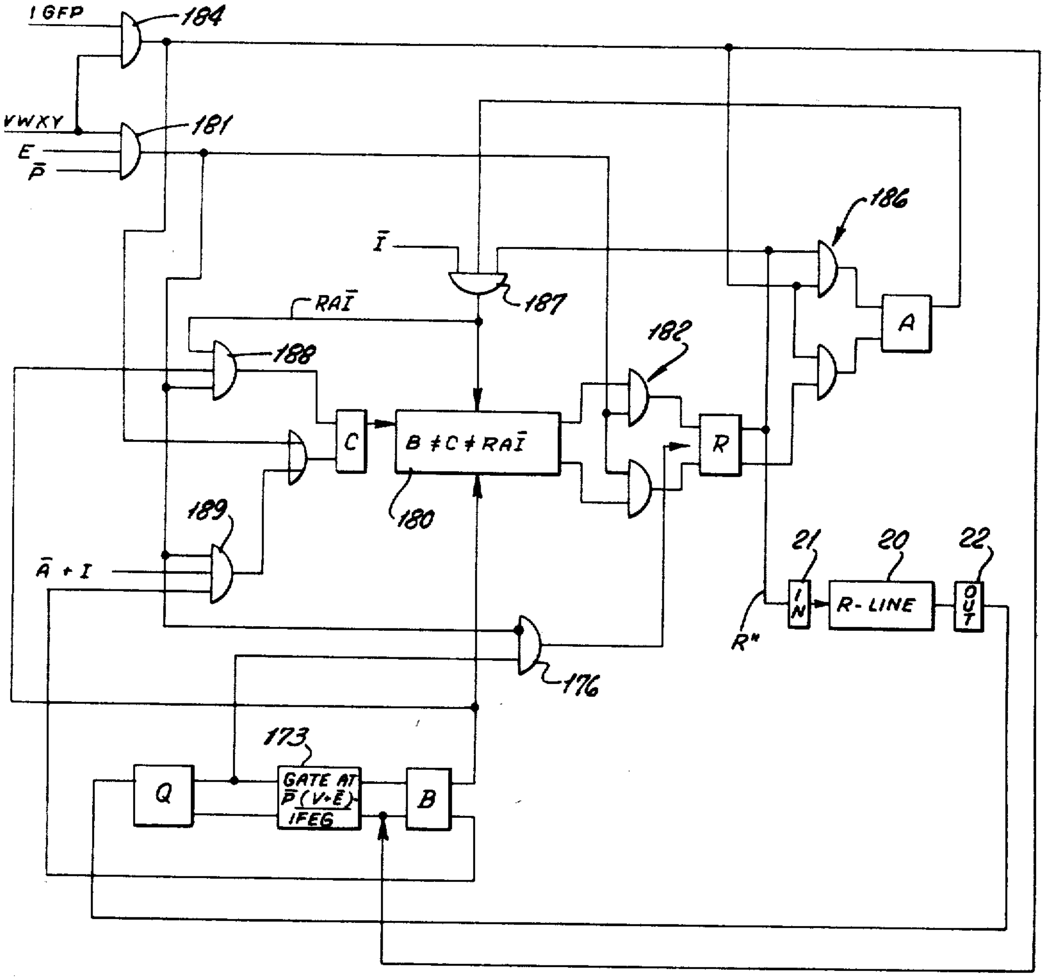
Figures 15A, 15B:
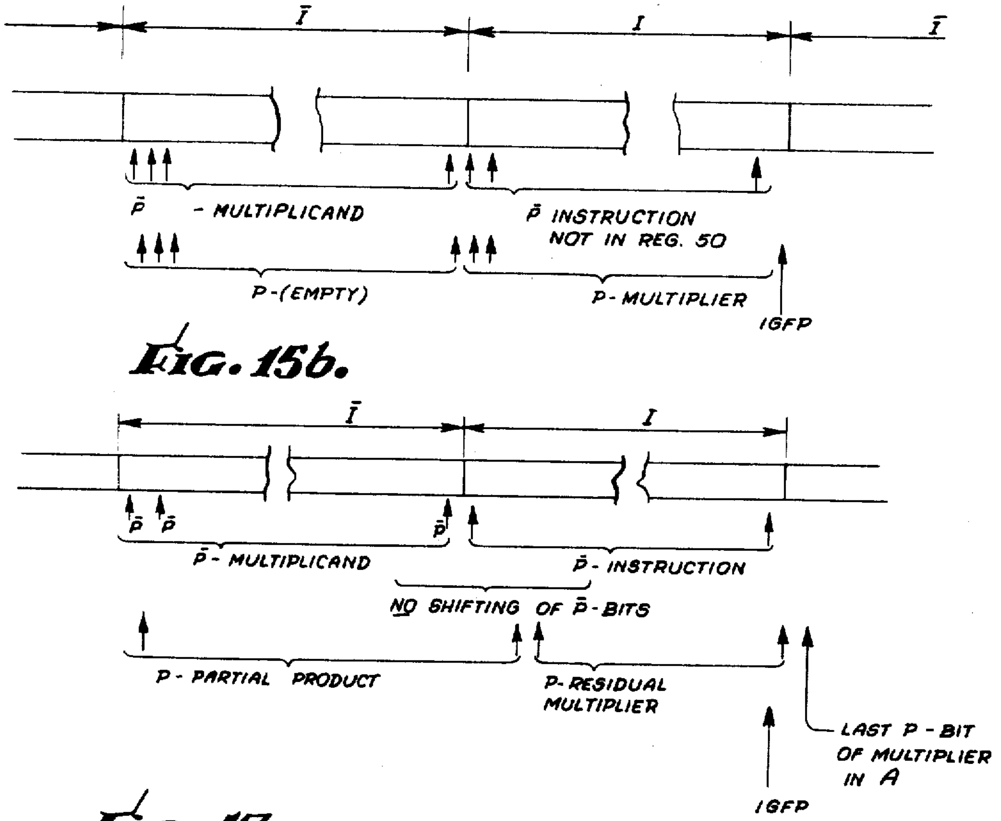
Figure 17:
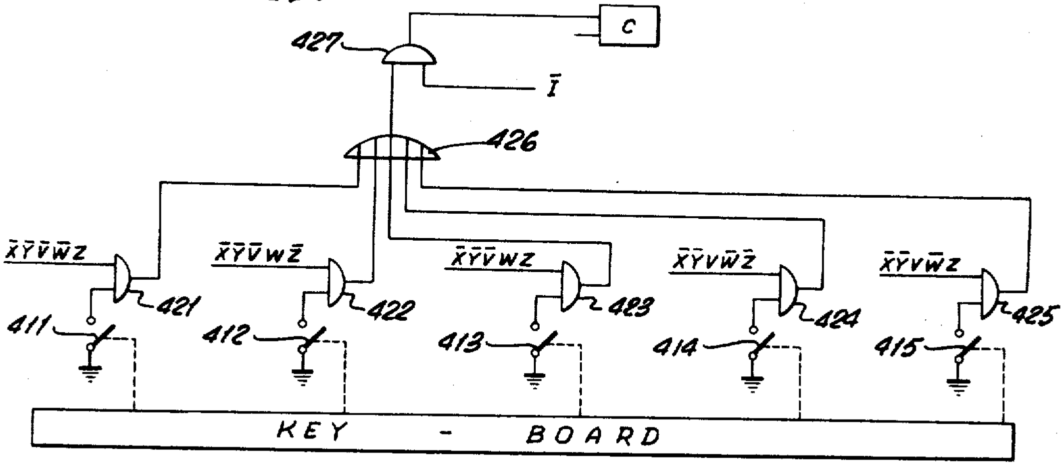
Figure 16:
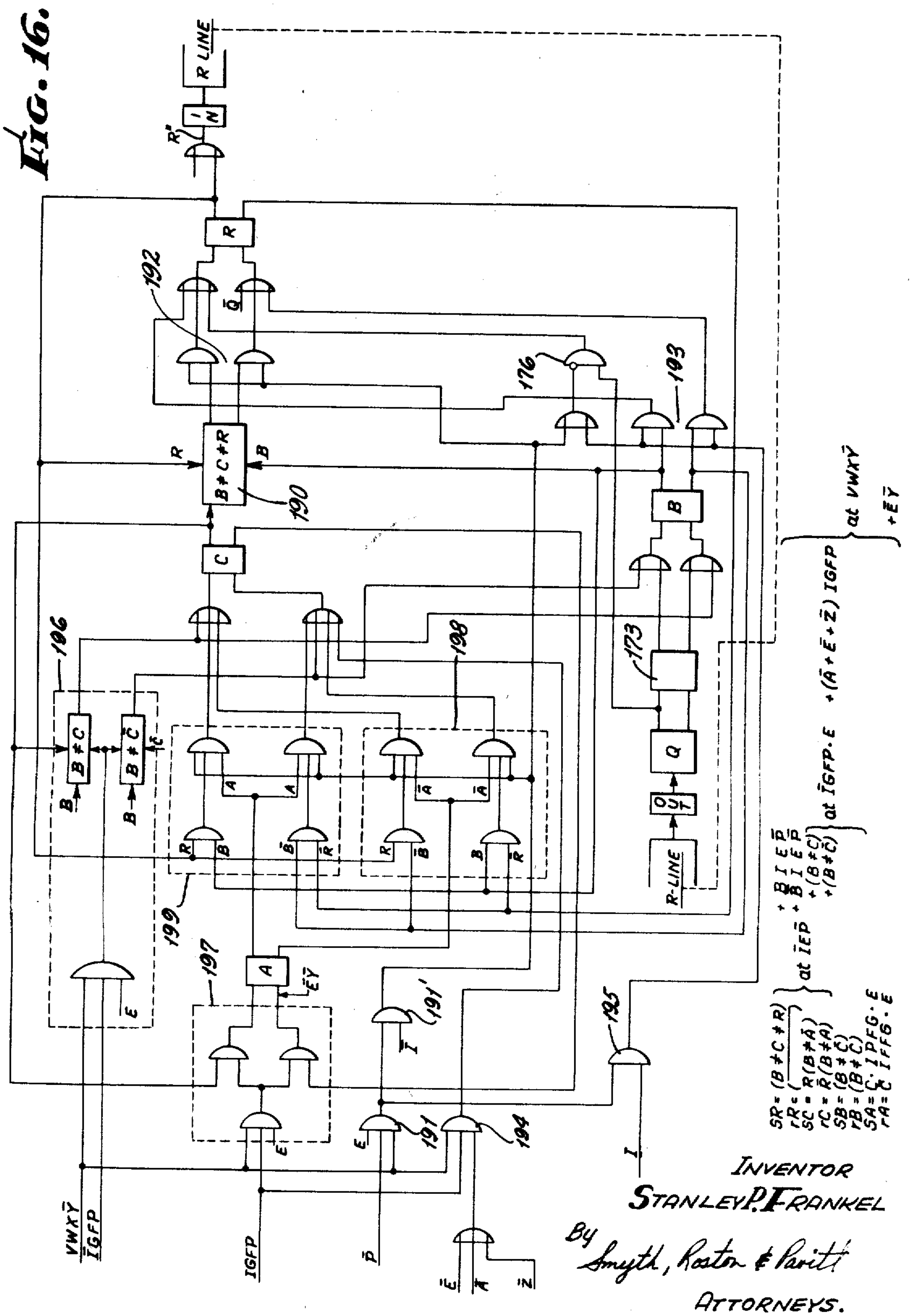
Figures 18, 19, 20:
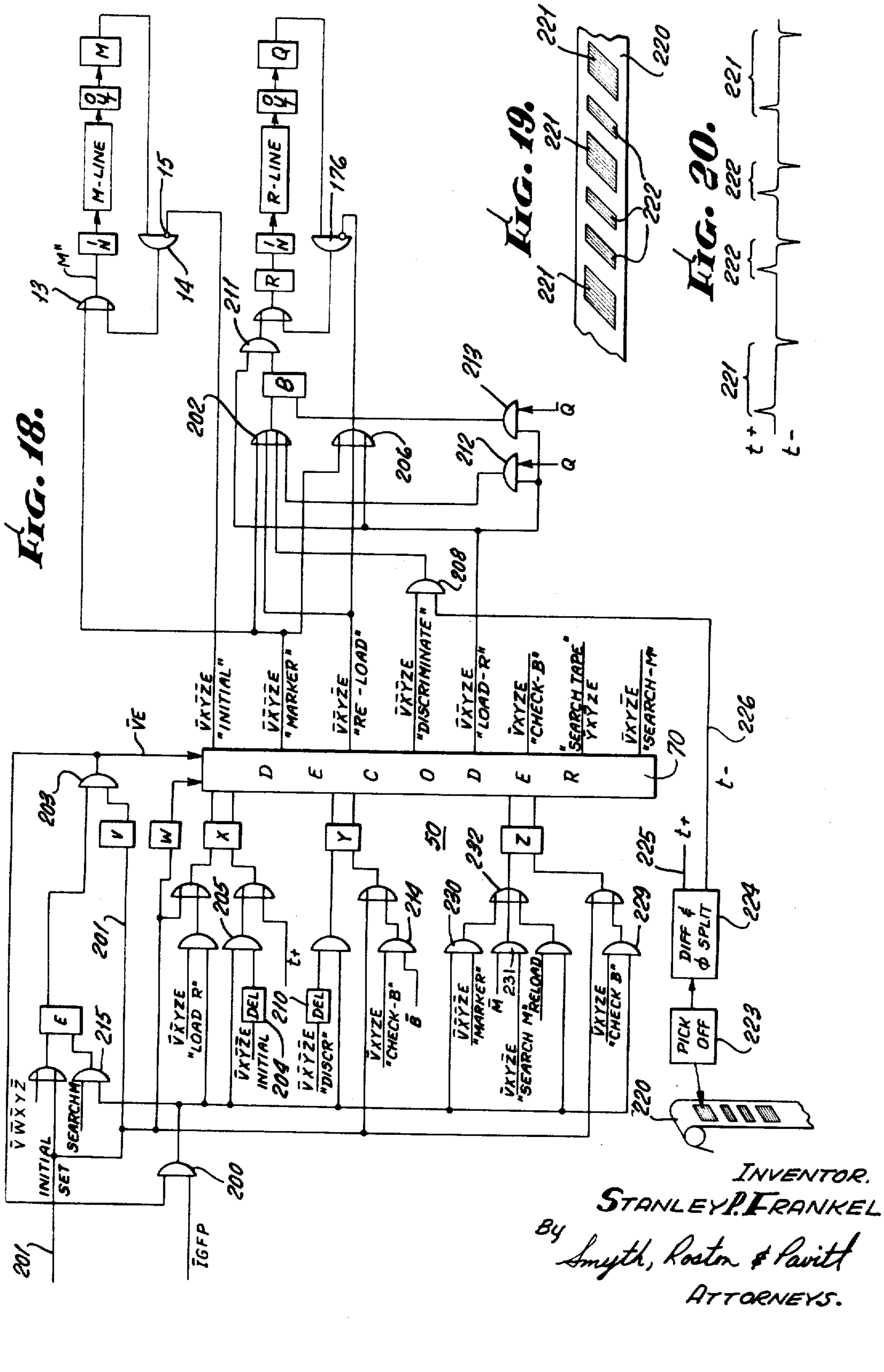
Figure 18A:
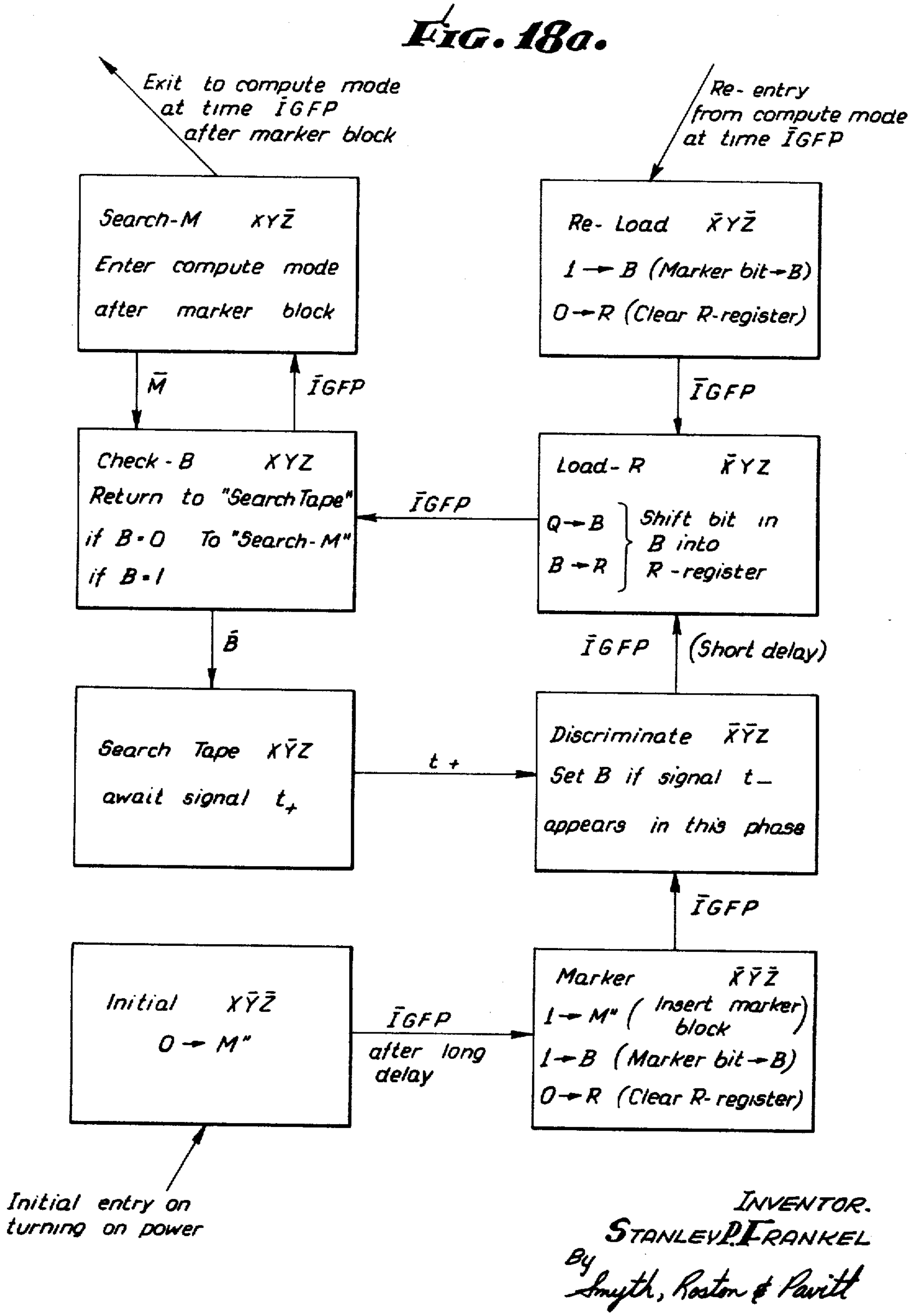
Figure 21:
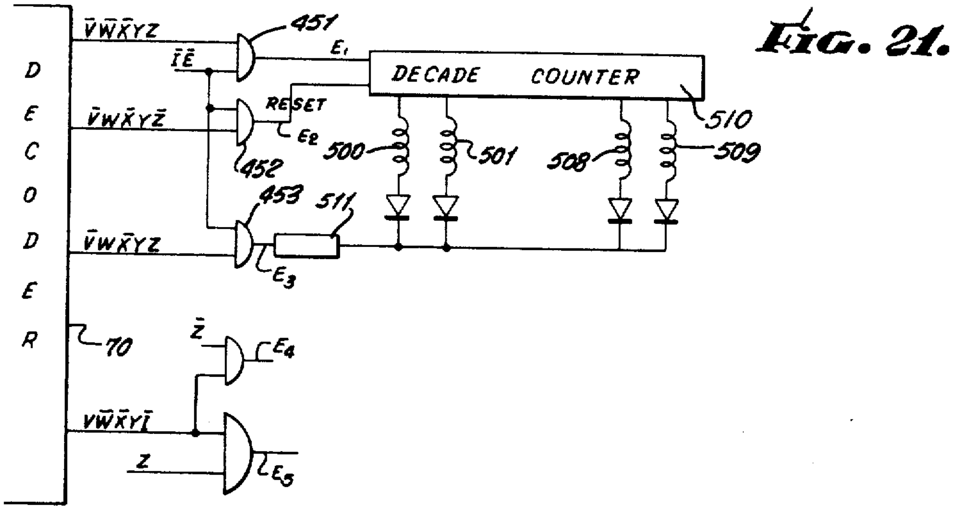
Figure 22:
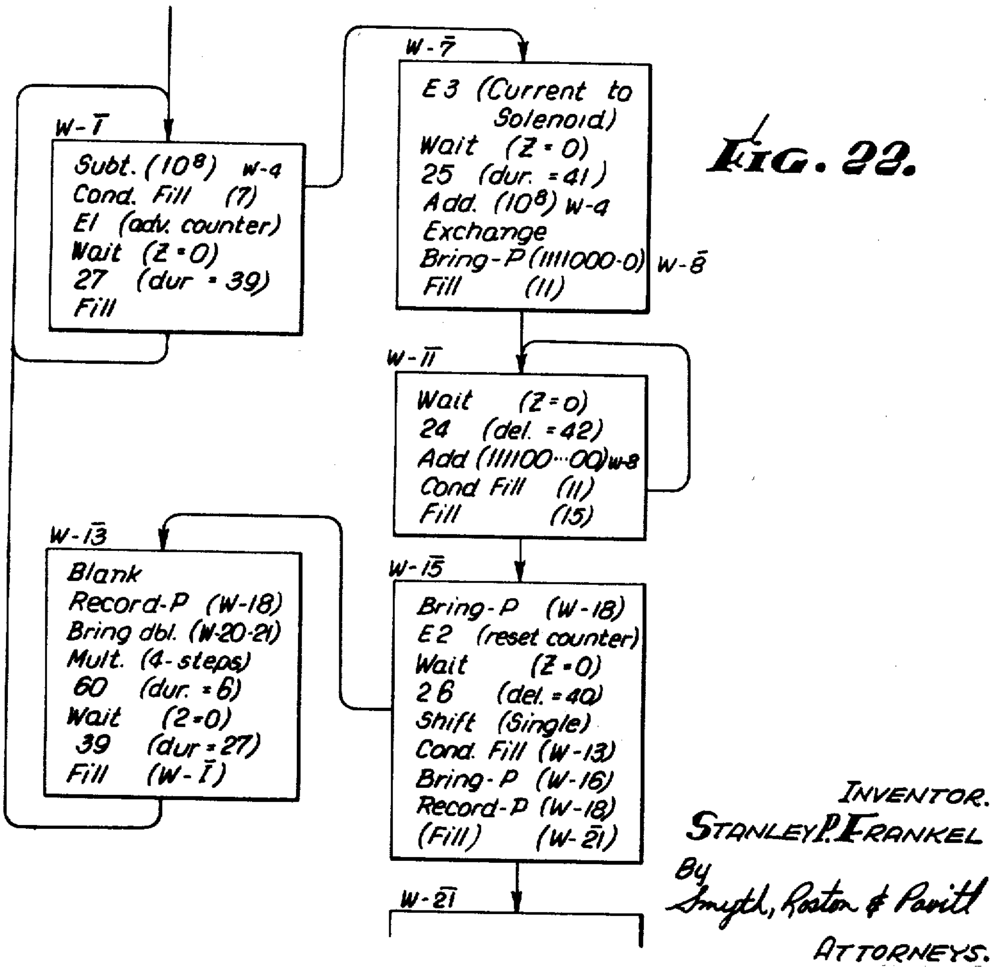

FIGURES 5*a* and 5*b* illustrate schematically the rearrangement of order codes as they circulate the operating register;

FIGURE 6 is a table illustrating the codes which control the activities of the computer;

FIGURE 7 illustrates schematically the circuit involved in the transfer of either one of two data words from the memory register to the operating register;

FIGURE 8 illustrates the circuit involved in the transfer of a data word from the operating register to the memory register;

FIGURE 9 illustrates schematically the circuit involved in the transfer of two data words between the two circulating registers in either direction of transfer;

FIGURE 10 illustrates schematically the circuit involved in the transfer of either one of two data words from the memory register to the operating register with the transfer involving data words which include order codes;

FIGURE 11 illustrates schematically the circuit involved to rearrange the order of words in the operating register;

FIGURE 11*a* is a table illustrating the rearrangement of individual data bits as carried out by the several components shown in FIGURE 11;

FIGURE 12 illustrates schematically the circuit involved in shifting (delaying) the bits of a word as it circulates in the operating register, by one bit position;

FIGURE 13 illustrates schematically the circuit involved in shifting (delaying) the bits of two words as they circulate in the operating register by a variable number of bit positions;

FIGURE 13*a* is a table identifying several individual bits as they are delayed by operation of the circuit shown in FIGURE 13;

FIGURE 14 illustrates schematically the circuit involved for serially adding or subtracting two numbers represented by data words concurrently presented by the two circulating registers, with the resulting word being set into the operating register;

FIGURE 15 illustrates schematically the circuit involved for multiplying two numbers represented by data words;

FIGURES 15*a* and 15*b* illustrate schematically the sequence of circulation of multiplier, multiplicand, the step-wise destruction of the multiplier and the build-up of the product in the operating register during multiplication;

FIGURE 16 illustrates schematically the circuit involved for carrying out a division;

FIGURE 17 illustrates schematically the circuit involved for transferring individual data bits presented externally, into the computer;

FIGURE 18 illustrates schematically the circuit involved for transferring sequentially a plurality of externally presented data bits into the operating register;

FIGURE 18*a* illustrates a flow chart of the operational phases as established in predetermined sequence in the circuit shown in FIGURE 18, to synchronize the external presentation of data bits and the circulation of the operating register;

FIGURE 19 illustrates in isometric view a portion of a record carrier used for external data presentation for use in the circuit shown in FIGURE 18;

FIGURE 20 illustrates a pulse sequence as they appear in the circuit shown in FIGURE 18;

FIGURE 21 illustrates schematically a circuit which can be used for presenting data bits by the computer for external use in an electric typewriter; and FIGURE 22 illustrates a flow chart and a subprogram for operating the typewriter of FIGURE 21.

GENERAL DESCRIPTION

Figure 1:
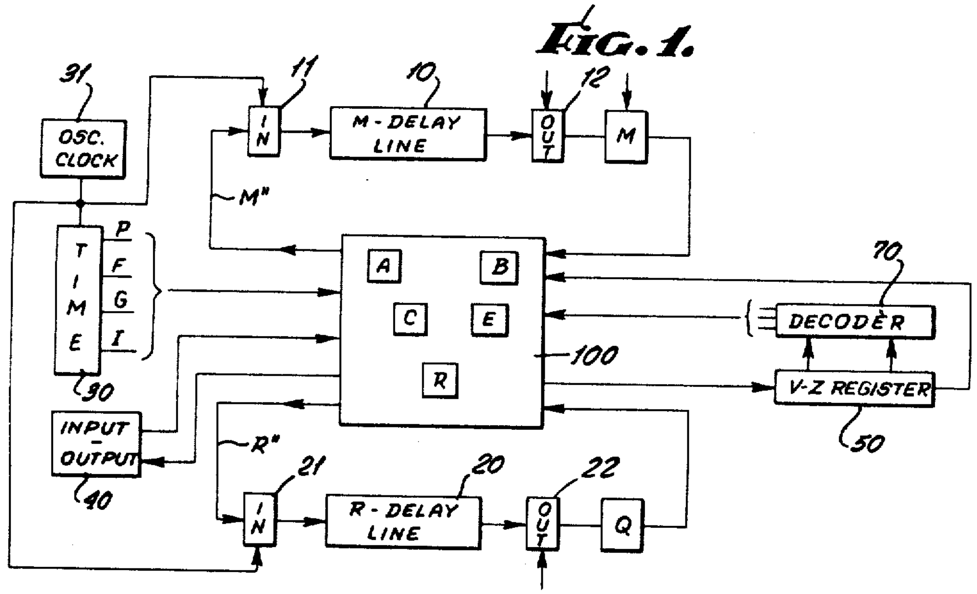

FIGURE 1 illustrates schematically the principal elements employed in the design of the general purpose computer which is the subject of the present invention. The basic elements thereof are two delay lines 10 and 20, respectively, called M delay line and R delay line. Each one of these delay lines is comprised of substances or components which permit substantially unattenuated travelling of discrete signals at a rather high signal-to-noise ratio.

For example, each one of these delay lines may be comprised of a mechanical device which permits the transmission of vibration waves over its extension without material attenuation while maintaining a satisfactory signal-to-noise ratio. Sound waves, of course, are to be understood in the general sense since the frequencies employed are, as is well known, in the ultrasonic range. The basic frequency of the signals employed is, for example, 1 megacycle.

The M delay line 10 will also occasionally be called the long delay line and serves as principal storage unit or memory register. The R delay line 20 will be called the short delay line serving as a temporary storage and operating register. Their relationship as far as inherent time delay constants are concerned will be described by way of example more fully below. Each one of these delay lines has an input transducer, such as transducers 11 and 21, coupled to one side of the delay lines 10 and 20 respectively, and being comprised of an electromechanical transducer to issue discrete "sound" pulses upon individual input energization. The respective output ends of the two delay lines are equipped with pickup or output transducers 12 and 22 respectively, to respond to the pulses which have travelled through the respective delay lines to produce electrical output pulses accordingly.

The specific configuration of these delay lines and their respective input and output transducers is not critical. Each of these delay lines may also be comprised of a magnetic recording medium such as a tape or a disc or a drum, cooperating with magnetic input and output transducers capable of magnetizing the magnetizable storage medium and of responding to magnetized surface portions of the medium when passing under it. Various types of delay lines are, for example, described by R. K. Richards, "Digital Computer Components and Circuits," D. Van Nostrand & Co., 1959, page 282 et seq.

The principal function of the computer is to couple inputs and outputs of the two delay lines together in an organized manner and/or to recirculate the contents of a delay line derived from its respective output transducer back into its respective input transducer with or without processing of the signal prior to recirculation thereof. In order to permit proper processing, the signals emerging from the delay lines and after having stimulated the respective output transducers (12 or 22) are set into flip-flops. A flip-flop Q has its input side always coupled to output transducer 22 of the R-line. Bit signals emerging from the respective lines can thus be distinguished in binary code as Q or $\overline{Q}$ and M or $\overline{M}$ signals.

The flip-flop M has in most instances but not always its output side coupled to the input transducer 11 for the M-delay line. Thus, the flip-flop M is the principal source for signals passing into the input line M'' for the input transducer 11.

The control logic 100 is basically comprised of five flip-flops, R, A, C, B and E.

The flip-flop R of control logic 100 is the principal but not the exclusive control flip-flop for the input transducer 21 of the R-delay line 20. Thus, in many but not in all instances, the output of flip-flop R will determine the content for a line R'' which is the input line for input transducer 21 of R-delay line 20.

The flip-flop A in the control logic 100 is the principal control flip-flop for some arithmetic operations. Its principal function is the controlled modification of data circulating in the R-line, amounting to an arithmetic operation on such data.

The flip-flop C is a general control flip-flop which modifies arithmetic operations in accordance with "carry" and "borrow" procedures necessary for adding, subtracting, multiplying and dividing operations. Additionally, flip-flop C will signal "overflow" in case of arithmetic operations, and it is used for "sign" bit representation and program branching.

The flip-flop B has as its basic function the introduction of a fixed, limited delay of the shortest order possible within the computer of the present invention. Additionally, flip-flops B and C participate in the data communication between the computer and external devices.

The flip-flop E is the "execute order" control flip-flop, basically separating during operation of the computer periods of time in which a new "order" to be executed is searched or provided for, from periods of time during which certain "orders" are being executed. For the meaning of the word "order," see the discussion below; presently it suffices to state, that each "order" is a combination of bits which defines a unique operational state or sequence of logic operations within the computer. The control logic 100 includes, of course, a large number of logic "and" and "or" gates to be discussed in detail below.

Figure 1A:
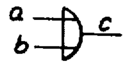
Figure 1B:
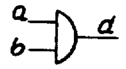
Figure 1C:
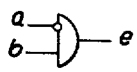
Figure 1D:
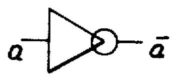

As symbolic representation of the logic "and" and "or" functions, the symbols shown in FIGURES 1*a*, 1*b* and 1*c* are used. The implementation of these functions by means of gates is well known and does not require elaboration. FIGURE 1*a* represents the relation $c=a+b$, FIGURE 1*b* represents $d=ab$, FIGURE 1*c* represents $e=\overline{ab}$. More than two inputs may at times be used, if necessary. Occasionally, an inverter as shown in FIGURE 1*d* is used. As in many instances, the same signal is used at several different locations, amplification may be required. Amplifiers have been omitted in the several circuits, because they are well known in the art. As inverters often can be provided with a positive gain, the logic representation may advantageously be modified due to the well-known relations $\overline{ab}=\overline{a+b}$ and $\overline{ab}=\bar{a}+\bar{b}$. For example, $ab=\overline{\bar{a}+\bar{b}}$, which means that input signals *a* and *b*, individually, as well as the output signal of an "or" gate are subjected to inversion permitting gain increase of the signal.

Figure 1E:
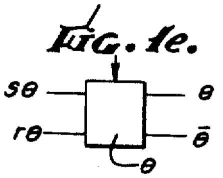

FIGURE 1*e* illustrates the symbolic representation and terms used for describing flip-flops. A flip-flop $\theta$ when set provides at its set side output a true signal of like designation; $\overline{\theta}$ is true when the flip-flop is reset, while set and reset input signals are designated respectively with $s\theta$ and $r\theta$. All flip-flops are of the clocked input type changing states at a clock signal derived from a clock pulse source 31 (FIG. 1) provided there was a change from "false" to "true" or vice versa at its input sides. It should be mentioned that often the input side of a flip-flop ($\theta_1$) is to be controlled from the output side of another flip-flop ($\theta_2$) particularly if a bit held in the latter is to be transferred into the former. In this case, $s\theta_1=\theta_2$ and $r\theta_1=\overline{\theta}_2$. It is apparent that these relations can be realized in different ways. For example, the output set side of flip-flop $\theta_2$ can be connected directly to the input set side of flip-flop $\theta_1$ and, additionally, via an inverter to the input reset side of flip-flop $\theta_1$. Alternatively set and reset output sides of flip-flop $\theta_2$ can be connected respectively to set and reset input sides of flip-flop $\theta_1$. In the drawings these connections have often been simplified by a single line connection between flip-flops.

Next, there is provided a V–Z register 50 comprised of five flip-flops V, W, X, Y and Z which as far as the computer is concerned, is the only static register in contrast to the "dynamic" registers established by the delay lines M and R. Its principal function is to hold a "state" code for the duration of its execution. As "state" codes, there are available "order" codes which can circulate through the delay lines and can be assembled in sequences. Other types of "state" codes are "phases" set into the register 50 during loading of the computer from an external data source.

As will be described more fully in the chapter "Order Cycling," this register 50 is operated as a serial shift register, having its input side connected through the control logic 100 to the output side of the R-delay line, specifically through the flip-flops Q and R, while the output side of register 50 feeds back into the R-delay line, particularly into the line R'', also via the control logic 100. A state code decoder 70 is provided in the form of a plurality of "and" gates to produce individual output signals in response to the order or phase code presented at specific times by the V–Z register 50.

The entire computer is phased by the oscillator 31 serving as local clock and constituting the primary input source for a timing chain logic circuit 30 producing output timing signals, specifically the signals identified as P, F, G and I signal and their respective complements $\overline{P}$, $\overline{F}$, $\overline{G}$ and $\overline{I}$, which will be described more fully below and particularly with reference to FIGURE 3. The computer is completed by an input-output device 40 which includes elements to be described more fully below with reference to FIGURES 18, 19, 20, 21 and 22. Basically, unit 40 is comprised of means permitting the feeding of data into the computer and deriving data from the computer.

IDLE STATE

As an initial orientation, there shall be described with reference to FIGURE 2 how the two delay lines 10 and 20 are connected to form recirculating registers, thereby defining the idle state of the computer; particularly the R-delay line and the M-delay line are mutually disconnected when no arithmetic operations are in progress. Thus, the output transducer 22 of the R-delay line feeds whatever output signal it receives into the flip-flop Q.

More specifically, if the output signal of transducer 22 is at any given instant regarded as a "true" signal, such signal is effective at the set side input for flip-flop Q and at the next following clock pulse flip-flop Q will be set (if it was already set, there will be no change). When the output signal of transducer 22 at any instant is a "false" signal, such signal is inverted (inverter 22') and applied as gating signal to the reset input side of flip-flop Q, and at the next following clock pulse flip-flop Q will be reset; if it was already reset, no change in state occurs. The mode of coupling transducer 22 to flip-flop Q is a permanent one and no change in it occurs during operation of the computer.

The two output sides of the flip-flop Q, i.e., the set side output and the reset side output, are respectively connected to the set and reset input sides of the flip-flop R. The alternative mode of connecting flip-flops Q and R for such bit transfer was described above. The flip-flop R has particularly its set side output connected to the input line R'' which control the input transducer 21.

The connecting path between flip-flop R, and the transducer input runs through a multiple "or" gate 23. This "or" gate has as many inputs as are needed to feed different signals into the input line R'' of transducer 21 of the R-delay line. Gate 23 is thus connected by one input terminal to the output side of the R flip-flop as stated. However, there is interposed a gate illustrated symbolically as an "and" gate 24 having an inhibitor input terminal 25 which will receive an inhibiting input whenever the recirculation of the data bits in the R-line is not desired. In other words, recirculation of data through the R-line is always established unless the inhibitor input 25 receives a signal for interrupting this normal circulation. If we call a data bit that is set into the R-delay line, R'' and if we call a data bit held in the flip-flop R with the same symbol R, then the normal circulation in the idle state is represented in the equation $R''=R$.

Whenever in the description below there are described situations in which the input transducer 21 of the R-delay line is not directly controlled from the content of flip-flop R, then it is to be understood that for each and every one of these situations an inhibiting input for the gating terminal 25 of gate 24 is produced so as to block the path of normal data bit circulation as between the output of flip-flop R and input transducer 21. Conversely, it is understood that whenever an inhibiting input is not applied to terminal 25 and whenever gate 23 does not receive any other bit, the bit then in flip-flop R will be set into transducer 21. It should be noted that this general rule applies to periods of time of any length down to the period of the shortest order used here and introduced in the next chapter. Thus, the input for transducer 21 can be controlled that any two succeeding bits come from different sources; and this includes the recirculation of bits by opening gate 24 as well as inhibiting recirculation and substituting bits via alternative inputs of gate 23. It will be noted that the line R can be emptied simply by blocking gate 24 for the total delay period of the delay line without applying any bits to any of the input terminals of "or" gate 23.

In a similar manner, the M-delay line also recirculates its content during the idle state. For this purpose, the output transducer 12 of the M-delay line 10 feeds its signals to the M flip-flop. The connection between transducer 12 and flip-flop M is analogous to the input circuit of flip-flop Q. The set side output of flip-flop M connects through an "or" gate 13 and via an "and" gate 14 to the input line M'' of the M register or M delay line. Gate 14 is kept open whenever such recirculation is desired in an analogous manner. The equation $M''=M$ describes normal circulation of bits in the M line, with M'' used to designate a bit set into line M'', and M is a bit held in flip-flop M.

In specific situations and in a manner similar to that outlined above with reference to the R-delay line, other input signals are applied to the "or" gate 13 for the purpose of introducing such input signals into the M-delay line. It will be understood that concurrently with such an alternative operation a signal is developed operating as an inhibiting input for the input terminal 15 of the "and" gate 14 so as to inhibit such normal circulation of signals back into the M-delay line after their emergence, to be replaced by the alternative signals.

TIMING CHAIN

Figures 3, 4:
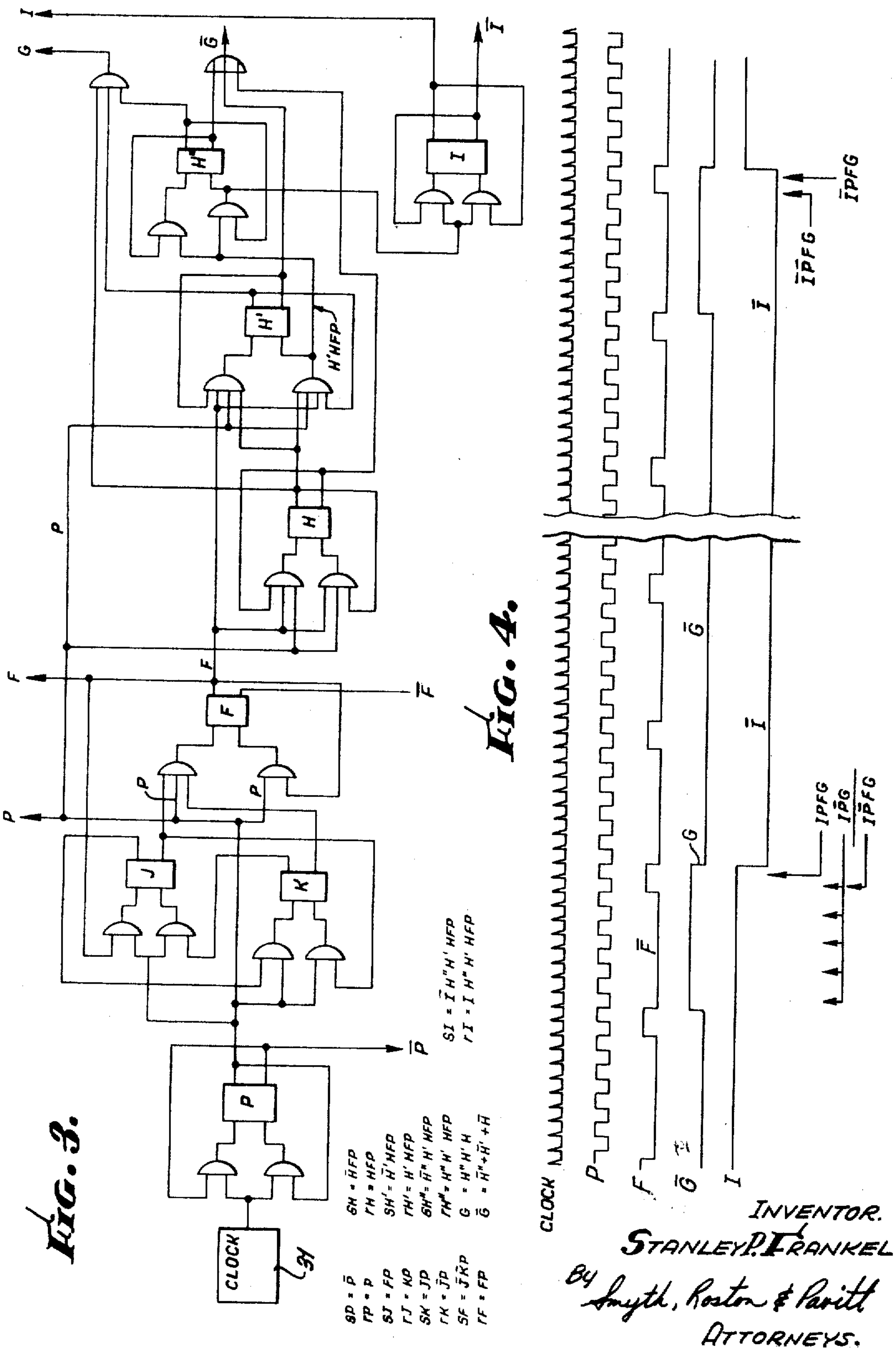
FIGURE 3 illustrates schematically the timing circuit network used to distinguish between various phases of data circulation in the two circulating registers.
FIGURE 4 illustrates a timing diagram of various timing signals produced by the circuit shown in FIGURE 3.

Before going into details with regard to interpretation of the operation of the general purpose computer which is the object of the present invention, it is necessary to describe briefly FIGURE 3 which illustrates the production of the several timing signals which have been briefly introduced above, namely, the signals P, F, G and I. The diagram of FIGURE 4 shows the durations of and relationships among these signals.

The timing chain is basically controlled by the oscillator 31 which, for example, may be an astable multivibrator or a conventional tuning fork type oscillator or quartz crystal, tuned to a frequency, for example, of 1 megacycle. The output of this oscillator 31 is connected to a toggle flip-flop P. Thus, with each oscillation of clock 31, the flip-flop P changes in state. Accordingly, at sequential clock pulses from the clock 31, the flip-flop P produces a signal P or the signal $\overline{P}$. The "bit periods" in which the P flip-flop is in its on state are called P bit periods, while those time periods in which the P flip-flop is off are designated $\overline{P}$.

The oscillator 31 provides a signal which occurs at the end of each bit period, and which causes the changes of the state of flip-flop P. The distinction between P and $\overline{P}$ bit periods is of vital importance for understanding the operation of the computer in accordance with the invention. In the following, a $\overline{P}$-bit period and the immediately succeeding P-bit period will also be called a P cycle.

The set side output of flip-flop P controls two flip-flops J and K interconnected in such a manner that the control of another flip-flop F causes division of the frequency of the train of P signals in the ratio of 1:5. FIGURE 4 illustrates the sequence of states of flip-flop F. Specifically, the signal F is true for one $\overline{P}$ and the succeeding P bit period. The flip-flop F is in the off state, i.e., the signal $\overline{F}$ is true, for four succeeding $\overline{P}$ bit periods and the respectively succeeding four P bit periods. In other words, the signal $\overline{F}$ is true for eight bit periods or four P-cycles, and the signal F is true for the succeeding two bit periods or one P-cycle. The four P-cycles in which $\overline{F}$ is true and the following one P-cycle in which F is true we call one F-cycle. The duration of an F-cycle is thus ten bit periods or five P-cycles.

The progression and states of these three flip-flops J, K and F can briefly be described as follows: K is set after J is on, J is turned off after K is on, K is turned off after J is off, F is turned on after both J and K are off, after F is on J is turned on and F is turned off. Of course, all of these operations are phased by the flip-flop P and clocked from clock 31.

The flip-flop F could be an asymmetrical, astable multivibrator which is driven by the falling edge of the flip-flop P output signals; such multivibrator has to have two different recovery times so that it spends four cycles of flip-flop P, for example, 8 microseconds, in its off state, while the other recovery time covers two bit periods in the on state. In this case, the flip-flops J, K could be omitted.

Next, there is provided a flip-flop I which is to be true for forty P-cycles, i.e., for altogether eighty bit periods which include forty P bit periods and forty interleaved $\overline{P}$ bit periods. The flip-flop I is subsequently to be false for the same period of time so that there is a true division in frequency as between the P and I in the ratio of 1:80.

Each change of state of flip-flop I takes place at the end of an F-cycle; i.e., at the end of a bit period in which both P and F are true. In the embodiment of the instant invention described here, the eighty bit periods during which I is true, or during which $\overline{I}$ is true, constitute eight F-cycles. This choice of the number of F-cycles over which flip-flop I maintains either state is a plausible and convenient one, but it is not essential to the practice of the invention. Other values for this number, either larger than or smaller than eight, may prove more convenient for particular uses. Nevertheless, for the sake of definiteness and simplicity of discussion, only the value eight will be considered here.

This frequency division is carried out by means of three flip-flops H, H', and H'' interconnected and connected to the flip-flops P and F in such a manner that they turn the flip-flop I on at a falling edge of a particular P signal and then the flip-flop I is turned off at the respectively succeeding fortieth P pulse. FIGURE 4 illustrates one complete cycle for the flip-flop I, covering altogether eighty P-cycles or one hundred and sixty bit periods. The flip-flops H, H' and H'', in addition are used to define the signal G. G is true when all of the flip-flops H, H' and H'' are in the on state while the signal $\overline{G}$ is true as long as at least one of the flip-flops H, H' and H'' is turned off.

Looking at FIGURE 4, it can be seen that the signal G is thus true for five P-cycles, specifically for the last five P-cycles of an I or of an $\overline{I}$ time period.

FIGURE 3 illustrates the realization of the equations written next to the figure whereby conventional symbols for logic "and" or "or" functions have been used which do not require detailed description. The circuit of FIGURE 3 is logically identical with the content of table next to it, and it is apparent to one skilled in the art in what way these equations can be implemented. At this point, it should be mentioned that whenever in the following description signals such as I, $\overline{I}$, P and $\overline{P}$, G and $\overline{G}$, and F and $\overline{F}$ are needed, it will be understood that the signals can be derived from the timing chain shown in FIGURE 3, particularly from the appropriate and corresponding output terminals of the flip-flops P, F, I, and of the gate assembly G and $\overline{G}$.

DEFINITIONS

After having explained the salient periods of time involved and to be employed in the present invention, it shall be explained in the following in what way data bit signals are grouped and organized for meaningful use. For this purpose, the following definitions are helpful and will be used. The terms "bit period" (determined by the output of oscillator 31), "P-cycle" (two bit periods) and "F-cycle" (ten bit periods) were introduced above. The bit periods are distinguished as P-bit periods and $\overline{P}$ bit periods.

The duration of each of the signals I and $\overline{I}$, these being of equal length is called a word period. Thus, each word period includes eighty bit periods and forty P-cycles. Restated, each word period includes forty P-bit periods, and forty respectively interleaved $\overline{P}$-bit periods. It is thus meaningful to distinguish among IP, $I\overline{P}$, $\overline{I}P$, and $\overline{I}\overline{P}$-bit periods, there are forty bit periods in each such group of bit periods; each group falling within either an I or an $\overline{I}$ word period.

Figure 2:
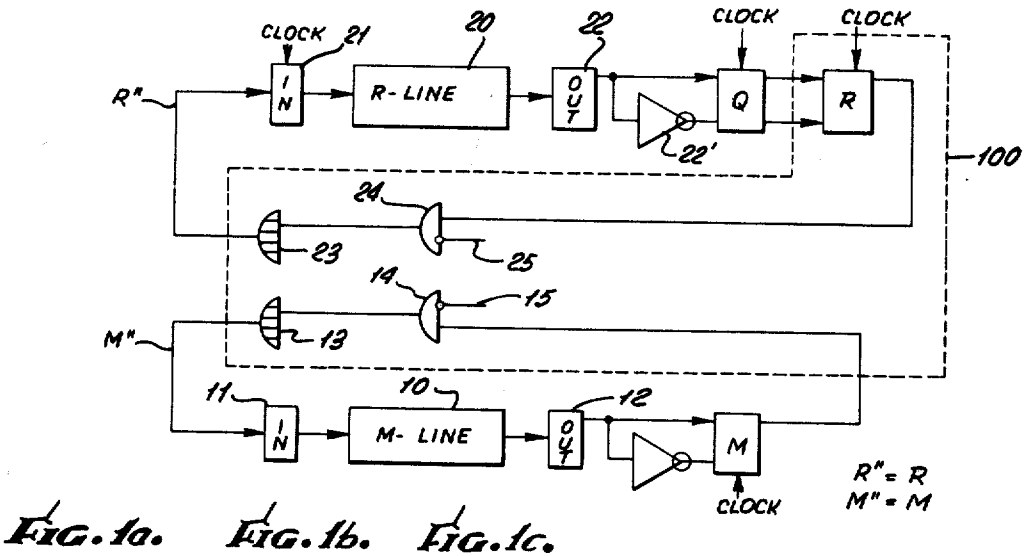
FIGURE 2 illustrates schematically the two circulating registers of the computer when decoupled.

The period of circulation of the R-line is called an "R-cycle." It is the period of time which elapses from inserting a bit into line R'' (transducer 21) until the same bit is again held in flip-flop R, by way of normal circulation as shown in FIGURE 2. The total duration of the R-cycle is exactly two word periods, i.e., 160 bit periods. Since at any instant, the flip-flops Q and R each hold one bit, the R-delay line together with its associated circuits has a delay period of 158 bit periods.

The period of time for circulating any one bit in the M-line when connected for recirculation as shown in FIGURE 2 is called an "M-cycle." For reasons discussed below, one M-cycle is an integral but odd number of word periods. The most convenient number of word periods in one M-cycle is not critical and may differ from one application to another. Moreover, the length of the delay line M may be adjustable. For a given clock, the length of the M-line; i.e., the duration of an M-cycle, basically determines the operational speed of the computer. On the other hand, this length determines the storage capacity of the M-line. Thus, selection of this length will result primarily as a compromise between speed and storage capacity, whereby the length of a program determines the minimum storage capacity. For definiteness and simplicity in the present description, one M-cycle is taken to be 22½ R-cycles, which is equal to forty-five word periods or 3,600 bit periods, or 1,800 P-cycles, or 360 F-cycles.

Up to this point, only periods of time have been defined. Next, it shall be described how these periods of time: bit period, P-cycle, word period, R-cycle and M-cycle are used to organize the flow of data bits. Data handled and processed by this digital computer are organized in "words" with each word being comprised of forty bits. This number is not critical per se but is convenient, and it is strictly related to the fact that according to the choice given above, each word period has forty P-bit periods and forty $\overline{P}$-bit periods.

It is now stipulated that at any location such as input and output sides of the delay lines, one data bit is present per bit period. Thus, 3,600 bits are circulated in the M register and 160 bits circulate in the R register. Forty bits are serially presented at any location at or in the delay lines during, for example, the $\overline{P}$-bit periods of an I word period while an additional forty bits are presented during the same I word period in the interleaved P-bit periods thereof. It follows that it is thus possible to select a specific location and to stipulate that all bits presented at that location during one word period as defined by an I or an $\overline{I}$ timing signal pertain to two distinct words. The bits of one word appear at that location during the P-bit periods, the bits of the other word appear thereat during the $\overline{P}$-bit periods.

Thus, data is organized in that at a specific and selected location all forty bits presented thereat during forty IP-bit periods pertain to one word, while bits presented interleaved during the $\bar{P}$ bit periods of the same I word period pertain to a second word. The 80 bits present at that location in a word period are to be called $\bar{P}$ bits and P bits depending on the time of presentation. The 40 $\bar{P}$ bits presented thereat during a word period I are collectively called an $\overline{IP}$ word, and the 40 P bits interleaved in the P bits constitute the IP word. During an $\bar{I}$ word period, the location presents forty P bits, defining an $\bar{I}P$ word, and forty interleaved $\bar{P}$ bits defining an $\overline{IP}$ word.

It will now be necessary to find at least one specific location which permits a meaningful correlation between data bits and bit periods in such a manner that any such forty bits defined at that location as constituting one data word can be traced subsequently throughout the computer. More specifiaclly, once a train of forty bits has been identified at the selected location, it must be possible to detect or retrieve these bits subsequently at the same or other locations in terms of bit-appearances at P, $\bar{P}$, I and $\bar{I}$ time periods. In view of the employment of delay lines and of the serial presentation of data bits at various locations for purposes of processing, it must be possible to control any processing of the bits of any word by phasing and timing signals I, $\bar{I}$, P and $\bar{P}$ regardless of the time that has elapsed since the initial identification of any word at that reference point.

It is apparent that the selection of R and M cycles as integral multiples of word periods greatly facilitates the selection of this reference point. As one such location or reference point, the input line R″ is selected, and all bits presented to line R″ during the time periods identifiable in terms of P, $\bar{P}$, I and $\bar{I}$ are identified in like terms. That this selection is meaningful is not self-evident, but has to be developed by considering the results. Particularly, it has to be determined that any data word so identified can readily be traced unambiguously throughout the computer.

Reference is thus made first to FIGURE 2 showing normal circulation. By using the definition above, it appears that the flip-flop R controls the content of what is fed to line R″ during normal circulation. For example, a bit presented during the 10th P-bit period of an I word period is the 10th P bit of an I P word. Considering now that the R register has a recirculation time of 80 P-cycles (or 160 bit periods), it is apparent that during the 10th P-bit period of the next I word period the same bit is stored in the R flip-flop and applied to line R″. Of course, the same consideration will be true for any bit circulating in the R-register. Thus, as far as the content of the R register is concerned, this correlation of bit periods and data bits is meaningful, since it reproduces the same bit during the same bit periods at the periodic R cycle rate which is precisely the I–$\bar{I}$ oscillating rate. Hence, a word held in flip-flop R is readily traceable regardless of the duration of circulation.

In the following, it will thus be necessary to observe carefully these distinctions: There are time periods, in general identified by timing signals IP, $I\bar{P}$, etc.; and there are bits such as P-bits or $\overline{IP}$ bits, etc., deriving their designation solely from the time of actual or possible presentation at line R″. Whenever we speak of a P-bit held, for example, in flip-flop Q, or travelling in the R-delay line, etc., this always will mean that such a bit will normally be presented in line R″ during a P-bit period.

In view of the fact that bits are often modified before being recirculated (doing nothing but recirculating is, of course, senseless), the following points though possibly apparent are emphasized.

Any bit presented in the R″ line will be set into flip-flop Q after 159 bit periods. Thus, a specific P bit, for example, will be in flip-flop Q during the $\bar{P}$ bit period which precedes the P bit period during which, in the case of normal circulation, said bit would appear in flip-flop R and line R″. Thus, any bit once set into the R-delay line will reappear in flip-flop Q 159 bit periods later regardless of whether or not it is recirculated subsequently. This is important for bit and word tracing particularly because any data modification will occur either as bits are set into input line R″ or as they are drawn from flip-flop Q.

The primary storage device of the computer is the M register. The word definitions given above can be transferred here by stipulating that in case a word is to be transferred from the M register to the R register, flip-flop M will be coupled to line R″ so that the word then flowing into the line R″ is an IP or an $I\bar{P}$, etc. word depending upon the time of presentation of such bits at line R″. Conversely forty P bits, for example, presented during an I word period and at a time when flip-flops Q and R are connected to each other as shown in FIGURE 2, can be transferred into the M″ line as an IP word.

As was mentioned above, an M-cycle has an odd number of word periods, while an R-cycle has an even number of word periods, namely two. This means that any word which at any instant emerges from the M-register/M flip-flop during, for example, an I-word period, will after a complete M-cycle appear serially in flip-flop M during an $\bar{I}$-word period, and after another M-cycle it will appear again as an IP- or $I\bar{P}$-word. Also, a word set into the M line during an I-word period, will emerge from the M line after one M-cycle during an $\bar{I}$-word period. If recirculated, the word will again emerge during an I-word period after another M-cycle.

This change of word type does not break the association of data bits and bit periods, but it is simply being stated that an IP- or $I\bar{P}$-word is presented as an $\bar{I}P$- or $\overline{IP}$-word after one M-cycle. This change is not only not confusing but convenient since it permits any word in the M-register to be transferred as an I or as an $\bar{I}$ word to the R-register if the programmer so desired. Thus, tracing of a word as it circulates through the M-register is not impeded. As will be described below, waiting periods can easily be established, permitting presentation of any word by the M-register as an I or an $\bar{I}$ word.

No change in word type occurs during circulation in the R-register, and it remains meaningful to speak here of IP, $I\bar{P}$- and/or $\bar{I}P$-$\overline{IP}$-words for as long as any such word remains in the R-register. Any word passing at the same time periods through the M-flip-flop will be designated in the like manner regardless of the fact that after one M-cycle there will be a change.

Looking at the timing diagram shown in FIGURE 4, it can be seen that, for example, during an I-word period the last bit period is a P-bit period, so that the last bit presented in flip-flop R during the I-word period is the last bit of IP word. This is established specifically by a coincident signal IGFP defining in time presentation of this last bit of the IP word in flip-flop R. This bit (a P-bit) was in the Q flip-flop during the preceding $\bar{P}$-bit period. The last bit of the IP word is in flip-flop R during the time IGFP, provided there is normal circulation. The same bit was in flip-flop Q during the preceding $\bar{P}$-bit period. The first bit held in flip-flop R during the $\bar{I}$ period is the first bit of the $\overline{IP}$ word, and the immediately succeeding bit is the first bit of the $\bar{I}P$ word.

WORD FORMAT

It is convenient to think of the words used as divided into two classes: number-words and instruction-words. Those words which are intended for use in arithmetic processes and have some numerical significance are number-words; those intended to be set into the instruction register are instruction words. This is not an inflexible distinction, since here—as in other stored program digital computers—it is possible and often convenient to use arithmetic operations to modify a word which is later used as an instruction word. This distinction, moreover, has to do only with the intention of the programmer and not with any "physical" difference. We consider here only numbers which are intended for use in quite simple ways.

A number word may be used to present a positive integer as a simple integral binary expansion. The least significant bit has the "position value" of unity, the second least significant has the position value 2, the next 4, etc. Finally, the most significant bit has the position $2^{39}$. Any integer from zero up to $2^{40}-1$ may be represented in this way. It may be noted that $2^{40}$ is slightly (about 10%) larger than $10^{12}$, thus the 40 bits of a word are sufficient to represent all of the integers which could be written in the decimal system with twelve digits, or fewer. A number word of this kind will be written as a series of 40 binary digits (bits), each of which may have either of the values 0 or 1. As an example, the number one-thousand ($10^3$) takes the form:

$10^3$ (dec.) = 00000 00000 00000 00000 00000 00000 11111 01000

(successive groups of five bits are separated by a space for ease of reading). The most significant bit has been written on the left, the least significant bit on the right, in agreement with the customary way of writing numbers in the decimal system. In agreement with that custom, we will speak of the leftmost (most significant) bit as the "first" bit of the number, the rightmost (least significant) bit as the "last." It should be noted, however, that the actual order of circulation of the bits of a word is from least to most significant.

If it were desired to emphasize the fact that a number word represents an integer, it might be written with a "binary point" to the right of the least significant bit. It should be remembered, however, that the binary point does not represent any physical occurrence within the computer; it is merely a written reminder of the interpretation which the programmer has chosen to place on that number.

A number-word may also be used to represent a positive proper fraction; that is a number smaller than unity. It is then convenient to assign the position-value ½ to the leftmost (most significant) bit (first time), ¼ to the second bit from the left, etc., to the last (least significant) bit with the position value $2^{-40}$. If it is desired to emphasize the fact that this interpretation is being placed on the number, a binary point may be placed to the left of the first bit, as in the following example:

$10^{-1}$ = .00011 00110 01100 11001 10011 00110 01100 11001

Many other positions may be assigned to the binary point, and other interpretations of a number word may be used, as will be discussed further in connection with the arithmetic operation.

Before proceeding with the description of the invention, it is necessary to describe why (1) the instant computer can be regarded as falling in the class of general purpose computers and (2) what is meant by an "instruction" word. Without attempting to give any general definition of the term "general purpose computer," the present computer is of the type that requires storing of a program. The program is a sequence or group of code signals externally compiled and suitably fed into and stored in the computer. Each code signal causes the computer to perform a specific operation such as shifting of data (number words) into or out of a specific register or adding the content of one register to another register, etc.

Computers with core memories often have a portion of the core memory used for storing this program, i.e., this plurality of codes. The program in the computer is usually presented by a plurality of what are called "instruction words." Each instruction word consists of a plurality of bits and basically comprises two portions. One is the instruction or operation code, i.e., the code mentioned above and which when detected and decoded enables the computer to perform a specific task well defined by the code. The other portion of the instruction word is often the code for the address location in the core memory which contains the operand upon which the operation as defined by the respectively associated instruction or operation code is to be performed. Upon executing the program, the computer with such core memory executes these instructions in a particular sequence.

For the instant computer, the "instruction" word is used in the different manner. The instruction word can be considered as consisting of eight groups of five bits each. Such a five-bit group will in the following be called "syllable."

The assembly of eight "syllables" into an instruction word is merely a matter of convenience of format. An instruction word as a whole has no definite, uniform purpose—it does not define one step of program execution. The five bits in each syllable of an instruction word define an "order" or a "count number." The primary function of the computer is the execution of "orders." An order is a five-bit code presented during or in a syllable. Each such order code has a different meaning and can be to some extent compared with the instruction code in a conventional computer which is capable of causing the computer to perform a specific function. The several orders in an instruction word thus represent a subprogram.

The register 50 was introduced above to hold state signals during computer operation. Order codes are such state signals. An order code is held in register 50 while such order is executed. In the R-delay line, the $\overline{IP}$ word is always an "instruction word." The $\overline{IP}$ word, as all other words, is comprised of forty bits presented in the R flip-flop during the $\overline{P}$-bit period in an I-word period. This does not exclude the possibility that some other words within this R-register may also serve as instruction words. However, at no time will the $\overline{IP}$ word be anything but an instruction word. As stated, an order which is currently executed is held in the register 50. It will be described below with reference to FIGURE 5 how the individual orders of an instruction word are transferred from and to the $\overline{IP}$ word held in the R-register, to and from register 50. During computation, many different instruction words will be placed into the $\overline{IP}$-register portion of the R-register, and most of them will normally be stored and circulate in the M-register or delay line. The transfer of such words will also be discussed below with reference to FIGURE 7 et seq.

Reference is made more specifically to the order code table in FIGURE 6. The order codes presented in this table are organized in columns designated with V, W, X, Y and Z. The similarity in code symbol designation as compared with the V through Z flip-flop constituting the register 50 is not accidental, but whenever an order is stored in the V–Z register 50, the flip-flops V through Z will be in states described by the respective bits of the order codes shown in the table. The sixth column labelled E is not part of the order code proper but designates the state of flip-flop E during execution of an order.

The order codes are organized into three groups. One group is called "single" orders as an indication that such an order requires for its placement into the V–Z register and for its execution precisely one R-cycle. Placement of a single order in the V–Z register occurs in an I word period while such order is executed in the succeeding $\overline{I}$ word period. A second group is called "double" orders, and placement and execution of each requires two R-cycles. "Single" and "double" orders are also called "short" orders. The third group is called "long orders."

After an instruction word has been brought into the R-register to be held therein as the $\overline{IP}$ word, its orders (or some of them) are executed in the order of their occurrence in the instruction word as it was held in the M line. The execution of each short order depends only on its order code, i.e., the code signal controls the entire execution. The execution of a long order, on the other hand, depends not only on the order code, but also on a count number. As the long order code circulates through M and R registers, the count number accompanies such long order code in that it precedes the long order in time in the next syllable of the same word. Even though a count number has the same format as an order, i.e., it is a five-bit code signal, count numbers and orders must be distinguished carefully. The reason why a count number must precede its associated long order code comes from the format of circulation; the order codes in the $\overline{IP}$ word are executed in the inverse order of their circulation.

After such a long order code has been placed into register 50, the count number is used to control the duration of execution of the long order. Specifically, the duration of the period or execution of the long order is metered by the numerical value of this count number together with one bit of the order code. The particular activities carried out during the period of execution are determined by the remaining four bits of the long order code.

The count number is a binary number expressible by the five bits of a syllable. Considering briefly the general format of an instruction word, the first (leftmost) syllable of an instruction word held in the M line for placement into the R register when needed is always an order, and not a count number. The syllable following (standing to the right of) a short order is also an order. Similarly, the syllable following a count number is an order. The syllable following a long order, however, is not an order but is the count number associated with that long order.

After an instruction word has been brought into the $\overline{IP}$-portion of the R-register, its various syllables changes their relative positions and sometimes their values, but not their individual identities. It is by reason of these changes that the distinction between orders and count numbers is most conveniently based on the form of the instruction word before it has been brought into the instruction register. The following is an illustrative example of an instruction word and its eight syllables.

| | |
|---|---|
| 00101 | Subtract. |
| 01100 | Exchange. |
| 01101 | Single shift. |
| 11000 | Wait. |
| 11000 | 24. |
| 10111 | Record double. |
| 10101 | Fill. |
| 00000 | Blank. |

It will be observed that the long order Wait and its associated count number of this example have exactly the same code. Thus, the inventive computer includes circuitry which interprets any five bit code which succeeds a long order, as a count number, which, in turn, means that any count number must never be interpreted as an order. There is one exception in this rule, namely, a count number 00000 can be interpreted as an order, the order Blank. No activity is performed when the order Blank is in the order register; a count number having the same code will when interpreted as an order likewise cause no activity.

The execution of many order codes involves one or more words of the M line. Which word or words are thus involved depends on the time of execution of the order, in relation to the cyclic presentation of all words circulating in the M line, in the flip-flop M during any phase of an M cycle. Thus, the words processed depend on the durations of the periods of execution of that order and of those previously executed. These, in turn, depend on the type of orders—single, double, or long and, in the case of long orders, on the count numbers. Two of the long orders, the "Wait orders" serve only the purpose of allowing whatever time is desired by the programmer to elapse before the execution of the following orders.

The activities involved in the execution of the various orders are described throughout the remainder of this specification.

ORDER CYCLING

For the first part of this discussion of the cycling of orders in the instruction register and the V–Z register, and of the execution of these orders, it will be assumed that the full computer memory has been loaded with data, consisting of number words and instruction words, and that there has been brought into the instruction register—that is, into the $\overline{IP}$ part of the R-register—an instruction word which consists of eight syllables.

Any order requires for its execution temporary static storage and must for this purpose be withdrawn from the instruction register part of the R-delay line. This is the first basic operation of the control logic circuit 100 within the computer, i.e., the withdrawal of an order from the R-delay line or register and its reinsertion therein after execution. Furthermore, an order must be stored and held statically for a period of time sufficient for its execution prior to its reinsertion into the R line. The V–Z register 50 and the control logic specifically illustrated in FIGURE 5 serves this purpose.

The following facts are significant for understanding specific distinguishing features for the order codes. All single orders are identified in that for all of them $\overline{V}$ or $\overline{WX}$ is true. All double orders are collectively identified by the fact that $V\overline{WX}$ is true. All long orders are distinguished by VW being true. The simplicity of these distinctions facilitates understanding of the control operations for the order cycling process.

Proceeding now to the description of FIGURE 5, the execution of each order requires that the order code be stored in the V–Z register 50 for a period of time sufficient for the execution of the order then stored. As was mentioned above, order codes are assembled in instruction words, and the $\overline{IP}$ word circulating in the R register is such an instruction word. The network shown in FIGURE 5 is specifically destined to withdraw a particular order code from the $\overline{IP}$-word then circulating in the R register.

The flip-flops V, W, X, Y and Z are interconnected to form a conventional shift register circuit configuration with the set and reset side outputs of a flip-flop serving as gating signals for the set and reset input sides of the respectively succeeding flip-flop of the chain. In this chain of flip-flops, V is the first and flip-flop Z is the last one. The clocking or shifting signal for this shift register is a signal called $\overline{IP}.\overline{E}$. The $\overline{IP}$ pulse train is derived from the timing chain shown in FIGURE 3. It can be said that this constitutes a pulse train consisting of forty pulses which are true during the $\overline{P}$ bit periods of an I-word period. The gating signal $\overline{E}$ shall at the moment considered to be true, how it is developed will be discussed shortly hereafter. Thus, during the $\overline{IP}$-word period, the "and" gate 51 furnishes forty shifting pulses to a line 52. As shown in FIGURE 5, the R flip-flop is connected to flip-flop Q in the normal manner, so that by definition, flip-flop R will hold during the I-word period in succession all forty $\overline{IP}$ bits of the $\overline{IP}$ instruction word. Unlike FIGURE 2, the output of flip-flop R now connects to the input of flip-flop V.

The first IP-bit (see FIGURE 4) that emerges from flip-flop R is shifted into the V flip-flop. The clocking signal is applied to all other flip-flops of this V–Z register. At the beginning, i.e., with the presentation of the very first $\overline{IP}$ bit in flip-flop R, the flip-flops V–Z may contain bits defining an order which presently is of no concern. However, in the chapter "Loading Mode," it will be explained briefly how order cycling is set into motion initially. As the first bit is shifted from flip-flop R into flip-flop V, the bit that was in V is shifted to W, etc. Turning now to the output side of flip-flop Z, it is connected via an "and" gate 53 to one terminal of the "or" gate 23 which was introduced above as governing the input transducer 21 for the delay line. The gate 53 receives also gating pulses $\overline{IPE}$, so that at the first one thereof the bit previously held in flip-flop Z is now shifted into the R delay line.

From the description of FIGURE 2, it will be remembered that during normal circulation, the content of the R flip-flop is shifted back into the R delay line directly via the transducer 21 and the "or" gate 23. Now, in the particular situation considered here, the $\overline{IP}$-bit in the R flip-flop is not shifted into the R delay line, but into the V flip-flop while the content of the Z flip-flop is shifted into the R-line instead of the bit just withdrawn from the R register. The gate 24 is blocked (inhibited) during the $\overline{IP}$-bit periods, but opened during the IP-bit periods interleaved in the $\overline{IP}$-word. Thus, the circulation of the IP-word presented during the same I-word period is not impaired; only bits from the $\overline{IP}$-word are withdrawn from the R-register.

It can be seen that as the second $\overline{IP}$-bit is shifted into the V flip-flop, the first $\overline{IP}$-bit will be shifted into the flip-flop W. Next, it will be shifted into flip-flop X, then into flip-flop Y, into flip-flop Z and then back into the R delay line. This means that the first $\overline{IP}$-bit is recirculated into the R line, but is delayed by five P-cycles. The reloaded $\overline{IP}$-word has as its first syllable the five bits constituting the previous content of the V–Z register. Then the sixth through tenth $\overline{IP}$-bits will now be what was previously the first through fifth $\overline{IP}$-bits.

Thus, after forty $\overline{IP}$-bit periods, the fortieth (last) $\overline{IP}$-bit is shifted into the V flip-flop. The W flip-flop then contains the thirty-ninth, the X flip-flop the thirty-eighth, the Y flip-flop the thirty-seventh, and the Z flip-flop the thirty-sixth bit of the previous $\overline{IP}$-word. Now, approximately at that instant, I turns false, since I is true only during forty $\overline{P}$-bit periods. Thus, after these forty $\overline{IP}$-bits clocking for the register 50 ceases, and the last five bits of the $\overline{IP}$-word remains in the V–Z register.

As was stated above, the $\overline{IP}$-word, i.e., the instruction word, is organized as an assembly of eight syllables, each of which is composed of five bits defining an order or a count number. It can be seen that now the content of the last (i.e., leftmost) syllable of the $\overline{IP}$-word as it circulated initially has been loaded into the V–Z register. The bits now held in the V–Z flip-flops must define an order and not a count number as a count number, other than zero (decimal), should never be held in the V–Z flip-flops at the end of an I-word period. Each of the other orders (or any count number) in the $\overline{IP}$ word has been shifted (delayed) by one order place (5 P-cycles) leftward and the very first, rightmost order position of the newly established $\overline{IP}$ word is filled with the previous content of the V–Z register.

FIGURE 5*a* schematically illustrates this reorganization of syllables. The $\overline{IP}$ word that emerged at the beginning of the I-word period is comprised of orders "1" through "8" placed in syllable of like designation with an order "9" (not shown in FIGURE 5*a*) being defined by the five bits previously held in the V–Z register. The orders pass through flip-flop R in sequence and in the order of their numerical designation. FIGURE 5*b* shows the format of the $\overline{IP}$-word as it is reinstated into the R-line; order "9" is now in the first syllable of the $\overline{IP}$ word, and each order is shifted to the left (delayed) by five P-cycles (duration of one order) i.e., it is relatively delayed by this time prior to insertion into the R-delay line, while order "8" is left in the order register 50. Specifically, FIGURE 5*b* illustrates the $\overline{IP}$ word organization when this word emerges bit-by-bit from the R-register (R flip-flop) at the next I-word period.

The order newly shifted into the V–Z register remains therein throughout the following $\overline{I}$-word period. Assuming that the $\overline{E}$ signal remains true throughout this operation, it will be seen that after this I-word, and at the very first $\overline{IP}$-bit period, the order in the V–Z register is shifted out of the V–Z register 50 to take the place in the rightmost syllable of the $\overline{IP}$ word. Additionally, all orders in the $\overline{IP}$ word are relocated for the space of one syllable and another order (order "7") remains in the V–Z register at the end of the $\overline{IP}$-word period.

Thus, it can be seen that altogether nine orders can be recirculated. Each order remains in the V–Z register for one $\overline{I}$-word period. If at the beginning of the next I word period still $\overline{E}=1$, shifting of orders will be resumed to put the order code previously held in the V–Z register into the first order space or syllable of the recirculated $\overline{IP}$-word, while the last order to emerge from the R delay line is loaded into the V–Z register, to remain therein for the duration of the succeeding $\overline{I}$-word period. After nine R-cycles of $\overline{E}=1$, the original content of the V–Z register is restored, and the $\overline{IP}$-word has its original configuration. In this way, the orders are cyclically permuted through the $\overline{IP}$ instruction register of the R register.

Here it should be emphasized that the syllables have been numbered in the order of their emergence from the line in one I-word period. The sequence in which they are "used" is opposite to that.

The aforedescribed events are true only as long as the syllables of the instruction word hold only orders and not count numbers, and if all these orders are single orders. All of the single orders listed in the table of FIGURE 6 require for execution no more than the one $\overline{I}$-word period during which they are held statically in the V–Z register. Thus, any single order will be placed into register 50 during one I-word period, the order will be executed during the succeeding $\overline{I}$-word period and such order will be replaced by another order in the next following I-word period. It will be verified below when the single orders and the execution thereof are discussed in detail with reference to FIGURES 7 through 11 that they require but one $\overline{I}$-word period for execution indeed.

It will be appreciated from the foregoing that the cyclic permutation and the shifting of a new order into the V–Z register 50 during each R-cycle can be inhibited by turning the $\overline{E}$-signal off. In other words, by turning flip-flop E on, the time during which an order remains in the V–Z register can be extended so as to extend the time for execution thereof. This is necessary for all orders which are not single orders. Therefore, we proceed now to the description of the control circuit for the flip-flop E also shown in FIGURE 5.

It can be seen that the input circuit for the setting of flip-flop E is comprised of a number of "and" gates. Of primary significance is the "and" gate 55, which upon coincidence at its inputs produces one of the signals which turn flip-flop E on and thereby remove the $\overline{E}$ signal from the gate 51.

The signal produced by gate 55 is the first term of the logic equation expressing the setting signal of flip-flop E, which may be described as follows: $sE=\overline{E}\ IGFP\ (VW+\overline{VW}X)+\ldots$ (Spaces have been introduced in this expression to indicate the separation of the three inputs to the "AND" gate 55.) The first input to gate 55 is the signal $\overline{E}$ indicating that flip-flop E is in the off state. The second input is the signal IGFP which is true during the last bit period of an I-word period. As order shifting is carried out during an I-word period and involves any $\overline{P}$ bits, a new order is clocked into the V–Z register at the clock pulse terminating the IGF$\overline{P}$ bit-period. Hence, signals E and IGFP are true in the bit period (IGFP) immedatiely following the completion of the shifting of a new order code into the V–Z register 50. The third input to gate 55 is indicated by the expression $(VW+V\overline{W}X)$. It is the signal produced by the "or" gate 56 and indicates that the order code held in the V–Z register represents either a long order or a double order. Thus, the output of "or" gate 56 is true when this order is not a single order. If a double or long order is held in the V–Z register 50, at a time IGFP when flip-flop E is off, then gate 55 produces a signal causing flip-flop E to be set on at the end of that bit period.

The first input to the "or" gate 56 is produced by the "and" gate 57 and is represented by the expression VW. It indicates that the V–Z register holds the order code of a long order. The second input of gate 56 is produced by the "and" gate 58 and is represented by the expression $V\overline{W}X$. It indicates a double order code held in the V–Z register.

When a double order code is held in the V–Z register, flip-flop E remains on for two word periods, i.e., for one R-cycle, and is then reset at the next succeeding time IGFP. The reset input of flip-flop E is produced by the "or" gate 59, the first input to which is the output signal of the "and" gate 61. That signal is described by the expression: $rE=E\ IGFP\ V\overline{W}X+$. . . . The first input to the "and" gate 61 is the signal E indicating that flip-flop E is in the on state. The second input is the signal marking the IGFP-bit periods. The third is the signal, indicated by $V\overline{W}X$ and produced by the "and" gate 58, which shows the presence of a double order code in the V–Z register. A double order code is thus held in the V–Z register for three word periods with flip-flop E being on during the first two of these. The second of these three word periods is an I-word period in which order cycling is suppressed by reason of the on state of flip-flop E.

COUNTING FOR LONG ORDERS

After the introduction of a long order code into the V–Z register 50, flip-flop E is set on, as described earlier, and remains on for one or more R-cycles. That period of time during which E is on is the period of execution of the long order. It is metered by a counting process which involves the count number associated with that long order and the state of flip-flop Z of the V–Z register. Flip-flop A also takes part in the counting process. The counting process is described in detail in the following paragraphs: for the present, it suffices to note that the condition for terminating the period of execution is that both flip-flops A and Z are in the on state at the end of an I-word period; i.e. in an IGFP bit period. That termination of the execution of a long order is expressed by the second term of the logic equation for the resetting signal of flip-flop E as follows: $rE=\ldots+IGFP\ VW\ A\ Z+\ldots$. The signal which brings about this termination is formed by the "and" gates 66 and 67. Gate 66 has the four inputs, E, IGFP, A, and the signal VW produced by gate 57 and indicating the presence of a long order code in the V–Z register. The output of gate 66 is the first input of "and" gate 67. The second input is the signal Z indicating the on state of flip-flop Z.

We turn now to the counting process by which the duration of the period of execution is determined. It was indicated earlier that a long order is associated with a count number which follows the long order. The term "follows" is used here in the sense of the order in which the various order codes of an instruction word are cycled into the V–Z register. It should be noticed, however, that this is opposite from the order in which the various syllables of an instruction word held in the R register to be presented by flip-flop R within an I-word period.

Turning for a moment to FIGURES 5*a* and 5*b* and assuming that syllable "8" holds a long order, then syllable "7" holds a "count number." FIGURE 5*b* illustrates the order arrangement when the long order is in the order register 50. Thus, count number "7" is passed as last syllable through the flip-flop R. Order cycling is inhibited when a long order is held in the V–Z register, the count number is in flip-flop R during the five bit periods time $IG\overline{P}$ (see FIGURE 4), and unless otherwise modified, these as all other $I\overline{P}$ bits in the R register would be set directly into the R delay line for normal circulation. However, the process called count number incrementing and described below modifies these five bits.

Before going into details of the circuit diagram of the counting process, the counting process itself shall be described in greater detail. After a long order has been cycled into the V–Z register, its associated count number is presented by flip-flop R in the last five $\overline{P}$-bit periods of an I-word period. These last five $\overline{P}$-bit periods of an I-word period may be indicated by the expression $IG\overline{P}$, since the timing signal G is true during the last five P-cycles of each word period.

The count number is an integer, in the range zero to thirty-one inclusive, represented by five bits. The first (in time) of these five bits is the least significant bit of the count number, with the position value 1. The next bit, i.e., the bit presented in the following P-cycle, has the position value 2. The bit of the count number presented next has the position value 4, the next has the position value 8, and the last bit (last in time), which is presented at the time $IG\overline{P}$, has the position value 16. The count number is the sum of the position values for those bits having the values 1. Thus, if each of the five bits has the value 0, the count number is zero. If all of them have the value 1, then the count number has the value $1+2+4+8+16=31$. Considering all possible combinations of values, 0 or 1, for the five bits, it may be seen that the count number may have any value from 0 to 31, inclusive.

The execution of the long order held in the V–Z register extends over the period of time during which E remains on. That period of time is a number of R-cycles, that number depending on the count number and on the Z-bit held in the V–Z register 50. We shall first consider the simpler case, that for which this Z-bit has the value "one." In that case, the number of R-cycles in the period of execution may be written as:

Number of R-cycles in period of execution$=(32-c\#)$ where here the symbol, $c\#$, represents the value of the count number at the time at which the long order was set into the V–Z register. To meter this period of execution, the count number in the last syllable of the $I\overline{P}$ word in the R register is not recirculated unchanged, as are the other syllables of this instruction word. Instead, it is increased by one in each R-cycle of the period of execution. The count number that accompanies a long order in an instruction word, will always be the number expressed by the last syllable of the instruction word in each R-cycle of the period of execution of such long order. The count number has a fixed and predetermined value prior to the loading of the associated long order in the register 50. The count number is changed subsequently thereto. Thus, for example, if the instruction word as it is first placed in the R register as $I\overline{P}$-word thereof, contains a long order (having an order code for which $Z=1$) accompanied by a count number having the value eight; then in the first R-cycle of its period of execution that count number is increased to nine, in the next, it is increased to ten, then to eleven, etc. Eventually, the count number exceeds the capacity of a five-bit syllable, namely the binary number 11111 which is the decimal number 31—and at that time the period of execution of the long order is brought to an end.

It may be seen from the above description that in the period of execution of a long order, its (original) count number is progressively increased by one in each R-cycle until it reaches and exceeds the capacity of a five-bit syllable, and at that time the period of execution is terminated. In the last R-cycle of the period of execution, the last syllable of the instruction word as it is presented by flip-flop R in the bit period IG$\overline{P}$ has the value 11111. The attempt to augment this number by unity causes the recording into the R line (in the $\overline{P}$-bit periods of the last syllable of the I$\overline{P}$ word) of the bits 00000. Since at that time the period of execution is terminated, the entire effect of the execution of a long order on its count number is to bring it to the value zero.

Serial adding, in general, is carried out by combining three signals, the augend bits, the addend bits and carry bits. Normal serial addition will commence with a carry bit value "zero" while the least significant bits of augend and addend are combined to form a sum bit. By beginning the adding with a carry bit value of "one" and using an addend having only zero bits (i.e. using no addend at all), the augend is effectively incremented by "one."

Flip-flop A serves as a carry flip-flop in the incrementation of the count number. It is set on prior to the presentation of the count number in flip-flop R. It remains on so long as bits of the count number having the value one are presented; after a bit with the value zero has been presented, however, it is reset to zero and remains reset through the presentation of the remaining bits of the count number. For as long as A remains set, each bit of the new count number is the complement of the corresponding bit of the previous count number; after A has been reset, the bits of the new and old count numbers are alike.

It is apparent that flip-flop A now conveniently fulfills its double role. It serves as carry flip-flop for the incrementing-by-unity process. The carry bit initially put into flip-flop A is "carried" as long as the count number bits presented by R have value "one." The first count number bit value "zero" encountered extinguishes the carry bit (resetting of flip-flop A) and thus $\overline{A}=1$ at time IGFP, flip-flop E will not be reset. Only when the count number presented by flip-flop R has decimal value 31, the carry bit will be carried over and it is the overflow carry bit that actually becomes effective at gate 66 to terminate the counting process and long order execution time (subject to the condition $Z=1$). These activities are described in the logic equations, and implemented in circuits, as follows:

The setting of A prior to the last syllable period of an I-word period during the execution of a long order is expressed by the term $$sA=I\overline{G}E\ VW+\ .\ .\ .$$

The signal, thus represented, which causes the setting of A is produced by the "and" gate 63. Its four inputs are the signals; I, $\overline{G}$, E, and the output of gate 57 which indicates that a long order is held in the V–Z register. Hence, an initial carry bit is introduced indeed.

The bits of the count number are presented by flip-flop R during the bit periods G$\overline{P}$ of an I-word period in which E is on and the V–Z register holds a long order code, as indicated by the true value of the signal produced by the "and" gate 57. The appearance of a zero value among the bits of the count number is shown by the truth of the signal $\overline{R}$ at such time. Accordingly, the resetting of flip-flop A on the appearance of a zero bit in the count number is represented by the folowing term in the logic expression for the resetting of A: $rA=IG\overline{P}E\ \overline{R}+\ .\ .\ .\ .$ The signal which causes the resetting of flip-flop A is produced by the two "and" gates 64 and 65. Gate 64 produces the signal IG$\overline{P}$E as the coincidence of its four input signals I, G, $\overline{P}$, and E. The "and" gate 65 forms the coincident of IG$\overline{P}$E with $\overline{R}$, the false or reset side output signal from flip-flop R. It is to be remembered that the flip-flop A, like the other flip-flops, has clocked inputs so that this resetting takes effect after—not during—the IG$\overline{P}$ bit period in which the zero bit of the count number is presented.

In each bit period, one bit is inserted into the R delay line; that bit is given the name R''. In normal recirculation the bit held in flip-flop R has recently emerged from the line and is reinserted therein, as described by the equation:

$$R''=R \text{ (during normal recirculation)}$$

In the bit periods in which the count number is being presented by R during the period of execution of a long order, as at other times, the bit to be set into the R line may differ from that held in R. R holds a bit of the previous count number; that is the count number prior to the incrementation then in progress. Input line R'' is to receive the corresponding bit of the newly incremented count number which may or may not have the same value as that held in flip-flop R. Specifically, the two will differ in each bit period (of those for which IGPEVW is true) in which flip-flop A still retains the value one; that is, prior to the extinguishing of the carry bit. In those bit periods, the bit of the prior count number, R, is complemented before reinsertion into the delay line. This departure from normal recirculation is expressed as follows:

$$R''=\overline{R} \text{ where (IG}\overline{\text{P}}\text{E VW A) is true}$$

The signal expressing the condition (IG$\overline{P}$E VW A) is formed by the "and" gate 71 which has three inputs. The first is the signal IG$\overline{P}$E produced by gate 64. The second is the signal VW which indicates that a long order code is held in the V–Z register and which is produced by gate 57. The third input is the signal A, the true-side output of flip-flop A.

The signal produced by gate 71 serves to block the normal recirculation by means of an inhibitory input to gate 25, and to admit $\overline{R}$, via the "and" gate 72, to the "or" gate 23 which forms R''. An "or" gate 74 serves to render inhibitor input 25 of gate 24 responsive to the output of gate 71. Thus, gates 71, 72, 74 and 24 together form during the IG$\overline{P}$-bit periods when $E=1$ an input logically described as $A\overline{R}+R\overline{A}=R\neq A$ which describes, indeed, an adding process for an augend (R), and addend (zero) with an initial carry bit (A). The symbol $\neq$ represents here the "exclusive or" function.

Since flip-flop A is reset upon the appearance of any zero bit in the prior count number, it will remain set until the time IGFP only in that R-cycle in which the prior count number has the value thirty-one (binary 11111). Since flip-flop A remains set, each of the five bits is complemented before reinsertion into the R line, so that the new count number in that R-cycle has the value zero (binary 00000). As was described earlier, the set condition of flip-flop A at the time IGFP permits the resetting of flip-flop E which terminates the period of execution of the long order, provided that $Z=1$.

The word period following the resetting of E is an $\overline{I}$-word period. In it, the activity characteristic of the long order held in the V–Z register is blocked by the reset condition of E, although the long order is still held in the V–Z register. The next succeeding word period is an I-word period; moreover, it is one in which $E=0$, and, therefore, a new cycling of the syllables of the instruction word occurs. The effect of that cycling is to return the long order just executed to the R register as the first syllable of the I$\overline{P}$ word therein, and to leave in the V–Z register the count number which has just been brought to the value zero (00000). That syllable, 00000, will then be executed as an "order." It is, however, the Blank order which has no significant effect. Thus, the circuitry causing the incrementation of a count number effectively prevents the count number from being shifted into the order register 50 until the count number has attained the code form of the Blank order. In this way any other count number can never be interpreted as any other order.

The one word period in which the Blank order is shifted into the V–Z register 50, and the one word period in which it is "executed" must be taken into account in calculating the times at which successive orders are executed. The total time involved in the handling of a long order (with Z-bit=1), including this succeeding Blank order, is $(34-c\#)$ R-cycles although the actual period of execution lasts for only $(32-c\#)$ R-cycles.

In the foregoing discussion of the long orders, we have considered only those order codes for which the Z-bit has the value 1. The corresponding orders having, however, $Z=0$, differ from these only in that their periods of execution are longer by 32 R-cycles. As was indicated above, the termination of the period of execution of a long order occurs at the time of "overflow" of the count number and is dependent on the condition, $Z=1$. If $Z=0$ in the order code as it is originally cycled into the V–Z register, then the first overflow of the count number does not reset E and terminate the period of execution. Instead, that first overflow causes the setting of flip-flop Z and the period of execution continues. After an additional 32 R-cycles, a second overflow of the count number occurs, which does cause the termination of the execution. The state of flip-flop Z plays no part in the decoding of the order code of a long order and the activities in the period of execution are the same before and after this first overflow which sets flip-flop Z.

The setting of Z on the first overflow is expressed by the following term in the logic equation for the setting input of flip-flop Z:

$$sZ= \ldots +E\ IGFP\ VW\ A \ldots$$

The signal E IGFP VW A is produced by "and" gate 66, as has been described earlier, and contributes to the setting signal for flip-flop Z via the "or" gate 73 connected to the input set side of flip-flop Z.

It will be understood from the foregoing discussion that the Z-bit of the order code of a long order acts, in effect, as a sixth (most significant) bit of the count number rather than as a part of the long order code. The count number, with the inclusion of this sixth bit, may be denoted C#, then this six-bit count number may have any value in the range zero to sixty-three inclusive and the number of R-cycles in the period of execution is given by:

number of R-cycles in period of execution $=(64-C\#)$

The total time consumed, as a result of the presence of the long order and its count number in the instruction word, is $(66-C\#)$ R-cycles.

In summary, a short order is kept in the V–Z register for one $\bar{I}$-word period during which that order is executed. The double orders turn the flip-flop E on for one R-cycle as controlled by the gate 55. At the end of that R-cycle, the gate assembly 62 and 61 turns the flip-flop E off again so that at the next $I\bar{P}$-bit period order cycling is resumed. Thus, three word periods are available for double order execution. The long orders are kept in the register V–Z for a period of time which can be metered by suitably selecting the count number that succeeds the long order, on one hand, and by the code position Z. Durations from 1 through 64 R-cycles can be metered in this manner.

EXECUTION OF TRANSFER ORDERS

In the previous chapter, there was described how order codes are drawn out of the R-register, specifically from the forty $I\bar{P}$ bits cycling in the R-register, and how the order codes themselves determine their storage duration in the order register V–Z. In the following, there shall be described how the stored orders are made to perform "useful work."

We shall proceed to the description of the execution of single transfer orders. As will be developed more fully below, any arithmetic operation will require participation of at least one number word in the IP, $I\bar{P}$ or $\bar{I}P$ word positions of the R-register. On the other hand, it is apparent that numbers, data, instructions and orders for an extensive program, prior to the beginning of any calculation or of any kind of a computer operation, will be stored in the M register. Thus, a program to be executed will extensively require communication between the R and the M registers. This is being done by "Bring" and "Record" orders (see the table in FIGURE 6).

FIGURE 7 now illustrates the gating circuit network which controls the execution of a Bring order. The Bring order can be either a Bring-P or a Bring-$\bar{P}$ order and can be "translated" as follows. If the order is Bring-P, it means that subsequently to the loading of this order into the V–Z register during an I word period, forty P bits emerging during the succeeding word period from the M-line by being presented in the flip-flop M, are to be loaded into the R line in lieu of the bits presented in the R flip-flop at that time. It is apparent that the Bring-$\bar{P}$ order is substantially similar and refers to the forty bits emerging from the M line at the M flip-flop, at the times $I\bar{P}$. Thus, FIGURE 7 illustrates specifically a gating network coupling for this situation, the output of the M line to the input of the R line.

The two short orders Bring, are represented by code configurations which in terms of the content of the V through Z register can be written as $\bar{V}XY\bar{Z}$. The Bring-P order and the Bring-$\bar{P}$ are distinguished from each other in that the Bring P order in addition requires a signal $\bar{W}$ while the Bring $\bar{P}$ order requires a signal W. As was mentioned above, both of these Bring orders concern the $\bar{I}$-word period only. Furthermore, the loading of the order register V–Z, for example, by a Bring order (or any other single order) is completed, at the end of the I-word period preceding the $\bar{I}$-word period in which such order is executed. This end is marked specifically by the time IGFP. The single Bring order, as all single orders, does not change the off state of the flip-flop E.

The circuit network shown in FIGURE 7 causes the output of the M-delay line, particularly the M flip-flop, to be coupled to the input side of the R-delay line. More particularly, the Bring-P order, for example, is to be executed in that in the bits held in flip-flop M during the $\bar{I}P$-bit periods can be passed directly into the R'' input line controlling the input transducer 21 of the R line, without impairing circulation of the $I\bar{P}$ bits in the R register. Thus, in order to provide for the transfer of forty $\bar{I}P$ bits, there is provided a gate 101 establishing coincidence of the following signals.

First of all, the response of this circuit network is to be restricted to a single order, and, as was mentioned above, during the execution of single order the flip-flop E stays off. Furthermore, the operation is to be restricted to $\bar{I}$-word period. Thus, the gate 101 has a first input which responds to the $\overline{IE}$ coincidence signals. The second input of the gate 101 responds to the code which is common to both types of short Bring orders, and one can see from the table in FIGURE 6 this is established in the decoder 70 by a signal developed upon coincidence of $\bar{V}XY\bar{Z}$. The composite signal $\bar{V}XY\overline{ZIE}$ opens the gate 101 for the total duration of that $\bar{I}$-word period which immediately succeeds the loading of a Bring order into the V–Z register.

An "or" gate 102 governs the third input terminal for the "and" gate 101. The "or" gate 102 produces pulses in synchronism with a P or $\bar{P}$-word period; it can be seen from the table in FIGURE 6, the signal $\bar{W}$ specifically distinguishes the Bring P order so that for execution of this order the pulse train $P\bar{W}$ is produced and passed through the open gate 101. In case the Bring order concerns a $\bar{P}$ word, the other input of the "or" gate 102 responds to the pulse train $\bar{P}W$. The outputs of the gate 101 are thus forty gating pulses during an $\bar{I}$-word period, coinciding with either P bit or $\bar{P}$ bit periods depending upon the character of the Bring order.

These respective forty pulses are used to open up a gate 103 having a second input terminal which responds to whatever bit emerges at that time from the M flip-flop which, in turn, is coupled to the M-line output transducer 12. The output of the gate 103 is thus a forty bit word drawn serially from the M line and passed to the R″ via "or" gate 23.

Since the Bring order concerns only the $\overline{I}P$ word or the $\overline{IP}$ word as the case may be, the respective other interleaved word of the R register is to be recycled in the R register in an unimpaired manner. This is accomplished in that gate 103 is blocked for those bit periods during which M and R registers are not to be coupled to each other; additionally, the signal of the gate 101 is used to control the inhibitor input of the gate 24, so that only for those bit periods concerned in the bit transfer from the M line to the R line, the recirculation of bits in the R register is inhibited. Thus, if the order is a Bring-P order, the input for the line R″ is drawn from flip-flop M in P-bit periods through gate 103 and from flip-flop R, $\overline{P}$ bits are caused to recirculate in the usual manner through gate 24. For a Bring $\overline{P}$ order, the situation is the opposite and the recirculation is uninhibited for the IP word.

Finally, it will be understood, that the previous content of the $\overline{IP}$ register is destroyed upon execution of a Bring-$\overline{P}$ order, since the $\overline{IP}$ bits as appearing in flip-flop R are suppressed at the gate 25, while the concurrent content of the flip-flop M is substituted. For a Bring-P order, the situation is a corresponding one. It should be noted, that as far as the M register is concerned, execution of a Bring order does not impair recirculation of the word loaded into the R register. Thus, execution of a Bring order is a copying process with the "master" remaining in the M register, but coupled with destruction of the previous content in the addressed portion of the R register.

Proceeding now to the description of FIGURE 8, there is illustrated the respective execution of the two single Record orders. This is basically the complement to the Bring order in that a Record order causes the transfer of a word from the R register to the M register. Again, a distinction is to be made between the P and the $\overline{P}$-bit periods, but any one single Record order is executed during the $\overline{I}$-word period directly succeeding that I-word period during the last portion of which the Record order was loaded into and left in the V–Z register.

The single Record order will establish a decoded coincidence signal $\overline{V}XYZ$. A gate 111 responds to this decoded gating signal and is thus opened only for the execution of the Record order. The second input terminal for the gate 111 restricts response of this gate to the $\overline{I}$-word period and single order execution is again evidenced by signal $\overline{E}$. The two orders record P and record $\overline{P}$ are distinguished by the code bit held in the W flip-flop whereby again, when W is true the recording is to affect the $\overline{IP}$ word while a $\overline{W}$ signal causes the recording of an $\overline{I}P$ word.

The gate assembly 112 thus produces either a $\overline{P}$ or a P-pulse train as the case requires, so that the output of the "and" gate 111 are forty gating pulses occurring and effective either during the $\overline{P}$ or during the P-bit periods of the respective $\overline{I}$-word period. These forty gating pulses open up a gate 113 for these forty bit periods, and the content concurrently passing through the R flip-flop is set into the M″ input line for the input transducer 11 of the M register. The gate 14 is provided also here to permit normal recirculation of the $\overline{IP}$ word in the M register, in case the record order is a Record-P one, while the $\overline{I}P$ word will be recirculated in the M line from the M flip-flop when the order is Record $\overline{P}$.

The bits thus recorded into the M-delay line may or may not be recirculated in the R register. A word once recorded from the R register into the M register is usually not needed anymore in the R register. It is thus principally unimportant whether such word is erased from the R register immediately when recorded into the M register, or whether such word is erased from the R register only when pursuant to execution of a Bring order, a different word is passed into the bit positions of the R register previously occupied by such word. If immediate destruction is desired, one may use the output of gate 111 at the inhibitor input 25 in gate 24 governing the circulation process of the R line.

Thus, FIGURES 7 and 8 illustrate single word transfer between the M-delay line and the R-delay line in either direction. It can also be seen that only one word is transferred between the registers during the $\overline{I}$-word period which succeeds the I-word period during which such a short order was loaded into the V through Z register. At the end of this $\overline{I}$-word period, the word transfer between M and R registers is completed, and the order recycling is continued indeed with the aid of the network illustrated and described with reference to FIGURE 5.

The single Bring and Record orders when executed during an $\overline{I}$-word period can affect only the content of the $\overline{I}P$ or the $\overline{IP}$ portions of the R register due to presentation of the two words in flip-flop R during this word period $\overline{I}$ of order execution. The double Bring order and the double Record order now individually affect all the P bits of the R register, and thus extends over two succeeding word periods I and $\overline{I}$. The transfer of bits between the M and the R registers must be controlled accordingly.

FIGURE 9 illustrates a circuit configuration for the Bring and Record double orders. As was mentioned above, all double orders are accompanied by a $V\overline{W}X$ order code configuration. Also, as was explained above, order cycling is interrupted by maintaining $E=1$ for one R-cycle so that specifically order cycling usually occurring during I word periods is inhibited for that one I-word period of the R-cycle for which flip-flop E is on. There is thus no exchange of orders in the order register V–Z.

The Bring-P double order specifically transfers altogether eighty bits from the M line into the R register during the $\overline{IP}$ and IP-bit periods of one R-cycle. Thus, there is an "and" gate 121 responding to the Bring double order which is a $V\overline{W}XY\overline{Z}$ code derived from the order decoder 70 in FIGURE 5. As was also explained with reference to FIGURE 5, during the execution of any double order, two succeeding word periods $\overline{I}$ and I are metered in that for precisely these two word periods the flip-flop E remains on (see gates 55, 61 and 62 and the IPFG triggering signal in FIGURE 5). Thus, the gate 121 responds to the signal E.

Since a pulsating gating signal is required for separating the P from the $\overline{P}$-bit periods, the gate 121 also receives the P signal. Thus, during an $\overline{I}$-word period and the succeeding I-word period, altogether eighty P gating pulses appear at the output side of gate 121 to operate as gating signal for a gate 122 which connects the output of the M flip-flop to the R″ line; recirculation of $\overline{IP}$ and $I\overline{P}$ words in the R and M registers is not impaired, because the control gate 24 of the R register receives the output of the gate 122 for blocking gate 24 only during the P-bit periods, and no inhibiting input is applied at all to gate 14 of the M register.

For executing the double Record order, the flip-flop E is turned on precisely for an $\overline{I}$ period and for the succeeding I-word period; the signals P are used for producing pulsating gating signals, and the record double order code signal is established upon detecting the coincidence signal $V\overline{W}XYZ$. The "and" gate 123 monitors this coincidence and produces eighty gating pulses permitting a gate 124 to pass the output of the R flip-flop into the M″ input line via the "or" gate 13. The corresponding $\overline{IP}$ and $I\overline{P}$ words are permitted to recirculate in the M and R registers unimpaired by this recording operation.

It will have been observed, that none of the transfer processes described above relates to the I$\overline{P}$-word in the R register. The single transfer orders Record and Bring are executed during the $\overline{I}$-word period, and thus cannot possibly influence the I$\overline{P}$ word and register portion; the double transfer orders Record and Bring relate only to the P-bits in two succeeding ($\overline{I}$–I) word periods.

The next two orders to be described are transfer orders called conditional and unconditional Fill, and they relate to the I$\overline{P}$ word in the R register. The Fill order is in many respects similar to the Bring order. Its execution consists of the copying of one word from the memory M into the R register. The original word continues its circulation in the M register. The order Fill is, furthermore, similar to a single Bring order in that only one word is copied from the memory. The I$\overline{P}$ word in the R register is always an instruction word holding the orders (and count numbers) presently cycled through the order register 50 for sequential execution. Thus, the Fill or conditional Fill orders serve to put another instruction word into the R register. It will be recalled, a single order is always executed during an $\overline{I}$-word period which succeeds the I-word period during which the single order was placed into the V–Z register 50. Since a Fill order can only be executed during an I-word period, and since order cycling normally occurs during I periods, order cycling must be interrupted for one I word period, so that the Fill order must be treated as a double order as far as retaining it in the register 50 is concerned even though execution proper is limited to a single word period.

The conditional Fill order differs from the unconditional Fill order in that the conditional Fill order can be executed only when the condition C being true, is satisfied. The reason for this will be described more fully below in the chapter on Program Considerations. Presently, it suffices to state that the conditional Fill order permits program branching. All other orders are unconditionally executed in the order in which they appear in the V–Z register. The execution of the conditional Fill depends on the state of flip-flop C and thus its execution depends on the state in which flip-flop C was left pursuant to execution of a previous order. After execution of the conditional Fill, flip-flop C is turned off.

An instruction which contains the order conditional Fill will typically also contain a Fill order in a later syllable. The result will then be that one or the other of two instruction words will be filled into the I$\overline{P}$ register portion of the R register, depending on the state of the flip-flop C, and further activities will follow one or the other branch of the program. FIGURE 10 illustrates the circuit network used for the execution of the Fill and the unconditional Fill orders.

Looking at the table in FIGURE 6, one can see that the two Fill orders are identified by a code V$\overline{W}$X$\overline{Y}$. They distinguish in that the conditional Fill requires $\overline{Z}=1$, and the unconditional Fill requires $Z=1$. Since in addition the conditional Fill requires the flip-flop C to be set, a composite gating signal is produced which can be written as V$\overline{W}$X$\overline{Y}$ $(C+Z)$ and which is applicable for both Fill orders. This is a gating signal for gate 141, receiving in addition the pulsating timing signal I$\overline{P}$ for gating, and receiving finally the signal E as an indication that a double order is being executed.

The forty gating pulses emerging from the gate 141 are used to open a gate 142 during the $\overline{P}$ bit periods so as to permit the passage of forty I$\overline{P}$ bits from the M line into the R″ input line of the input transducer 21. The inhibition circuit for gate 24 permits uninhibited recirculation of the IP word in the R register and is not illustrated but follows the pattern outlined above with reference to FIGURES 6 through 9. The circulation in the M register is not disturbed in any manner.

The execution of the conditional Fill order is completed at the instant IPFG so that a gate 143 controls the turning off of flip-flop C at this time. The gating signal for gate 143 could be the full decoded order signal V$\overline{W}$X$\overline{YZ}$. The sub-code $\overline{WYZ}$ is not only true for the conditional Fill order above but also for the Add order (see FIGURE 6) to be described below. However, the order Add is a single order with $\overline{E}=1$, so that gate 143 cannot respond to the "Add" code. The circumstance $\overline{WYZ}$E is also true during the initial loading mode state (infra) which actually is desirable as it resets the flip-flop C in case it has an arbitrary on-state when the power is turned on.

REARRANGE ORDERS

At times, it proves necessary or desirable to change the sequence of bits in the R register. This is done by bit exchanging and shifting orders. For example, it may be desirable to exchange the content of the various register portions in the R register, because as a result of two Bring orders the words are inconveniently arranged in the R register. Words may be rearranged in the R register by execution of the order Exchange. This order specifically involves two words of R register, namely the $\overline{I}$P and the I$\overline{P}$ words. It is a single order involving only one $\overline{I}$-word period. The effect of the exchange order is to transfer the content of each of these register portions into the other. It is thus a two-way transfer in contrast to the one-way transfers of the orders Bring, Record and Fill, discussed above.

The circuit network employed in the execution of an exchange order is illustrated in FIGURE 11. It involves, of course, only the R register, and the control logic is designed to rearrange the order of bits as they emerge from the R-delay line during the $\overline{I}$-word period. In particular, a P bit emerging from the R-delay line is to be inserted into line R″ during a $\overline{P}$-bit period thereby to become a $\overline{P}$ bit, while a $\overline{P}$ bit as it emerges from the delay line is to be placed into a line R″ during a P-bit period thereby to become a P bit.

It will be recalled that during a normal circulation and during $\overline{P}$-bit periods the flip-flop Q holds a P bit, while during a P-bit period the flip-flop Q holds a $\overline{P}$ bit. This is so because the designation of $\overline{P}$ and P bits is associated with the time of inserting bits into line R″, for example, by means of the R flip-flop during normal circulation of the R register. The primary control gate for the circuit executing the exchange order is the "and" circuit 131, receiving a $\overline{V}$WX$\overline{YZ}$ coincidence signal which is the decoded exchange order. The gate 131 also receives the $\overline{EIP}$ signals to restrict response of this gate 131 to the $\overline{I}$-word period immediately succeeding the placing of the exchange order code into the V–Z register at short order execution condition, $\overline{E}=1$. The gate 131 is used to produce a train of forty gating pulses during the $\overline{P}$-bit period of an $\overline{I}$-word period.

The first part of this exchange of bits is carried out by means of another gate 130 receiving the gating pulses from the control gate 131 and, additionally, the output signal of the Q flip-flop is applied to gate 130, feeding such signals directly through the "or" gate 23 directly into the R″ line. Thus, during the execution of the exchange order, the P bits of an $\overline{I}$P word when emerging from the Q flip-flop during the $\overline{P}$-bit periods are applied into the R″ line and thereby become $\overline{P}$ bits. This is so, because by definition, any bit applied to line R″ during a $\overline{P}$-bit period becomes a $\overline{P}$ bit, and an $\overline{I}$P-word thus transferred becomes an I$\overline{P}$-word.

During the P-bit periods of the $\overline{I}$-word period presently considered, the gate 130 is blocked, and the flip-flop Q contains $\overline{P}$ bits as they have emerged from the R-delay line. These bits are passed to flip-flop R during the P-bit periods via an "or" gate 134 and an "and" gate 132 having an inhibitor input so as to be blocked by the complementary output of the gate 131 and is thus open during the P-bit periods. Actually, the loading of flip-flop R in the $\overline{P}$-bit period is the normal one for ordinary cycling.

Each $\overline{P}$ bit as it emerges from the R line is held in flip-flop Q during a P-bit period and applied to flip-flop R via gates 132–134. Such bit is held in flip-flop R during the succeeding $\overline{P}$ period as is normal. During the same $\overline{P}$ bit period, this content of the flip-flop R is fed back to the input of flip-flop R by means of a gate 133 opened for $\overline{P}$-bit periods by the output of the gate 131. Thus, such $\overline{P}$ bit is held in flip-flop R also during the next P-bit period. In this way, a $\overline{P}$-bit is delayed and held in flip-flop R for two bit periods, first for a $\overline{P}$-bit period and then for the succeeding P-bit period. A gate 135 is opened by the complementary output signal of the gate 131 during such P-bit periods, and this gate 135 now passes what was originally a P bit during a $\overline{P}$-bit period into the line R'' via the "or" gate 23. This way a $\overline{P}$ bit as it emerges from the R-delay line is fed during a P-bit period into the R'' line and by definition becomes thereby a P bit.

FIGURE 11*a* will facilitate the understanding of this process of exchanging bits. The table illustrated shows the content (bits) held in flip-flops Q and R and the bits applied to input line R'' during several P and $\overline{P}$-bit periods. The left-hand portion shows the last few bit periods of the I-word period during which there is still order cycling resulting in the setting of the exchange order in the V–Z register at the time IFGP. The P and $\overline{P}$ bits are simply numerically represented regardless of bit values by 1, $\overline{1}$, 2, $\overline{2}$ . . . 39, $\overline{39}$, 40, $\overline{40}$, etc. The bits 74 and 75 in line R'' at the last two P-bit periods of the I-bit period pertain to the order that will be shifted into the order register 50 during the next I word period and is presently recycled in the R-delay line in the last syllable of the I$\overline{P}$ word. The bits $\overline{79}$ and $\overline{80}$ pertain to the exchange order code that is shifted into the V–Z register, with bit $\overline{80}$ being applied to V at the IFGP-bit period and bit $\overline{79}$ being applied to flip-flop W concurrently. By definition of the exchange order code, bit $\overline{80}$ has a bit value "zero" and bit $\overline{79}$ has a bit value "one."

FIGURE 11*a* then shows the content of flip-flops Q and R during the I-word period of exchange order execution as well as at the beginning of the succeeding I-word period showing no further exchange of bits.

One can see from Figure 11*a* that the exchange operation is carried out ab initia in the proper manner. The order Exchange is detected as being held in the V–Z register 50 at the time IGFP. At this time IGFP flip-flop Q holds what for normal circulation is, or would be the first $\overline{IP}$ bit here designated with $\overline{1}$. Now the distinction of bit and bit-period has to be observed very carefully, and it is correct that during the time IGFP the flip-flop Q holds indeed the first $\overline{P}$ bit of the $\overline{IP}$ word. This bit is applied to the flip-flop R via the gate 132 in the usual manner because at the period IGFP the output of gate 131 is still false, so that the gate 132 is open and indeed this $\overline{P}$ bit is being gated into the R flip-flop. Still at this period IGFP, flip-flop R holds P-bit $\overline{80}$ then properly applied to line R'' as no exchange takes place yet.

The next bit period is a $\overline{P}$-bit period. During this time (as is correct and normal), the R flip-flop holds a $\overline{P}$ bit ($\overline{1}$) and flip-flop Q holds the first bit of the $\overline{I}$P word (1). At this $\overline{P}$-bit period, the gate 131 is opened, and the flip-flop Q transfers directly the bit "1" into the R'' line to thereby become a $\overline{P}$-bit.

In FIGURE 11*a*, this is distinguished by two lines of symbols for R''. The top line called "old" shows the bits in their original designation and in the sequence, 1, $\overline{1}$, 2, $\overline{2}$, etc. The lower line called "new" shows the same bits, but as they must be designated anew because a bit set into line R'', during a P-bit period by definition becomes a $\overline{P}$-bit. Hence, the same bit such as "1" will after the exchange properly be designated "$\overline{1}$," etc.

The exchange proceeds through bits 40 and $\overline{40}$. At the time $\overline{I}$GFP flip-flop Q holds bit $\overline{41}$ properly clocked into flip-flop R at the same clock pulse, that marks the change-over $\overline{I}$I, but during the first bit period (a $\overline{P}$-bit period) of this I-word period, bit $\overline{76}$ is applied to line R'' to shift out the Z bit of the exchange order having bit value "zero." During the same $\overline{P}$ bit period, flip-flop Q holds bit 41, held properly as P-bit in flip-flop R during the first P-bit period of this I-word period then concurrently applied to line R''. Thus, execution of the order "exchange" is terminated, P bits 41, 42 . . . et seq. are recirculated in an unmodified manner, while order cycling involving the $\overline{P}$ bits and bit periods is resumed.

We proceed now to another type of rearrange orders called shift orders. The shift orders serve the purpose of displacing or rearranging the P-bits held in the R register. There are two such orders; one a single and the other a long order. The single order Shift has the order code $\overline{V}WX\overline{Y}Z$ and the long shift order the order code $VW\overline{X}Y(Z+\overline{Z})$. The Z bit in the long order code can be regarded as a part of the count number rather than of the order code.

The single order Shift, since it is a single order, has a period of execution extending only over one $\overline{I}$-word period. It can, therefore, deal only with the $\overline{I}$-words held in the R register, hence with the $\overline{I}$P register alone. The effect of the single order Shift is to move each of the 40 bits of the $\overline{I}$P-word to the next more significant bit position. The least significant bit becomes the next-to-least significant bit, etc. The most significant bit of the prior content of the $\overline{I}$P register is lost from that register, while a bit which was not a part of the prior content becomes the least significant bit of the new $\overline{I}$P word.

Since the bits of a word are presented in successive P-cycles, starting with the least significant bit and ending with the most significant, the execution of the shift order requires that each bit of the word to be shifted, after it emerges from the R line, must be temporarily stored for one P-cycle, i.e., for two bit periods, before being reinstated in the line. Flip-flop C is used to provide a temporary storage location for each bit as it is being thus held out of the normal recirculation pattern for two bit periods. The execution of the shift-single order may thus be described as follows: In each $\overline{I}$P-bit period (while the shift-single order code $\overline{V}WX\overline{Y}Z$ is held in the V–Z register), the bit held in R is copied into flip-flop C instead of being returned to the line R''. In the $\overline{I}$P-bit period which follows after two bit periods (if any), that bit is returned to the line as described by the expression:

$$R''=C \text{ in } \overline{I}P\ \overline{V}WX\overline{Y}Z$$

This insertion of the delayed bit held in C into the line is effected by the "and" gates 151 and 153 shown in FIGURE 12, while the inhibition of normal recirculation from R in these same bit periods is effected by the inhibitory input 25 to gate 24 derived from the output of gate 151. Gate 151 is the primary control gate for the single order Shift forming the signal $\overline{I}P\ \overline{V}WX\overline{Y}Z$. The copying of R into C in these same bit periods is described by $$sC=R\ \overline{I}P\ \overline{V}WX\overline{Y}Z\ \overline{E}+\ .\ .\ .$$

$$rC=\overline{R}\ \overline{I}P\ \overline{V}WX\overline{Y}Z\ \overline{E}+\ .\ .\ .$$

This copying into C takes effect at the end of the $\overline{I}$P-bit period, and thus does not disturb the process of setting into input line R'' the bit held in C during that bit period.

The copying of a bit held in flip-flop R into flip-flop C in these bit periods, which are marked by the signal produced by gate 151, is effected by the "and" gate 152.

The effect of the execution of a single shift may be described as a cyclic shift of the 41 bits held in the $\bar{I}$P register together with flip-flop C. The bit previously held in C is left in the least significant bit position of the $\bar{I}$P register, while the most significant bit of the prior content of that register is left in C after the execution. Ways in which this intercommunication between flip-flop C and the $\bar{I}$P register can be utilized will be discussed in later chapters.

The $\bar{P}$-bits presented during the one word period of execution of the single order Shift; that is, the bits of the $\bar{I}$P register, recirculate in the normal fashion and are unaffected by this order.

The long order Shift differs from shift-single in several ways:

(1) It acts upon the P-words presented during both $\bar{I}$- and I-word periods, rather than only on the former. That is, it shifts the contents of both the $\bar{I}$P and the IP registers.

(2) The long shift order produces a cyclic shift of the eighty P bits held in the R register, without the loss of a bit from the words shifted or the introduction of an extraneous bit.

(3) The period of execution of the order Shift long may extend over many R-cycles, thus displacing (delaying) the bits held in these two registers by correspondingly many bit positions (P-cycles). If, for example, the period of execution is 40 R-cycles, the contents of the $\bar{I}$P and IP registers are interchanged.

(4) The execution of Shift-long does not involve flip-flop C and thus does not take part in—nor does it interfere with—the intercommunication processes to be described in later chapters. Flip-flop B, rather than C, is used to provide the two-bit-period holdup of the affected bits. Moreover, the diversion takes place on the emergence of these bits from flip-flop Q rather than on their emergence from R.

In normal circulation (FIGURE 2), each bit held in the R register emerges from the delay line and is held in flip-flop Q for one bit period, then the same bit is held in flip-flop R for the next bit period and subsequently the bit is returned to the R-delay line. For executing the long shift orders, the circuit network shown in FIGURE 13 interposes the flip-flop B into the circulation path of the P bits without changing the circulation of the $\bar{P}$ bits. Two "and" gates 177 and 178, respectively, connect set and reset output sides of flip-flop Q to set and reset input sides of flip-flop B. An "and" gate 174 connects the output side of flip-flop B to the input side of flip-flop R while alternatively an "and" gate 176 connects the output side of flip-flop Q to the input side of flip-flop R. These gates are controlled by timing signals which establish a delayed circulatory path for the P bits and an undelayed path for the $\bar{P}$ bits.

The principal control gate is "and" gate 171 producing gating pulses for the $\bar{P}$-bit periods and being responsive additionally to VW$\bar{X}$Y, the long shift order code, and to $E=1$, which is always true during execution of a long order. Of course, no word period signal (I or $\bar{I}$) is employed here as all eighty P bits are shifted and shifting includes the shifting from one word period into another. The pulse train from gate 171 providing true signals during $\bar{P}$-bit periods and false signals during P-bit periods, is applied to an inhibitor input of gate 176. During P-bit periods, gate 176 is open and the flip-flop Q holds $\bar{P}$ bits; these $\bar{P}$ bit signals in flip-flop Q are thus applied to flip-flop R to establish the normal circulation for $\bar{P}$ bits. During $\bar{P}$-bit periods, gate 176 is blocked and the direct connection between flip-flops Q and R is interrupted.

The "and" gates 177 and 178 are gated open by timing pulses during $\bar{P}$-bit periods. Additional gating signals for gates 177 and 178 are described below, presently it suffices to state, that during $\bar{P}$-bit periods, when gate 176 is blocked, gates 177 and 178 admit the content (P-bits) of flip-flop Q to be copied into flip-flop B. At the P-bit period following such $\bar{P}$-bit period, gates 177 and 178 are blocked (gate 176 is open), so that the P bit is held in flip-flop B, and during the same P-bit period no other bit signal is applied to flip-flop B. During the $\bar{P}$-bit period following thereafter, this P bit still stays in flip-flop B, however, the gating signals from gate 171 which is true during $\bar{P}$-bit periods, opens gate 174 so that this P bit is applied to the input side of flip-flop R. Thus, each P bit is delayed for one P-cycle before reinsertion into the R-delay line.

The process described in the preceding paragraph fails to produce exactly the desired cyclic shifting of the 80 P bits held in the R register. That failure may be understood as follows: With the introduction of flip-flop B into the path of recirculation, there are 81 (rather than only 80) P bits being held and cyclically permuted. One of these is the bit standing in B at the time at which the new pattern of circulation is begun; and is a duplication of one of the desired 80 P bits. Gating input signals for gates 177 and 178 remedy this defect.

Specifically, copying of a duplicate, 80th bit must be suppressed in the last P-bit period of each R-cycle of the period of execution of the order Shift-long. This P-bit period is defined in time by IGFP with E being true. It is not, however, suppressed in other R-cycles; in particular not for the R-cycle preceding the period of execution in in which $\bar{E}$ is true. Thus, the circumstances for the copying of bits from Q into B, which were indicated above as $\bar{P}$ (i.e., for all $\bar{P}$ bits) in general, now become somewhat restricted: $\bar{P}$ ($\overline{IGFE}$). The copying from Q into B is permitted by a signal provided by gate 175, to which $\bar{P}$ is an input. That gate is also provided with an inhibitory input carrying the signal IGFE.

It will be observed that neither gate 175, 177 nor 178 receives the order Shift-long code signal. Inclusion of this signal is quite possible, but unnecessary. During execution of any order, flip-flop B never performs any other function than the one just described, i.e., it receives P bits from flip-flop Q, holds them each for one P-cycle and delivers them subsequently to flip-flop R. This copying of P bits into flip-flop B can be carried out during any order execution or order cycling. As long as such a delayed P bit is not desired, the content of flip-flop B is simply not used (note that only the output gate 176 receives the shift-code-dependent signal from gate 171).

The execution of orders and order cycling takes place in what is collectively called the "computing mode," distinguishing from the "loading mode" in which data is fed into the computer without execution or cycling of orders. The computing mode is defined by a circumstance logically represented as $V+\bar{E}$. From the table in FIGURE 6, one can see that V is true for all double and long orders, and $\bar{E}$ is true for all single orders, so that $V+\bar{E}$ is true for all orders. A $V+\bar{E}$ signal is now used to open gates 177 and 178 to permit copying of bits into the flip-flop B only in the computing mode. Gates 175, 177 and 178 constitute a gate assembly 173 which thus controls this connection between flip-flops Q and B and this assembly 173 will be shown and explained in simplified form in all those cases (multiplication and division) in which shifting of P bits takes place in the same manner as described.

To illustrate more fully the way in which the shift operation permutes the P bits, these 80 P bits together with the 80 $\bar{P}$ bits are shown in the table 13*a* as they appear in flip-flops Q, B and R. Shifting takes place also during multiplication and division operations, we shall refer to this table also when these operations are described in a later chapter. The bits are named 1 through 80 (and $\bar{1}$ through $\overline{80}$) in the order of their appearances in flip-flop Q in the first R-cycle of the period of execution. The table shows the end of an R-cycle of normal circulation as marked by detection of the order Shift-long at the time IGFP. The succeeding R-cycle shows a shift. In order to facilitate understanding of the shifting operation, the $\overline{P}$ bits which are not shifted are designated by $\overline{1}$ to $\overline{80}$, and they are shown as they are respectively held in flip-flops Q and R; they bypass, of course, flip-flop B.

Execution of the order starts, when order-code decoder 70 detects the order code for Shift-long at the instant IGFP, marking the end of an I-word period. This is the last bit period during which $\overline{E}$ is true. E will be true thereafter until execution of the long order has been completed. IGFP is also a bit period during which V is true. Thus, there will be no change in the gating signal $E+V$ for assembly 173 before and after detection of the long order Shift.

The flip-flop B holds the P bit "80" of the R register (or, what is the same, the 40th IP bit). At this same time IGFP, preceding the period of execution, flip-flop Q holds the first $\overline{IP}$ bit called $\overline{1}$. Up to this time, the content of flip-flop B was not used. The changeover from I to $\overline{I}$ marks the beginning of the execution of the long shift order, and now this 80th P bit will be set into flip-flop R in the first $\overline{P}$ bit period of the $\overline{I}$-word and held in flip-flop R during the succeeding P-bit period, so that immediately there is a shift of the P-bits with the previously 80th P-bit taking the place of the first, the first taking the place of the second, etc.

On the other hand, still at time IGFP, before the period of execution, this 80th bit was held undelayedly in flip-flop R and set into the R″ line due to normal register circulation. Hence, there are now two P bits "80" travelling through the delay line. This is not surprising, since the B flip-flop, in a sense, enlarges the R register to hold altogether eighty-one P bits during such shift order execution so that always one bit will be represented twice and thus occupy two bit positions and this is presently the bit 80.

Looking now at the end of this first R-cycle of shift order execution, the two bits "80" will reappear. Particularly, during a bit period IGF$\overline{P}$, flip-flop Q will hold the originally 80th bit, and during the same bit period, flip-flop B holds P bit 79 for loading into the R″ line. This bit 79 (original counting) is held in the flip-flop R during bit period IGFP which succeeds bit period IGF$\overline{P}$, and this bit 79 is transmitted to line R″ during this bit period IGFP. This completes the first shifting operation of the first R-cycle. Because of the suppression of the setting of B in this last P-cycle (see gate 175), bit 79 will be held in flip-flop B for two further bit periods for a total period of residence there of four bit periods. Assuming that the period of execution of the order Shift-long continues, bit 79 will then again be set into flip-flop R and again inserted into the delay line in the early part of the next R-cycle. Thus at this time, it is bit 79 which has been inserted in duplicate; after one more R-cycle, it will be bit 78, etc. When the period of execution is terminated, the last P bit which was injected into the line is also left, as a "duplicate copy," in flip-flop B; however, no duplicate insertion into the line occurs because of the resumption of normal cycling.

The activities of the order Shift-long make no change in the circulation or handling of $\overline{P}$ bits. These $\overline{P}$ bits circulate in just the same way as they do, for example, during the execution of a Wait order. They are shown in FIGURE 13*a* as reappearing unchanged in successive R-cycles.

It should be mentioned briefly that the order Shift-long is accompanied by a count number. While shifting of P bits is carried out, as a potentially continuous process, after detection of the order Shift-long in the order register, the count number (five $\overline{P}$ bits) is incremented by "one" during each R-cycle. The P bits are shifted by one P-cycle per R-cycle of execution and the number of R-cycles for which this activity is permitted is metered by the count number and its incrementation. The value of the bit held in flip-flop Z also contributes to the determination of the duration of this shifting process. Shifting is terminated when the count number is incremented to 32 (decimal) at a condition $Z=1$.

BLANK AND WAIT ORDERS

As was described earlier, the execution of a long order is followed by the shifting into the order register, V–Z of a syllable consisting entirely of zero bits. That "Blank order" had been left in the syllable which had earlier held the count number of the long order. That zero syllable is then "executed" as an order. Its execution, however, has no important consequences; during the $\overline{I}$-word period in which it is held in the V–Z register, the contents of the M register and of the R register recirculate without change and in the usual way. This execution of the order Blank (a single order) may be regarded as an incidental and innocuous by-product of the execution of the long order.

The Blank order may also be used purposively by including it as an order code in the instruction word. The effect of inserting a Blank order is merely to delay by one R-cycle the times of execution of the orders which follow it in the instruction word. If it is desired to introduce a delay by two R-cycles, then two Blank orders may be used, etc. Very often, however, it will be desired to introduce a delay of very many R-cycles; to use a corresponding number of Blank orders would be very inconvenient. For this reason, the (long) Wait order (or orders) is (are) provided. The order code is VW$\overline{X}$Y, and the Z bit initially set into the V–Z register will be considered a part of the (six bit) count number, C#. During the period of execution of the Wait order, as in that of a Blank order, nothing of importance occurs. The contents of the M register and of the R register circulate unchanged; except, of course, for the incrementation of the count number. The total delay produced by the inclusion of the Wait order and its count number is (66—C#) R-cycles. Of this time, two R-cycles are not in the period of execution of the Wait (i.e., the time during which E is on); however, that distinction is of no importance.

To indicate the importance of the Blank order (as purposively used) and of the Wait order, we may note that the succeeding order may require, in order to serve its intended purpose, that its period of execution coincide with the presentation by the M register of a particular word. To accomplish that, the delay required (an integral number of R-cycles) may be nearly as large as two M-cycles. With the presently assumed length of the M-cycle (22½ R-cycles) a single Wait order with an appropriately chosen count number, C#, suffices in all cases.

PROGRAM CONSIDERATIONS

In the foregoing chapter, it has been described how words can be transferred between the R and M registers, how words or bits can be rearranged in the R register, and how waiting periods can be metered.

Herein specifically, the Bring and Record (three of each) the two Fill orders as well as the Add and Subtract orders required communication between M and R registers. The execution proper of these orders requires one or two word periods as the case may be. The order shifting in between the execution of two different orders takes one word period. The other orders do not require such interregister communication and they require for execution integral multiples of word periods. Thus, the execution of two communication orders is always apart by an integral multiple of word periods. During each such word period, of course, the M register recirculates a pair of words (one P and one $\overline{P}$ word). Thus, it is solely up to the programmer to store words in the M register in such sequence and in such places, that during the execution of each communication order the right word or word period of the M register is available. The "wait"

order aids here in the metering of word periods in between two communication orders.

Now some consideration shall be given to the problems involved in arranging the orders in an instruction word. As was stated above, the execution of a Fill order consists of copying the $\overline{P}$ bits from the M register into the R register during the word period marked I. Thus, the instruction register portion $I\overline{P}$ receives an instruction word as a consequence of the execution of a Fill or of a "successful" conditional Fill order. Since, of course, a program or even a sub-routine will practically never be executed on the basis of but one instruction word, it is necessary to include in the instruction words Fill orders which, after execution of all other orders in the instruction word permit the filling of the $I\overline{P}$ register with another instruction word. Here, we must remember that at any time of executing a Fill order, this Fill order is in the order register V–Z. That order which produced this filling is not lost after its execution, but continues to circulate along with 8 syllables of the newly-filled instruction word.

It will be recalled that the instruction register address $I\overline{P}$ and the order register are capable of containing altogether 9 syllables (see FIGURES 5*a* and 5*b*). If, for example, the newly-filled instruction word consists of 8 single orders, these 8 orders will be executed in succession, and the Fill (or conditional Fill) which led to the insertion of this new instruction word will be executed again. More generally, after all of the orders of an instruction word have been executed, assuming that none is a Fill or an effective Fill order, then the Fill or conditional Fill order of the previous instruction word which caused the filling of the present one will be executed again.

Of course, in the meantime, the M register has advanced, but by proper programming, it can be seen that this re-execution of the original Fill or conditional Fill order may be meaningful as long as the programming is carried out accordingly. The Fill order thus retained from an early instruction word will be called "inherited," and it will result from an "ancestral" instruction word. The inherited order provides a useful supplement to the 8 orders of an instruction word. It very often allows all 8 syllables of the new instruction word to be used for the specification of "useful work" as opposed to the mere "housekeeping role" of producing a new filling of an instruction word. If an instruction word is filled as a consequence of the successful execution of a conditional Fill order, it may be repeatedly executed as an inherited order for an indefinitely long period of time until the condition $C=1$ for its effective execution is fulfilled.

In a typical program, most instruction words are filled in consequence of an execution of a Fill order. The instruction words may use all 8 syllables for the performance of "useful work" and rely on the inherited Fill order to cause the filling of the next instruction word. If the inherited conditional Fill order is to be put to good use, it is usually necessary that the operations produced by the other orders of the instruction word be such as to insure that $C=1$ at the time of the execution of the inherited conditional Fill.

ARITHMETIC OPERATIONS

(a) *Add and Subtract*

Two of the arithmetic operations. Add and Subtract, are single orders. Accordingly, each of these orders is executed in one word period, specifically in an I-word period. Each order serves to combine two numbers; one is the $\overline{I}P$ word held in the R register, the other is the P word presented by the M register during the word period of execution. The number presented by M is added to, or subtracted from, the $\overline{I}P$ word previously held in the R register and the result is returned to the R register as a new $\overline{I}P$ word. Thus, the portion of the R register holding the $\overline{I}P$ word at any instant plays the part of the "accumulator" of a conventional computer. The $\overline{P}$ words presented by the R register and the M register take no part in the Add and Subtract operations, and are merely recirculated unchanged.

In discussing these operations, the two numbers which are combined, and the result produced, will usually be described as integers, each presented in a simple binary representation of 40 bits. It is to be understood, however, that the same arithmetic procedures apply equally well to numbers which are interpreted in various other ways.

The execution of these two orders will be discussed together since the two procedures are closely similar. The two order codes are also similar; they may be indicated collectively by the signal $\overline{VW}X\overline{Y}$, with $Z=0$ for the Add order code and $Z=1$ for Subtract.

Flip-flop C takes part in the performance of both the Add and the Subtract operations. The content of flip-flop C will be called the "carry bit" for the Add operation and the "borrow bit" for Subtract. It will usually be the case, and will be assumed for the present discussion, that $C=0$ at the beginning of the period of execution. This is not, however, an inflexible condition as will be further considered below.

Circuits for the performance of these two operations are shown in FIGURE 14. As will be seen in the discussion to follow, the performance of the two operations differ with respect to the circumstances in which flip-flop C is set or reset, but not with respect to the formation of the bits of the sum or difference (that is, the bits of the result) which are reinserted in the R-delay line via the input line R''. In other words, the rules for generating (or extinguishing) a carry in the performance of Add differ from the rules for generating (extinguishing) a borrow in the performance of Subtract. However, the "carry bits," in the Adding operation, and the "borrow bits," in the Subtracting operation, are used in the same way.

The Add/Subtract orders are executed, of course, individually, in an $\overline{I}$-word period in which $\overline{E}$ and $\overline{VW}X\overline{Y}$ are true. More particularly, the execution takes place in the P-bit periods of that word period. In those periods, a bit of each of the two numbers being combined is presented by each of the two flip-flops R and M. The corresponding bit of the result is returned to the R line in place of the content of flip-flop R which provides the input to the R line in normal recirculation. The bit periods in which Add/Substract execution takes place are indicated by the signal $I\overline{P}\ \overline{E}\ \overline{VW}X\overline{Y}$ which is produced by the "and" gate 161. The forty timing pulses $\overline{I}P$ indicate the bit periods in which the execution takes place. The input signal $\overline{VW}X\overline{Y}$, together with $\overline{E}$, identifies these two orders.

In each bit period of execution, one bit of the result is formed by the circuit 160 and admitted to line R'' via the "and" gate 162. The result bit depends upon three binary variables as follows: One is the bit held in flip-flop R, a bit of the prior content of register IP. The second is the bit held in flip-flop M. It is a bit of the number being added to or subtracted from the $\overline{I}P$ register. The third is the bit held in C, which has the value one if a carry or borrow is present. These three variables are combined in the gates 160 to form a signal which may be represented as $(R\neq M\neq C)$. Here, the symbol $\neq$ represents again, the exclusive "Or" function, that is the sum (modulo 2). The signal formed by 160 is the sum (modulo 2) of the three variables, R, M and C. The same quantity may be represented more explicitly as the following:

$$(R\overline{M}+\overline{R}M)\overline{C}+(RM+\overline{RM})C$$
$$=R\overline{MC}+\overline{R}M\overline{C}+RMC+\overline{R}MC$$

It can easily be verified that these expression represent the desired bit of the result for both orders; a bit of the sum in the case of Add, of the difference in the case of Subtract. These bits are admitted to R'' for insertion in the R-line via gate 162 at the times $\overline{I}P\ \overline{E}\ \overline{VW}X\overline{Y}$.

In each of the bit periods of execution, there may also be generated a signal which serves to set or to reset the carry/borrow flip-flop C. These set or reset signals take effect only after the bit period in which they are formed; that is, they may change the carry/borrow condition for the next succeeding bit period of execution but do not disturb the formation of the current bit of the result, as described above. The formation of these signals is conveniently described separately for the two orders:

The presence of the Add order code in the V–Z register is indicated by the signal $\bar{Z}$, in coincidence with the signal $\bar{I}P\ \bar{V}\bar{W}\bar{X}\bar{Y}$ established by gate 161. The performance of a binary Add calls for the generation of a carry bit whenever both of the two bits being combined, R and M, have the value 1. Accordingly, flip-flop C is provided by gate 163 with a set signal which may be expressed as $$sC=M\ R\ \bar{I}P\ \bar{E}\ \bar{V}\bar{W}\bar{X}\bar{Y}\bar{Z}=\ \dots$$

It is not necessary that this setting signal be qualified with respect to the current state of flip-flop C. If C was already set, then this setting signal is unneeded, but it is not harmful. In the binary Add process, a carry is to be extinguished, if any is present, at a time when both bits being added, R and M have the value 0. That is accomplished by the reset signal provided by gate 164, $$rC=\bar{M}\ \bar{R}\ \bar{I}P\ \bar{E}\ \bar{V}\bar{W}\bar{X}\bar{Y}\bar{Z}+\ \dots$$

Here again it is not necessary to restrict this signal to the situation in which it is genuinely needed; i.e., to the condition $C=1$, since a supererogatory reset signal is harmless.

In circumstances other than those producing the two signals described above; specifically, if one of the two bits R and M has the value 1 and the other has the value 0, then the state of flip-flop C is to remain unchanged. If a carry is already present, then that carry will continue to the succeeding bit period of execution; if no carry is present, then none wil be initiated.

The setting and resetting of C in Subtract differ in detail from those for Add. Specifically, the circumstance for the initiation of a borrow is that a bit having the value 1 is subtracted from a bit of value 0; that is, the circumstance $M\bar{R}$. The setting signal for C is provided by gate 165 and represented by the expression:

$$sC=M\bar{R}\ \bar{I}P\ \bar{E}\ \bar{V}\bar{W}\bar{X}\bar{Y}Z+\ \dots$$

Similarly, a borrow is to be extinguished when a 0 is subtracted from a 1, as indicated by $\bar{M}R$. Gate 166 provides the signal representing:

$$rC=\bar{M}R\ \bar{I}P\ \bar{E}\ \bar{V}\bar{W}\bar{X}\bar{Y}Z+\ \dots$$

Here again, in the remaining circumstances, a borrow is not to be initiated, but a borrow already present is to be propagated; that is, allowed to continue to the next bit period of execution.

When two numbers being added are integers and each is smaller than $2^{40}$, these words are, therefore, capable of being represented by the 40 bits available for a word. Their sum, however, may be greater than, or equal to $2^{40}$, thus exceeding the capacity of a 40-bit word. Only one additional bit is needed for the representation of the sum, which is necessarily smaller than $2^{41}$. The Adding operation may then be regarded as combining two 40-bit numbers and forming a 41-bit sum. The 41st bit, which is the most significant one, is that which is retained in flip-flop C after execution as a leftover Carry bit. The condition $C=1$ after the addition is thus called an "overflow" and indicates that the sum is too large for the format of number representation being used.

In the particular number representation now considered the existence of an overflow indicates that the sum exceeds $2^{40}-1$. A conditional Fill order may be used after execution of the Add order to introduce a branch into the program, in which the overflow situation is dealt with in whatever way the programmer has planned. Specifically, flip-flop C is not automatically reset to zero after an execution of an Add or a Subtract order. It will be recalled, that conditional Fill was an order made dependent upon the state of flip-flop C. To mention only two possibilities, a conditional Fill order may be used to put a new instruction word into the R register having orders which when executed cause a fixed number to be subtracted from the IP word held in the R-register and the resulting number will be below $2^{40}$. Another possibility is to clear the R register from the current IP word and to expand the overflow $\bar{I}P$ word to extend into the IP word periods, so that their sum will become an eighty-bit word handled thereafter as word of double length (see above double Bring and Record orders).

If $C=1$ immediately before the execution of an Add order, the activity performed is not just the simple addition of the two integers, which are the words in the $\bar{I}P$ portion of the R register and the number presented by the M-line at that time. The on state of flip-flop C adds unity to the sum being formed so that the result of the operation is not the exact sum of the two integers but is that sum plus 1. If $C=1$ at the beginning of executing a Subtract order, then the "difference minus one" is produced.

If the two numbers being added are not to be interpreted as integers, but rather as proper fractions with the binary points to the extreme left thereof, then the effect of an Add order execution at a time when $C=1$ can now be restated as: Add the fraction number held as $\bar{I}P$-word in the R register to the fraction number presented by the Memory at the times $\bar{I}P$, plus $2^{40}$. More generally, the effect of a "one" bit held in C before execution of the "Add" order is to add that "one" to the least significant bit position of the sum being formed. The numerical value which is ascribed to the "one' bit contributed, depends on the numerical interpretation which the programmer has chosen to place on the two strings of bits being combined. He is free to use whatever interpretation serves best his needs and to use differing interpretations for different numbers handled in the program. That is, he is free to ascribe to them differing positions of the binary point. Two numbers being combined by an Add or Subtract order must, however, have corresponding binary points if the effect of the Add operation is to be regarded as a correct arithmetic addition of the two numbers.

The "one" bit contributed by the circumstance $C=1$ at the beginning of the Add execution may be said to have been "carried into" the Add process. Similarly, if $C=0$ before execution, one may say that the bit carried into the addition is 0. Correspondingly, the bit left in C at the completion of an Add execution may be said to have been "carried out" of that addition. This nomenclature indicates a way in which the possibility of overflow in adding numbers may be dealt with. A number which has a possibility of becoming too large to be held in a single 40-bit word may be held as an 80-bit word number stored in two words. In this case, no program branching is introduced.

To guard against disturbance to the bit carried over from the first addition to the second, there should be no single Shift, Test order, conditional Fill or other arithmetic operation intervening between them because these orders require the participation of the flip-flop C as was described above and will also be described below.

As flip-flop C is not automatically cleared after Add or Subtract, it is possible and convenient to carry out addition or subtraction using numbers of more than 40 bits. For example, two numbers of 80 bits (double-length numbers) may be added as follows: each number is assumed to be held in memory as two 40-bit P-words. One of these words holds the less significant part of the number, the other holds its more significant part. The two less significant parts are first combined by means of an Add order, and the (40-bit) sum-word is recorded in memory. Then, with care being taken not to disturb the "carry-over" bit held in flip-flop C, the two more significant words are added to form the more significant word of the double-length sum. Similarly, two double-length numbers may be subtracted; or numbers of still greater length may be added or subtracted.

(b) *Multiplication*

*General aspects.*—In FIGURE 15 there is shown primarily a block diagram of the circuit network enabling the execution of the order "Multiply." Prior to executing the Multiply order, the multiplier and the multiplicand are held in the R register. Hence, within the program suitable Bring orders coupled appropriately with wait orders have already been executed to put these numbers into the proper places.

Each of these two number words is a positive single length number having (at most) forty bits. The multiplicand is presented by the flip-flop R in the $\overline{P}$ bit periods of the $\overline{I}$ word period ($\overline{IP}$); that is, it is the $\overline{IP}$ word in the R register. The multiplier is presented during the bit periods IP. Zero bits are presented by flip-flop R in the $\overline{IP}$-bit periods if simple multiplication and not an accumulative multiplication is to be performed. It is not an essential requirement that the $\overline{I}P$ positions be empty in the R register at the beginning of executing the multiply order because accumulative multiplication is well within the realm of possibility and will be described more fully below.

After the completion of executing the order Multiply, the $\overline{I}P$ word will hold at least a portion of the product as it results from the multiplication. The complete product is treated as a double length word occupying all P bit positions of the R register, and the multiplier initially in the IP positions will be shifted out during execution. This will be developed more fully below.

Multiplication will be understood best with reference to the phasing diagram shown in FIGURES 15*a* and 15*b*. FIGURE 15*a* in particular, shows the content of the R register at the outset of the multiplication. Since we are dealing strictly with binary multiplication, the multiplication requires basically the execution of the following steps which can summarily be described as follows:

In the course of executing the multiplication order, the bits of the multiplier are shifted out of the IP word location, starting with the most significant bit, and are used to form the so-called "gated multiplicand." After the first "1" bit of the multiplier has been detected, the multiplicand is copied completely into the P-bit locations set aside for the purpose of holding what is called the "partial product." The locations will principally be the $\overline{I}P$ bit locations, but also may include IP bit locations as these are vacated by the shifted multiplier. This partial product is recycled and fed again into the flip-flop R in the $\overline{P}$-bit periods and thus are presented by flip-flop R in the P-bit periods.

For each succeeding R-cycle, this partial product is shifted by one P-cycle, and one bit of the multiplier is monitored. Since the multiplier is likewise shifted for one P-cycle per R-cycle, the multiplier bits can thus be monitored at sequential specific instances such as IGFP. For each "1" bit of the multiplier encountered, the multiplicand is added to the shifted partial product. For each encountered "0" bit of the multiplier the partial product is merely shifted. After running through all the bit positions of the multiplier the formation of the product is completed. Initially the partial product held in the R register appears only during an $\overline{I}$ word period in flip-flop R. However, as the multiplication proceeds, the partial product will occupy also part of the following I word period. The final product will occupy all P-bit positions, while the multiplier has been eliminated.

*Shifting.*—It is apparent from the foregoing discussion that the execution of the Multiply order requires two basic activities: shifting and adding. The executing logic of the Multiply order is designed to perform these activities as described in greater detail in the following. The shifting activity of the multiplication execution shall be described first, particularly with reference to FIGURE 15. The shifting operation per se involves the operative interpositioning of the flip-flop B into the R register such as was illustrated in FIGURE 13.

It will be recalled from the description of FIGURE 13 that the input logic 173 for the flip-flop B couples the output circuit of the flip-flop Q to the flip-flop B for input control thereof, and this control logic 173 was operated in a manner which was independent of this specific order code held in the order register 50. In particular, the input gating of the input circuit of the flip-flop B responds to all $\overline{P}$ timing pulses when either V or $\overline{E}$ is true except as inhibited by the signal IGFE (see gate 175 in FIGURE 13). Since $V=1$ for all long orders, including the order Multiply, this input of flip-flop B is indeed gated open at every $\overline{P}$ bit period, except at IGFE. Thus, the block 173 shown in FIGURE 15 includes all those gates shown in FIGURE 13 and designated therein with like numerals.

As a rule, throughout the shifting operation, all P bits (held in flip-flop Q at times $\overline{P}$) are shifted, i.e., delayed by two bit periods (one P-cycle) per R-cycle just as has been done in the "shift long" operation. On the other hand, the $\overline{P}$ bits that are in the flip-flop Q at times P are to be recycled in an unmodified manner. The $\overline{P}$ bits, of course, comprise the instruction word $I\overline{P}$ held in the R register as well as the multiplicand which is the $\overline{IP}$ word, neither word is to be subjected to any shifting or modification except for the incrementation of the count number in the last syllable of the instruction word. Thus, the gate 176 is also used here, and its signal input path connects the output side of the flip-flop Q to the input side of the flip-flop R for normal recycling of all $\overline{P}$ bits.

The principal control gate for the network causing execution of the Multiply order is the "and" gate 181 furnishing appropriate gating signals to the inhibitor input of gate 176 so as to block normal recycling of the P bits and to permit normal cycling of the $\overline{P}$ bits. Gate 181 thus provides signals responsive to a coincidence of the $VWXYE\overline{P}$ and VWXYE marking the multiply order execution conditions.

The P-bits are in general held in the flip-flop B for two bit periods. During P-bit periods the respective content of flip-flop B is applied to the input side of flip-flop R via a formation network 180 and an input gating network 182 for the flip-flop R. Presently the formation block 180 is not to be examined in detail; it is to be noted that with no other input applied to the formation network 180, its output signals agree with those furnished by the flip-flop B. The gate 182 is gated open to the pulse train furnished for times P by the principal control gate 181. The gate 182 is functionally similar to the gate 174 used for the communication between the output side of the flip-flop B with the input side of flip-flop R in FIGURE 13. For implementation portions of the gate assemblies 174 and 182 may be identical, as is apparent to one skilled in the art.

Thus far the network shown in FIGURE 15 is functionally and structurally very similar to that in FIGURE 13, and it provides for shifting of all P bits by two bit periods per cycle. However, the shifting operation for this order requires some more detailed discussion. In FIGURE 15*a* there is illustrated the content of the R register prior to the execution of the multiply order. It will be recalled from the discussion of FIGURE 13 that at the end of order cycling a new order will have been loaded into the V–Z register. The loading of the "new" order actually terminates after the last $\overline{P}$ bit period of an I word period, which time is designated by IGFP. During the next bit period which is a P bit period and is the very last bit period of the I word period (IGFP), the flip-flop R holds a bit, which as the result of the normal circulation is the last bit of the I word, which is the IGFP bit in proper, i.e., unshifter position and represents the most significant bit of the multiplier. At the same time, of course, this bit is fed into the input line R'' of the R delay line.

During the bit period IGFP the Multiply order has been decoded, and the decoder already products the VWXY enabling signal. In addition to being loaded into the R register, this last IP bit is also applied to the flip-flop A. This is illustrated in FIGURE 15 in terms of the general gate assembly 186 which is opened by an IGFP timing signal appearing at the last bit period of the I word period, and which is accompanied by the then already existing decoding Multiply order code VWXY. As a result, the content of the flip-flop R, i.e., the most significant bit of the multiplier, is copied into the flip-flop A. In the same way a bit of the multiplier is copied into the flip-flop A at each succeeding time IGFP, occurring at R-cycle rate, while the decoded Multiply order code signal VWXY is retained. As the multiplier is shifted by one P-cycle per R-cycle, all of the bits of the multiplier are sequentially set into flip-flop A.

Returning to the beginning of the Multiply order execution the first period is a $\overline{P}$ bit period, and it is the first one of the first $\overline{I}$ word period of multiply order execution. During this time the first $\overline{IP}$ bit is held in the flip-flop R, and it is the first bit of the multiplicand.

Presently only the shifting operation is to be described, and as the multiplicand is not shifted the description of any further utilization of this multiplicand bit will be deferred.

During the same time, i.e. during the first $\overline{P}$ bit period of the first $\overline{I}$ word period, the flip-flop Q holds the first bit of the $\overline{I}$P word, which, as shown in FIGURE 15*a*, is assumed to have a bit value zero. It occupies a space which at a later time will hold a bit of the partial product. Since at this point the shifting procedure is in operation, this bit will be delayed for two bit periods, as will all succeeding P bits. The shifting is carried out in exactly the same manner as described above. After almost one R cycle, i.e. at a time IGF$\overline{P}$, the flip-flop Q holds the most significant bit of the multiplier, while the flip-flop B holds the second most significant bit of the multiplier. The situation is to some extent comparable with the illustration of bit positions in the right hand portion of FIGURE 13*a*.

The bit "80" of FIGURE 13*a* can be considered to constitute the most significant of the multiplier, and the bit "79" is the second most. It will be recalled that the gate 175 in FIGURE 13 caused the input circuit for flip-flop B to be blocked for the IGF$\overline{P}$ bit period to exclude the 80th P bit at the end of the first R cycle; here the most significant bit of the multiplier is excluded in like manner. For the desired performance of the multiplication procedure this is still not sufficient. The injection of the second most significant bit, the P bit 79, into the line R'' must be avoided also. The second most significant bit of the multiplier is now in a position within the IP word which, during normal cycling before execution, was occupied by the most significant bit of the multiplier. The gate 186 is now opened again by the signals VWXY and IGFP, so that now the second most significant bit of the multiplier, bit "79," is fed into the flip-flop A at the end of the R cycle of multiply order execution.

Without further manipulation, the second most significant bit of the multiplier, then still in flip-flop B, would also be carried into the first P-bit position of the $\overline{I}$ word where it would become a part of the partial product. That is undesired. Accordingly the gating network 184 is used to "erase" the content of the flip-flop B at the time IGFP, and thereby to eliminate and suppress the second most significant bit of the multiplier, bit "79." Thus, P-bit "79" is in the flip-flop B only for three bit periods, sufficient to (1) permit its loading into flip-flop A, but (2) insufficient for its injection into the R register during the $\overline{I}$ word period. In the same way, flip-flop B is cleared before each R-cycle of the execution of the order multiply, including the first R-cycle thereof.

It is now apparent that after another R-cycle, during the time IGFP, the third most significant bit of the multiplier will be in flip-flop B. The third most significant bit of the multiplier is also copied into the flip-flop A, since gate 186 is open at the time IGFP, while concurrently the gate assembly 184 erases the third most significant bit of the multiplier in flip-flop B to prevent its injection in the succeeding time, $\overline{I}$P which is the first P bit period of the I word period.

For the purpose of describing a simple multiplication process it will be assumed that these activities proceed for altogether forty R-cycles. Then each of the forty multiplier bits will have been placed in flip-flop A. Each bit will have remained in the flip-flop A for a part of one R-cycle, during which time it has been used in forming what was defined above as the "gated multiplicant." The specific definition of the gated multiplicand will be given below. Each multiplier bit that has been loaded into the flip-flop A will, at the end of the next R cycle, appear in flip-flop B at a time when the gating network 184 causes erasure thereof. Thus, after forty R cycles, the multiplier has been eliminated completely. The erasing operation conducted and carried out by the gate 184 at the input of flip-flop B prevents passage of the multiplier bits into the $\overline{I}$P positions and it specifically prevents any multiplier bit from being represented twice in the R register (considering only the shifting process). This is unlike the long shifting operation in which always one bit was presented twice.

On the other hand the less significant part of the IP word position is step-wise emptied by virtue of the multiplier being shifted out of this word. This makes the step-wise emptied portions of the IP-word available for the product.

Before describing the formation proper of the product it should be mentioned that in the binary multiplication of two numbers, each having 40 bits, the product requires 80 bit positions. The IP-word at the outset is assumed empty, and during the multiplication, the P-positions of the I word are sequentially emptied because the multiplier is removed from these positions as aforedescribed. The originally empty "spaces" $\overline{I}$P and the step-wise emptied "space" IP are contiguous in time at the $\overline{I}$→I changeover, while the I→$\overline{I}$ changeover marks a fixed "border" of the product. After the multiplier has been completely shifted out of the IP-word, all P positions of the $\overline{I}$ and the I-word period are available for holding the product. During emptying, the step-wise enlarged $\overline{I}$P space is available to hold the step-wise enlarging partial product, possibly having more than 40 but less than 80 bits.

*Partial product formation.*—As will be described in the following, the product will be produced in steps in that the very first partial product occupies the $\overline{I}$P positions and while the partial product is being enlarged in steps it extends into the I-word period to the same extent that the multiplier has been shifted out of the I-word period.

We now return to the first bit period, an IGFP bit period, in which the order Multiply is held in the V–Z register. During this bit period, the most significant multiplier bit is copied into the flip-flop A, and depending upon the bit value thereof, flip-flop A will either be set or it will be reset. During the first $\overline{I}$-word period of execution, the flip-flop B holds the $\overline{I}$P bits, each for one P cycle. All these bits have the bit value zero, denoting the true fact that at the outset the initial partial product has the number value zero, assuming this to be a simple multiplication.

By operation of gate 176, flip-flop R holds the bits of the multiplicand ($I\bar{P}$) during the $\bar{P}$-bit periods of the $\bar{I}$-word period. The gate 187 forms what was briefly introduced above, the so-called "gated multiplicand" by providing a signal expressed as $RA\bar{I}$, by receiving the outputs of flip-flops A and R and the timing signal $\bar{I}$. This gated multiplicand is the multiplicand itself when flip-flop A, presently holding the most significant multiplier bit, is in the set state thereby representing the most significant multiplier bit value "1." The gated multiplicand has the number value 0 when this multiplier bit previously set into flip-flop A has bit value "0."

The first (or subsequent) partial product to be formed is the sum of the gated multiplicand and of the initial (or previously formed) partial product. Flip-flop C must, therefore, be operated as a carry flip-flop.

Its input set side should, therefore, be $BRA\bar{I}$ and gate 181 realizes this relation indeed, with the output of the principal control gate 181 serving to provide the gating signals for the $\bar{P}$ bit period at Multiply order executing conditions. The reset input side of flip-flop C should logically be $\bar{B}RA\bar{I}$. However, this is not necessary. The reset control gate 189 realizes instead a modified input signal, $\bar{B}$ $(\bar{R}+I)$. This deviation can be explained as follows:

The output of gate 184 is true during the first bit period in which the order Multiply is in the V–Z register, as defined by the circumstance IGFP VWXY. Thus, flip-flop C enters the first $\bar{I}$ word period of Multiply order execution in the reset state. If $\bar{A}=1$, $RA\bar{I}$ will not become true during this $\bar{I}$ word period, so that flip-flop C can never be set therein. Hence, an $\bar{A}=1$ control condition for the reset side of flip-flop C is not needed, at least for the first $\bar{I}$ word period. To continue, the input signal for gate 189 has the timing signal I as alternative input to insure that flip-flop C is reset during any I word period as soon as there occurs the circumstance $\bar{B}=1$, without permitting the creation of another carry bit during the I-word period.

Thus, flip-flop C is indeed operated as carry flip-flop which permits a carry to be carried into the I word but ensuring that no new carry can be created during the I word period.

The three output bits derivable concurrently from flip-flops B, R (i.e. $RA\bar{I}$) and C are fed to the formation network 180 realizing the relation: $B\neq C\neq RA\bar{I}$, which written in expanded form is equal to $$(B\bar{C}+\bar{B}C)\cdot\overline{RA\bar{I}}+(BC+\bar{B}\bar{C})\cdot RA\bar{I}$$

It will be recalled that above an assumption was made that gating network 180 passes the content of flip-flop B unmodified in case the two other inputs, i.e. C and $RA\bar{I}$ are both false. This fact can be verified from the above given logic relation.

During the first $\bar{I}$-word period of executing a simple multiplication, there will be $B=0$. Since flip-flop C can only be set by a $B=1$ bit, and since flip-flop C was reset by gate 184, $\bar{C}=\bar{1}$ during this first $\bar{I}$-word period so that the output of network 180 is directly $RA\bar{I}$, the gated multiplicand itself. The bits thus copied directly into the $\bar{I}P$ bit position of the R register represent either the multiplicant itself, if $A=1$, or the number zero (forty zero bits), if $A=0$. For the first $\bar{I}$ word period of executing the order Multiply the R delay line is thus loaded with the following data: at times $\bar{P}$, an unmodified multiplicand is recycled. At the respectively interleaved P-bit periods, the gated multiplicand is inserted into the R line. As the first bit period of an $\bar{I}$ word period is a $\bar{P}$-bit period, it contains the least significant multiplicand bit. In the immediately succeeding P-bit period, the last significant gated multiplicand bit is loaded into R'', etc. Near the end of this $\bar{I}$-word period, its last bit period is a P-bit period and the most significant gated multiplicand bit is loaded into the R line.

In the following I-word period, which is the first I-word period of Multiply order execution, gate 176 causes recycling of the unshifted instruction word bits ($I\bar{P}$ bits), while the formation network 180 causes the multiplier bits, each being delayed by one P-cycle by operation of the flip-flop B, to be set into the flip-flop R. During the first $\bar{P}$-bit period o fthis I-word period of the bit produced by the formation network 180 necessarily has the value "zero" for a simple Multiply. It derives from the last of the forty zero-bits which are initially held in the $\bar{I}P$-register, having been delayed for one P-cycle in flip-flop B. This bit will be described as the last (most significant) bit of the first partial product. This forty-first bit of the partial product is held in flip flop R and inserted into the R line during the first P-bit period of this I-word period. In the second P-bit period the least significant multiplier bit is similarly inserted, etc. We now come to the second R-cycle of Multiply order execution beginning with the second $\bar{I}$-word period thereof. Network 187 forms the gated multiplicand exactly as aforedescribed and the bit values thereof depend on the bit value of the second most significant multiplier bit set into A prior to the beginning of this second $\bar{I}$-word period as was described above. The action of the gate 184 at the end of the first I-word period has insured that the multiplier bit is not carried into the $\bar{I}$-word period. During the second $\bar{I}$-word period presently described, the gated multiplicand (multiplicand itself for the case $A=1$, forty "zeros" if $\bar{A}=0$) is added to the shifted first partial product as it is presented by flip flop B. (More precisely, this addition process is begun during this second $\bar{I}$-word period.) The shifted first partial product derives from the first gated multiplicand, in the following way: The forty bits of the first gated multiplicand, together with a forty-first bit (having the value "zero") form the first partial product. They are presented by flip-flop Q in the forty $\bar{P}$-bit periods of the second $\bar{I}$-word period and the first $\bar{P}$-bit period of the second I-word period. By reason of the one P-cycle delay, the shifted first partial product consists of forty-two bits of which the first (least significant) and the last (most significant) necessarily have the value "zero." The delay by one P-cycle serves to double the numerical value of the number shifted; thus the numerical value of the shifted first partial product is double that of the first gated multiplicand.

During the second $\bar{I}$-word period of execution the forty bits of the second gated multiplicand are additively combined with the first forty of the forty two bits of the shifted first partial product. Since two further bits of the shifted first partial product remain to be dealt with the addition process is not yet complete at the end of this word period and is therefore continued into the following I-word period, as will be discussed below. During the second $\bar{I}$-word period of execution of a simple multiplication in contrast with the first, a carry may be initiated, propagated, or extinguished as has been described earlier. The sum bits formed in the formation network 180 in the forty $\bar{P}$-bit periods of the second $\bar{I}$-word period and presented to the input side of flip flop R are the first (least significant) forty bits of the second partial product. Two further bits remain to be formed thereafter.

In the last $\bar{P}$-bit period of the second $\bar{I}$-word a carry condition may be initiated by the setting of flip flop C, or a previously initiated carry condition may be continued. In either case flip flop C will then be in the set state ($C=1$) at the beginning of the following I-word period. Such a carry can be propagated so as to affect one or both of the remaining bits of the second partial product; however no new carry can be initiated during the I-word period.

During the first $\bar{P}$-bit period of the second $\bar{I}$-word period network 180 forms the forty-first bit of the second partial product out of the carry bit held in C and the forty-first bit of the shifted first partial product which is presented by B. Gate 187 necessarily provides a zero bit at this time by reason of its input signal $\bar{I}$. That is proper since all forty bits of the multiplicand have already been used. If flip-flop B holds a one-bit and also $C=1$, indicating a carry, then that carry is propagated to the following P-cycle. In the second $\bar{P}$-bit period of this word the forty second (and last) bit of the second partial product is produced. At this time only flip-flop C can provide a one-bit to this sum since the forty second bit of the shifted first partial product is necessarily zero. It is by reason of the possibility of a carry into this position that the first partial product has been described as having 41 bits, the second as having 42 bits, etc.

In the third and suceeding $\bar{P}$-bit periods of this word period network 180 transmits without alteration the bit-values presented to it by flip-flop B since any earlier carry has necessarily been extinguished. These are the 38 bits of the multiplier that remain to be used.

The activities of the third and succeeding R-cycles of the execution of a simple multiplication are closely similar to those of the second. Immediately before the beginning of each $\bar{I}$-word period a bit of the multiplier is placed in flip-flop A and remains therein throughout the $\bar{I}$-word period. It serves in the formation of the gated multiplicand used in that R-cycle. Flip-flop C is reset immediately before the beginning of the $\bar{I}$-word period of an R-cycle and acts as the carry flip-flop in a process of addition which is carried during that $\bar{I}$-word period and in some part of the succeeding I-word period. One of the two numbers which are added is the shifted prior partial product as presented by flip-flop B. This partial product includes all of the P-bits held in flip-flop B during an $\bar{I}$-word period and some of the P-bits held in flip-flop B during the succeeding I-word period. The other number added to such shifted prior partial product is the gated multiplicand $RA\bar{I}$ as presented by gate 187. The numbers are serially formed during $\bar{P}$-bit periods with flip-flop C serving as carry flip-flop as described. This adding is continued during the I-word periods, during which gate 187 presents only zeros, and the carry bit, if any, is combined with the bits presented by flip-flop B during the first part of the I-word period. During the I-word period of the period of execution of the order Multiply flip-flop A takes part in the process of incrementation of the count number as has been described earlier because the multiply order is necessarily a long order requiring, in most instances, more than two R cycles for execution. Thus, flip-flop A cannot hold a bit of the multiplier during an I word period. Since, however, the gated multiplicand has only zero bits during the I word period, as indicated by the factor $\bar{I}$ in the expression $RA\bar{I}$, the retention of the multiplier bit during an I word period is not needed. The more than forty bits of this new partial product (one more bit than that of the preceding R-cycle) are thus recorded in the earliest P-bit positions of the R-cycle. In the remaining P-bit positions there are recorded those bits of the multiplier which have not yet been used in forming gated multiplicands, shifted once again.

It is to be understood that the distinction which is drawn in the preceding paragraph between the earlier part of the R-cycle, in which both a shifting and an adding process are carried out, and the latter part in which only a shifting is performed, does not reflect any change in the mode of operation of the circuits. It reflects only the progressive advancement of the phase—with the R-cycle—after which the laws of binary arithmetic ensure that the bits of the sum do not differ from those of one of the two numbers being added.

It can thus be seen that the adding process is not limited to the $\bar{I}$ word period even though multiplicand bits proper are presented only during the $\bar{I}$ word period. The last carry bit formed at a time $\bar{I}GFP$ will be carried into the following I word period and will be added in network 180 to the more significant portion of the partial product which extends into the I-word period. However, any carry bit "carried" into the I-word period, will never travel further than the bit period which precedes the least significant multiplier bit position. Once this most significant partial product bit position is occupied by a "one" bit, no carry bit can ever reach this position but will be extinguished earlier. Thus, the formation network 180 continues to operate as a sum forming network through a full R-cycle, i.e., continuously during Multiply order execution.

More specifically one could say that during any full R-cycle the formation network 180 provides for serial addition of two 80 bit words each. One eighty-bit word is comprised of the bits presented by flip-flop B during an R-cycle. The other eighty-bits are those presented during the same R-cycle at times $\bar{P}$ by gating network 187.

The augend of this addition is comprised of the forty gated multiplicand bits $RA\bar{I}$ (which are $\bar{P}$ bits). This augend is continued into the succeeding I word period by the output bits presented and defined by gating network 187 for the $\bar{P}$ bit periods. These are 40 zero bits. The $I\bar{P}$ word proper which is an instruction word, is being circumvented for the sum formation as we regard as augend only the output of the gate 187 which does not pass the instruction word.

The 80-bit word serving as addend for this sum formation is defined by the partial product bits occupying all P bit position of the $\bar{I}$ word period and some of the I word period as they are presented by flip-flop B. This addend also includes the remainder of the multiplier, because the multiplier bits also pass through flip-flop B. But as this addition is a bit by bit summation, and as during the I word period the augend furnishes only zero bits, only zero bits are added to the multiplier, so that the bits of the latter only are shifted, but they are not modified otherwise. Thus, even though the multiplier takes part of this addition of two 80-bit words, the multiplier is not modified because to it are "added" only zero bits. Any carry bit of this summation can be produced as a carry bit with a bit value 1 only during the $\bar{I}$ word period, and such carry bit can never propagate further than into the one P bit position preceding the least significant multiplier bit position.

The process of addition which is performed in each R-cycle of the period of execution of the order Multiply differs in four significant aspects from that performed during the execution of the order Add: first, the execution of the order Add is performed within one $\bar{I}$-word period while the addition process performed in each R-cycle of the execution of the order Multiply may be described as extending over the full R-cycle consisting of one $\bar{I}$-word period and the succeeding I-word period or it may alternatively, and for some purposes more conveniently, be described as extending over the said $\bar{I}$-word period and also over that part of the succeeding I-word period over which carry propagation is possible.

Second, after execution of the order Add a carry bit may be left in flip-flop C and that "overflow bit" may be held there for use in a subsequent operation, as desired by the programmer. By contrast, each adding operation in the execution of the order Multiply is followed by the resetting of flip-flop C at the end of that R-cycle. In particular, at the end of the last (the fortieth) R-cycle of the period of execution of a simple Multiply order flip-flop C is reset so that no "overflow bit" can be retained thereafter.

Third, the important activities of the execution of the order Add are performed during P-bit periods, while the corresponding activities in the execution of a Multiply order are performed in $\bar{P}$-bit periods. These activities are the delivery of the sum bit—to the input to the R-line for the order Add and to the input to flip-flop R for the order Multiply—and the modification as needed of the state of the carry flip-flop C. The fourth significant difference is that the execution of the order Multiply makes use only of bits held in the R-register, and delivers its result thereto, while the order Add makes use of a number which is being presented by the M-register.

In a simple Multiply operation two 40-bit numbers are multiplied to produce an 80-bit product. The possibility that the most significant bit of the product may have the value "one" requires the propagation of carry bits during the I-word periods. Thus carry propagation is able to influence bit positions of the partial product to the full extent permitted by the shifting of the multipler out of the IP-register. It is not, however, possible in a simple Multiply for carry propagation to extend beyond the range which has been described as "occupied by the partial product" and thereby to falsify one or more bits of the multiplier. That such falsification of the multipler is impossible can be understood by observing that the product of two numbers, each of which is an integer smaller than $2^{40}$, is necessarily smaller than $2^{80}$. In Multiply operations other than simple Multiply; as for example in an accumulative Multiply, care is required to ensure that the result does not extend beyond its intended range.

In the foregoing discussion a Multiply operation has been called "simple" if the initial content of the $\bar{I}$P-register is zero and if the period of execution of the order is exactly 40 R-cycles. The period of execution of the order Multiply, like other long orders, is determined by the "extended count number," C#, as has been described earlier. Specifically, the duration of the period of execution; that is the period of time over which flip-flop E remains set while the long order code is held in the V–Z register, is (64—C#) R-cycloes. For a simple Multiply this duration is to be 40 R-cycles, thus C# is to have the value 24. Since this number is smaller than 32, the most significant bit of C# has the value zero. That bit is the Z-bit of the Multiply order code as it is initially shifted into the V–Z register, or as it initially appears in the instruction word. Accordingly, the Multiply order code to be used for a simple Multiply is (V–Z)=(1,1,1,1,0) where the Z-bit is shown to the right. The count number syllable following this Multiply order in the instruction word is to have the decimal value 24, which as a binary number has the value $c\#=(1,1,0,0,0)$. Here the most significant bit is shown to the left, the least significant to the right.

In a simple Multiply a 40-bit multiplicand, held in the $\overline{IP}$-register, is multiplied by a 40-bit multiplier consisting of all of the 40 bits initially held in the IP-register. The product, an 80-bit (double length) number, is held in the IP-register (more significant part) and the $\bar{I}$P-register (less significant part) at the end of the 40 R-cycle period of execution. As has been mentioned briefly above, other types of multiplication operations can also be performed. In particular, the duration of the period of execution may be made other than 40 R-cycles, by the use of an extended count number differing from 24. If C# is greater than 24 then the period of execution will be shorter and the number of bits of the multiplier which are actually used will be smaller. That number will be denoted N. A multiplication for which N is less than 40 will be termed "abridged." Here, and in the following, it is convenient to apply the term "multiplier" to the number consisting of the N bits which are actually used in the Multiply execution; that is to the N bits which are held in flip-flop A during $\bar{I}$-word periods of the period of execution and which are used in the formation of gated multiplicands. For an abridged multiplication the multiplier consists of the N most significant bits held in the R-register as the IP-word before the execution. If the abridged multiplication is not also accumulative the remainder of the P-bit positions may be presumed to hold zero bits.

An abridged multiplication (which is not accumulative) produces the $(40+N)$-bit product of the 40-bit multiplicand and the N-bit multiplier. This product is left in the $\bar{I}$P-bit positions of the R-register (the less significant part) and in the N least significant bit positions of the IP-word (the more significant part).

It is also possible to perform a multiplication with a multiplier of more than 40 bits, by choosing a correspondingly smaller extended count number. A multiplication for which N is larger than 40 will be termed "extended." The N bits of the multiplier are initially held as the IP-word, holding the most significant 40 bits, and in the most significant N-40 bit positions of the $\bar{I}$P-word, To ensure that the product does not exceed the available (80-bit) capacity of the P-bit positions it would normally be necessary to require that the N-40 most significant bits of the multiplicand held in $\overline{IP}$-bit positions have the value "zero." Such an extended multiplication may thus be described as forming the 80-bit product of a (80-N)-bit multiplicand and an N-bit multiplier.

An accumulative multiplication is one for which the initial content of the P-bit positions, with the exclusion of the multiplier, is not zero. The number thus held takes part in the addition process of the first R-cycle of a period of execution as if it were a prior partial product and is thus additively incorporated into the result; most particularly into the most significant part of the result. As has been briefly indicated above, care must be exercised by the programmer who wishes to make use of the Multiply order in other than simple multiplications to ensure that a clear separation is maintained between the multiplier and the result being formed.

(c) *Division*

The control circuit and the interconnection of the various flip-flops for carrying out a division by executing the order Divide will be explained next with reference to FIGURE 16. Before the execution of a Divide order, the dividend and the divisor are both held in the R register and must have been loaded into the R register by the execution of appropriate "Bring" orders preceding the execution of a Divide order. There will first be described a "simple" divide, approximately corresponding to "simple" multiply.

The divided is a double length, i.e., eighty-bit number held in the dividend register which consists of the eighty bit positions of the $\bar{I}$P and the IP portions of the register, i.e., all P bit positions of the R register are occupied by the dividend. The $\bar{I}$P positions hold the more significant forty bits of the dividend and the IP position hold the less significant bits of the dividend. The divisor occupies the $\bar{P}$-positions of an $\bar{I}$-word period. Thus, the divisor bits are interleaved with more significant portion of the dividend. The $\bar{I}$P bits, of course, pertain to an instruction word as usual. It is to be noted that this relationship between the $\bar{I}$P-word and the IP-word, as two parts of the dividend, is the reverse of their relationship when holding the two parts of an 80-bit product following a multiplication. After an order Multiply the IP-word is the *more* significant part of the product; before a Divide it is the *less* significant part of the dividend.

The $\overline{IP}$-word in the R register holds the 40-bit divisor throughout the divide process as stated. For the purpose of the present discussion the divisor will be regarded as a positive integer, which is necessarily smaller than $2^{40}$. Similarly the dividend will be regarded as a positive integer which is smaller than $2^{80}$. It should be understood, however, that other interpretations of the numerical significance of these number-words are possible and are often convenient.

The quotient is generated as a 40-bit integer and is left as the IP-word in the R-register at the end of a simple Divide operation. It is clear that this form for the quotient imposes a restriction on the relative magnitudes of the dividend and divisor; namely that the true quotient of these two numbers must be smaller than $2^{40}$. In other words, it is a condition for the correct execution of the Divide order that the dividend is smaller than $2^{40}$ multiplied by the divisor. This statement of the condition for correct division depends on the interpretation of dividend and divisor as binary integers, each with its binary point at the extreme right. It is, however, a condition upon the constellation of one-bits and zero-bits held as the $\overline{IP}$ word in the R-register and in the P-bit positions and does not depend on the numerical significance which the programmer chooses to ascribe to them.

The activities which occur during execution of an order Divide may be summarized as follows: in the first R cycle of the period of execution, the dividend is shifted by one P bit position and prior to its reinsertion into the R delay line the unshifted divisor ($\overline{IP}$) is serially subtracted from the more significant portion of the dividend, beginning with the least significant bits as presented during the $\bar{I}$ word period. The result will be a modified dividend called the remainder, again occupying the P bit positions. The subtraction is cut off at the end of the $\bar{I}$ word period, but the shifting of the P bits proceeds uninterruptedly throughout execution of the divide order.

There will be a borrow bit, having either the bit value 1 or bit value 0, left at the end of the subtraction (end of $\bar{I}$ word period) and this borrow bit is stored temporarily. It is emphasized that unlike the single subtract order execution, we here always speak of a borrow bit at the end of this particular subtraction. Rather than speaking about existence or non-existence of a borrow condition, it is preferred here to speak about a borrow bit value "1" or "0" as the case may be. The entire remainder is shifted without bit suppression at the $I \rightarrow \bar{I}$ transition so that the less significant dividend portion is shifted by one step (P cycle or bit position) per R cycle from the IP word positions to the $\bar{I}P$ word positions. The more significant dividend portion held originally in $\bar{I}P$ is in effect not shifted into the IP positions because the divisor was subtracted therefrom during the $\bar{I}$ word period and the bit transferred into the least significant bit position of the IP word is the modified borrow or sign bit which constitutes a bit of the newly formed quotient.

With each subsequent R cycle the remainder is shifted by one P cycle and subjected to a further correction to form a new remainder. The nature of this correction which is applied to the shifted prior remainder depends upon the sign of that prior remainder. If the prior remainder was positive then the divisor is subtracted from the shifted prior remainder to form a new remainder. If the prior remainder was negative then the divisor is added to the shifted prior remainder to form a new remainder. Thus there is one subtraction or addition of the divisor in each R cycle of the period of execution of the divide order. This subtraction or addition, as the case may be, of the divisor will be termed "reduction" of the shifted prior remainder.

In the first R cycle the prior remainder is in fact the dividend itself which is necessarily positive. Accordingly the reduction performed in the first R cycle is necessarily a subtraction of the divisor.

As the less significant portion of the dividend is thus shifted out of the IP word positions into $\bar{I}P$ word positions, the P bit positions of the I words thus vacated are filled by bits of the quotient, while the content of the $\bar{I}P$ word positions are subjected to reduction in each R cycle prior to reinsertion of the thus modified bits into the R delay line. Thus, the space occupied by the quotient is progressively built up, and that of the dividend at first, subsequently of the remainder that is formed, is reduced. Termination of this process will be described below.

The successively produced remainders may either be positive or negative as indicated by the sign bits. Each sign bit is formed in a bit period $\bar{I}GFP$, and this sign bit is complemented for insertion into the R delay line. The formation of the quotient bit and of the sign bit of the remainder will be described below.

We turn now to the detailed description of FIGURE 16. In FIGURE 16 there is described a network which (1) provides for shifting of the dividend-remainder, i.e. of all the P bits, (2) repeatedly adds the divisor to or subtracts it from the more significant portion of the dividend or remainder, and (3) forms the quotient.

In the bit period IGFP succeeding the setting of the Divide order code VWX$\bar{Y}$ into the order register 50, flip-flop E is still off, but $\bar{Y}$ will already be true, which circumstance is used to reset flip-flop A. Flip-flop C is reset by a signal from a gate 194 responding to the circumstances VWX$\bar{Y}$ IGFP ($\bar{E}$+ . . .). During execution of the order Divide, flip-flop B takes part in the shifting of the P bit in much the same way as has been described for the order Shift-long and Multiply. The P bits (dividend) are presented by flip-flop Q in the $\bar{P}$ bit periods. With exception of the last bit to appear in a I word period during the period of execution, these bits are set into the flip-flop B via the gates 173 as previously described. These P bits generally remain in the flip-flop P for two bit periods and are then placed into flip-flop R, either directly as admitted through gates 193 or via the correction network 190 and input gates 192.

The principal control gate for the network used for executing the divide order is "and" gate 191 providing pulses at times $\bar{P}$ when the Divide order code VWX$\bar{Y}$ is in the order register, and after flip-flop E has been turned on. For direct copying of the bits in flip-flop B, gates 193 receive this output signal of gate 191 as modfied additionally by a gate 195 to restrict these timing pulses ($\bar{P}$) to the I word periods. The output of the correction network 190 is set in the flip-flop R in the $\bar{P}$ bit periods of the $\bar{I}$ word periods, when the signal $\bar{I}$ E $\bar{P}$ VWX$\bar{Y}$ provided by gates 190 and 191′ opens the gates 192. These P bits are reintroduced into the R delay line from flip-flop R without further change.

The $\bar{P}$ bits of the R delay line representing the divisor and the instruction word, are copied from the flip-flop Q into the flip-flop R by operation of gate 176 to be reintroduced into the R delay line so as to permit unchanged recirculation of the $\bar{P}$ bits with the exception of the incrementation of the count number which has been described earlier.

The first word period of the Divide order execution is an $\bar{I}$ word period, so that correction network 190 comes into play immediately. Network 190 has three inputs which are the outputs of flip-flops B, R and C. The output of network 190 is set into flip-flop R by operation of gate 192 opened by the pulse train from gate 191′ during $\bar{P}$ bit periods. As stated, flip-flop B always holds the dividend bits (P bits). During $\bar{P}$ bit periods of this first $\bar{I}$ word period as well as the other $\bar{I}$ word periods, of Divide order execution, flip-flop R holds $\bar{P}$ bits representing the divisor. As $\bar{A}=1$ at the beginning of Divide order execution the gating network 198 is enabled, receiving additionally the pulse train from gate 191′ during $\overline{IP}$ bit periods. Gating network 198 forms set and reset signals for flip-flop C by realizing $sC=R\bar{B}$ and $rC=\bar{R}B$ (for $\overline{AI}E\bar{P}VWX\bar{Y}$). Flip-flop C operates as a borrow flip-flop so that the correction network 190 realizing the relation $(B \neq C \neq R)$ performs subtraction between the more significant dividend portion and the divisor.

At the end of the first $\bar{I}$ word period of Divide order execution, specifically during the time $\bar{I}GF\bar{P}$, the bit then held in flip-flop R is the most significant, unshifted bit of the divisor, the bit concurrently held in the flip-flop B is the next most significant bit of the dividend, flip-flop C holds a borrow bit processed out of the second most significant divisor bit and the third most significant dividend bit. Thus at this instant $\bar{I}GF\bar{P}$, network 190 performs the last serial subtraction, and during bit period $\bar{I}GFP$ the flip-flop R holds the resulting bit. At the last bit period of the $\bar{I}$ period which is an $\bar{I}PFG$ bit period, this last bit of the newly formed remainder is applied to line R″ for insertion into the R delay line. Concurrently thereto, a gating network 196 is opened by an $\bar{I}PFG$ timing pulse to process the existing content of flip-flop B and C. Flip-flop B holds the most significant dividend bit. Flip-flop C holds the borrow bit as formed of the next most significant (previous) remainder bit and of the most significant divisor bit. Out of these values, network 196 forms the bit signals $B \neq C$ and $B \neq \bar{C}$, of course, only one thereof will be true while the other one is necessarily false. These two signals are used in that $sC=(B \neq C)$, $rC=(B \neq \bar{C})$ which is the true remainder sign bit having resulted from this subtraction during the now terminating $\bar{I}$ word period. This sign bit is thus stored in flip-flop C temporarily. The two signals are used in the inverse order to form a new input for flip-flop B: $sB=(B \neq \bar{C})$, $rB=(B \neq C)$. A quotient bit is thus set into flip-flop B at the beginning of the first bit period ($\bar{P}$) of the I word period, and it is transferred to R at the beginning of the first P bit period thereafter.

The count number that accompanies the divide order is incremented during the first I word period of divide order execution, and this requires participation of the flip-flop A. The end of this I word period is marked by the bit period IGFP.E at which time the participation of the flip-flop A in incrementing the count number is terminated. Thus, the content of flip-flop C (the sign bit) can now be copied into the flip-flop A. The gate assembly 197 connects the output side of flip-flop C to the input side of flip-flop A for the IGFP bit period which is the very last bit period of the I word, and flip-flop A holds the sign bit of the previous remainder subsequent to the $I \rightarrow \bar{I}$ transition.

After the clock pulse causing a changeover to the $\bar{I}$ word period, the first remainder, shifted by the P cycle, and the unshifted divisor are combined. Depending upon the sign bit held at that time in flip-flop A, either the gate assembly 198 will be enabled again if the sign bit represents a positive sign ($\bar{A}=1$); if the sign bit proves to be a negative one, then flip-flop A is set so that another gate assembly 199 for the input side of flip-flop C is being enabled therewith.

The gate assembly 199 provides set and reset side input signals for flip-flop C by combining R, $\bar{R}$, B and $\bar{B}$ as follows: flip-flop C will be set when R.B is true, while for resetting the combination $\bar{R}.\bar{B}$ is used, both cases always in $\bar{P}$-bit periods. Thus, flip-flop C operates as "carry" flip-flop. Thus, upon enabling gate assembly 199, flip-flop C will control the correction network 190 in such a manner that during the second $\bar{I}$ word period of Divide order execution the divisor and the remainder are being added serially, and the sum bits are seuqentially loaded at times P into the R-delay line.

We shall now consider the general aspects of this devide order execution.

The reduction of the shifted prior remainder performed in each R-cycle of the Divide execution is in many respects similar to the addition of the gated multiplicand performed in the execution of a Multiply order. Several differences are, however, to be noted:

(1) The reduction of the shifted prior remainder is performed entirely within the $\bar{I}$-word period of each R-cycle of Divide execution. No carry (or borrow) propagation from the $\bar{I}$- into the I-word period takes place. Bits of the less significant portion of the dividend, initially held in the R-register as IP-word, take part in the correction process only after such IP-bits have been shifted to become $\bar{I}$P-bits by the general process of shifting of P-bits already described.

(2) The correction of a shifted prior remainder to form a new remainder occurs in each $\bar{I}$-word period during Divide execution and not only in those $\bar{I}$-word periods for which flip-flop A holds a one-bit. Thus no "gated divisor," analogous to the gated multiplicand, is used. Nevertheless, the bit held in flip-flop A does determine the nature of the correction process; if $A=0$ the divisor is subtracted from, if $A=1$ the divisor is added to, the shifted prior remainder to form the new remainder.

(3) In contrast with other numbers thus far discussed, the remainder formed in each R-cycle of Divide execution is a signed number which may be either positive or negative. The distinction between these two possibilities is indicated by a "sign bit" of the remainder whch has the value "one" if the remainder is negative, "zero" if it is positive. It is this sign bit, formed at the end of an $\bar{I}$-word period, which is to be set into flip-flop A to control the correction process in the next succeeding $\bar{I}$-word period of the Divide execution. The way in which the sign bit is formed and used will be described in the following.

The performance of the correcting process; that is, the reduction of the shifted prior remainder is, for the most part, carried out during the $\bar{P}$-bit periods of the $\bar{I}$-word periods of the period of execution of the Divide order. It consists of the serial binary addition (or subtraction) of two numbers as determined by the state of flip-flop A. The performance of this adding (subtracting) operation is somewhat similar to that which occurs in the execution of the single order Add (Subtract). In particular, flip-flop C serves to hold carry (borrow) bits generated in, and propagated during, the addition (subtraction). In preparation for that addition (subtraction) flip-flop C is reset immediately before the beginning of each $\bar{I}$-word period of the period of execution. Gate 194 provides the signal which produces this resetting; it may be indicated by the expression IGFP VWX$\bar{Y}$ $(\bar{E}+\bar{A}+\bar{Z})$. The last factor in this expression indicates that no similar resetting occurs at the end of the last R-cycle of the period of execution.

In each $\overline{IP}$-bit period flip-flop B holds a bit of the shifted prior remainder, that is, a bit of augend (minuend) of the addition (subtraction) operation. At the same time flip-flop C holds the then-present carry (borrow) bit. Flip-flop R holds a bit of the divisor which is the addend (subtrahend). Formation block 190 produces the sum (modulo 2) of these three bit-values, together with its complement. These signals are admitted as inputs to flip-flop R via gates 192 which are opened by the signal $\overline{IP}$ E VWX$\bar{Y}$ which is provided by gate 191. The bit thus set into flip-flop R is a bit of the sum (difference) being formed; that is, a bit of the new remainder.

The setting and resetting of the carry/borrow flip-flop C is controlled by the gates 198 and 199 throughout the Divide order execution in accordance with the same rules as have been described earlier for the Add and Subtract orders. Each of these gates also receives an input from one or the other output signal of flip-flop A so that gates 198 are effective during the performance of a subtraction, as allowed by the condition $\bar{A}=1$ and gates 199 are effective during the performance of an addition, as allowed by $A=1$. Immediately before the period of execution flip-flop A has been reset by a signal $\overline{EY}$, thus ensuring that the arithmetic process performed in the first R-cycle is a subtraction and not an addition.

The processes described above form 40 bits of the new remainder, and set them into flip-flop R, during the 40 $\overline{IP}$-bit periods of each R-cycle. In the next succeeding P-bit periods these 40 bits of the new remainder are reinserted into the R-line. Since the remainder is to be formed as a signed number, one further bit of the new remainder must be formed, namely its sign bit. (For the purposes of the present part of the discussion it is convenient to disregard all bits of the dividend which yet remain to be shifted into the $\bar{I}$-word period, and to speak of these 40 bits together with the not-yet-described sign bit as composing the new remainder.) The sign bit of the new remainder is formed during the last bit period of the $\bar{I}$-word period and set into flip-flop C where it is to be stored for use at a later time. This new sign bit is a forty-first bit of the new remainder, in the sense that its position-value is twice that of the fortieth bit of the new remainder which is held in flip-flop R during this last (P-) bit period of the $\bar{I}$-word period. It is a sign bit in the sense that its position-value is negative, rather than positive as are all of the other bits of the remainder, thus if the sign bit has the value "one" the entire remainder is necessarily a negative number. Conversely, if it has the value "zero" the remainder is a positive number, (which may, in particular, be the number zero).

The forty-first bit of the new remainder is formed by the same procedure used in forming the earlier bits; namely it is the sum (modulo 2) of the following three bits: the augend (minuend) bit, the carry (borrow) bit, and the addend (subtrahend) bit. The first of these three is the forty-first bit of the shifted prior remainder; that is, the fortieth bit of the prior remainder. It was presented by flip-flop Q during the last $\bar{P}$-bit period of the $\bar{I}$-word period and was at that time set into flip-flop B. During the succeeding P-bit period, when the forty-first bit of the new remainder is formed, that bit is being presented by flip-flop B. The second of these three bits, the current carry or borrow bit, is held in flip-flop C. The third bit to be used in the formation of the sign bit of the new remainder is the sign bit of the divisor; that is, the forty-first bit of the divisor. Since the divisor is, by hypothesis, necessarily positive, its sign bit must have the value "zero." Accordingly, only the two bits held in flip-flops B and C must be added (modulo 2) to produce the forty-first bit of the new remainder. The reasons for considering this bit to be the sign bit of the new remainder are presented below. For the present this sum (modulo 2) of the two bits held in the two flip-flops B and C, in the bit period ($\bar{I}$GFP of the $\bar{I}$-word period will be described as the sign bit of the new remainder. This bit may be represented by the expression ($B \neq C$) where the symbol $\neq$ represents again the exclusive-or function of the two variables combined, or their sum (modulo 2).

The bit expressed by ($B \neq C$), at the time $\bar{I}$GFP, together with its complement, is formed by the circuits 196. The bit ($B \neq C$) is set into flip-flop C as admitted by circuits 196 at the time $\bar{I}$GFP. This, as will be shown below, is the sign bit of the new remainder. In the same bit-period, namely at the time $\bar{I}$GFP, the complement of this bit is also formed by the circuits 196 and set into flip-flop B. There, this complement of the sign bit of the current remainder becomes a bit of the quotient since it will be set into the flip-flop R in the next succeeding bit-period (which is a $\bar{P}$-bit period) and will be reinserted into the R-line as a bit of the quotient in the bit-period following thereafter, namely in the first P-bit period of the I-word period following the formation of this remainder-sign-bit and this bit of the quotient.

The remainder sign bit is held without change in flip-flop C throughout the I-word period succeeding the time of its formation. In the last bit-period of that word period, at the time IGFP, that sign bit is copied into flip-flop A via circuits 197. It thereby becomes available for the controlling of another reduction of the remainder in the event that the period of execution of the divide order has not come to an end. In the same last bit period of an I-word period flip-flop C is usually, although not invariably, reset in preparation for this next reduction operation by the signal provided by gate 194 as has already been described. At the end of the last I-word period of the period of execution this resetting of flip-flop C is prevented by the falseness of the third input to the And gate 194, the signal designated ($\bar{E}+\bar{A}+\bar{Z}$). The sign bit of the last-formed remainder thus stays in flip-flop C at the end of the period of execution where it is available for use in various ways as will be described below.

In the foregoing discussion each correction of the shifted prior remainder has been called a "reduction." That term is intended to imply only a general tendency for the later remainders to be smaller in magnitude than earlier ones. This tendency can be understood by the following considerations: Before the execution of the Divide order the divisor is presented as $\bar{P}$-bits in the $\bar{I}$-word period interleaved with the 40 most significant bits (P-bits, $\bar{I}$ word period) of the 80-bit dividend. (Only a "simple" divide operation is here considered.) The successive shifting of the dividend and of the successive remainders brings the divisor into juxtaposition with progressively less significant parts of the remainders. The effect of the shift and subtraction in the first R-cycle of the period of execution is to "reduce" the dividend by the subtraction from it of a multiple of the divisor. Since it is to be assumed, as a condition for the correct performance of the division, that the dividend is positive and is smaller than the divisor multiplied by $2^{40}$ it may be concluded that the magnitude of the first remainder is no greater than the number just subtracted. Since this first remainder may be either positive or negative one additional bit is needed for its representation. That additional bit is the sign bit formed at the time IGFP and set into flip-flop C. It is to be regarded as having a position-value which is negative and of twice the magnitude of the position-value of the bit being reinserted into the R-line at that time. In this first R-cycle the position value of this sign bit is $-2^{79}$. Since the magnitude of the first remainder is necessarily smaller than $2^{79}$ this one "additional" bit suffices for its representation.

In the second R-cycle the multiple of the divisor used in the correction process is $2^{38}$ times the divisor, since a second shifting occurs before the correction. If the first remainder was positive, this smaller multiple of the divisor is subtracted from it; if the first remainder was negative it is increased by the same amount. In either event the magniture of the second remainder can be no larger than $2^{38}$ times the divisor, and is therefore smaller than $2^{78}$. Thus again one "additional" bit formed at the time IGFP and having the position value $-2^{78}$ suffices to represent all possible values for the second remainder, whether it is positive or negative.

Similarly, in the third R-cycle there is formed a third remainder which must be smaller in magnitude than $2^{77}$, etc. In this way the division process ensures progressively tighter limits on the successively produced remainders. In the last (the fortieth) R-cycle of the period of execution there is formed a fortieth remainder which is no greater in magnitude than the divisor itself and therefore is of magnitude smaller than $2^{40}$. Since this last remainder, like its predecessors, may be of either sign its representation requires 41 bits. These are the 40 bits left as the $\bar{I}$P-word in the R-register together with the sign bit of position value $-2^{40}$, which remains in flip-flop C. This 41-bit final remainder will be termed the "uncorrected remainder," since in some circumstances a modification of it is required to produce a conventional remainder. Specifically, if the uncorrected remainder is negative, as indicated by a one-bit left in flip-flop C, then the divisor must be added to the uncorrected remainder, after first resetting C, to produce the corrected remainder. That addition leaves an overflow bit in flip-flop C which is not, however, to be regarded as a sign bit of the corrected remainder which is necessarily positive.

In many programs the remainder resulting from a division is of no interest; the uncorrected remainder can then be cleared from the $\bar{I}$P-register and from C rather than being used to form the corrected remainder.

The corrected remainder is necessarily smaller than the divisor, as can be indicated as follows: each remainder is generated in the execution of the divide order by the addition or subtraction of a "shifted divisor" in accordance with the sign of its predecessor. It has been shown above that as a consequence of the assumed condition for correct division the magnitude of each remainder, and in particular of the last uncorrected remainder, is less than or equal to that of the "shifted divisor" used in forming it. The case "equal to" occurs only if the preceding remainder is zero and therefore if the present remainder is negative. That situation, for the final remainder, leads to a corrected remainder of zero. It can thus be seen that the corrected remainder is "correct" in the conventional sense; that is, it is a positive integer smaller than the divisor which has been obtained by subtracting an integral multiple (perhaps zero) of the divisor from the dividend. It remains to be shown that the 40 "quotient" bits left as the IP-word in the R register correctly represent this multiple. That will be shown in the following paragraph.

In the first R-cycle of the period of execution a sign bit and a quotient bit are generated. The quotient bit is set into flip-flop B to be shifted into the IP-bit positions to become the most significant bit of the quotient generated during this "simple" division, with the position-valve $2^{39}$. This first and most significant bit of the quotient will be designated $q_{39}$ since its position-value is $2^{39}$. The bit of the quotient produced in the second R-cycle will be called $q_{38}$ and its position-value in the quotient is $2^{38}$, etc. Each of these 40 quotient bits is a binary variable, having one of the two values "zero" and "one." Each of these is the complement of a sign bit, so that each except the last corresponds to a reduction performed in one of the 39 R-cycles after the first in the period of executions. The last quotient bit corresponds to the presence or absence of the addition of the divisor performed in correcting the remainder. These quotient bits thus determine collectively the multiple of the divisor which has been subtracted from the dividend in bringing it to the value of the corrected remainder. This multiple will be denoted Q, so that Q is the true quotient produced by this process.

In the first R-cycle of the period of execution the multiple $2^{39}$ of the divisor was unconditionally subtracted from the dividend, thus providing the contribution $2^{39}$ to the value of Q. The second R-cycle contributes the value $\pm 2^{38}$; where the sign depends on the first remainder-sign-bit, hence on the value of $q_{39}$. Specifically, the sign of this contribution ($2^{38}$) to Q is (+) if the first remainder was positive and $q_{39}$ had the value 1, and (−) if $q_{39}=0$. Both of these possibilities may be represented by expressing the contribution to Q represented by $q_{39}$ as $(2q_{39}-1)2^{38}$. Similarly the correction in the third R-cycle contributes the amount $(2q_{38}-1)2^{37}$ to Q, etc. to the quotient bit $q_1$. The last quotient bit, $q_0$, deviates from this format since it indicates only an addition of the divisor in correcting the remainder in the event that the last uncorrected remainder was negative, i.e., if $q_0=0$. Thus, the last bit of the quotient contributes to Q the value $(q_0-1)$. Thus, altogether, the value of the quotient is found to be $$Q=2^{39}+(2q_{39}-1)2^{38}+\ .\ .\ .\ (2q_1-1)2^0+(q_0-1)$$
$$=(q_{39}2^{39}+\ .\ .\ .\ +q_02^0)+(2^{39}-2^{38}-\ .\ .\ .\ -2^0-1)$$

Since the second of these parenthetical expressions sums to the value zero the true quotient is indeed represented in conventional form by the forty bits shifted into the IP-register during the forty R-cycles of the period of execution of the "simple" divide.

All of the foregoing discussion has dealth particularly with simple divisions. For these the period of execution is 40 R-cycles, thus requiring the value 24 for the extended count number. It will be understood that a division order with a greater or smaller duration can also be performed. The divide execution can be made to yield any designated number of quotient bits, subject to the obvious limitations of register capacity, by suitable choice of the count number. The condition for correct performance of the division is readily extended to other than simple divisions. In very general terms, this condition requires that the format in which the quotient is produced be such as to permit the expression of the true quotient desired.

The Divide order is followed by a Conditional Fill order which introduces a branching of the program depending on whether or not the remainder-correcting process is needed. That process is effected by the instruction word filled by a "successful" execution of the Conditional Fill. It will often be true, and it will here be assumed, that the divisor is held in some P-word of memory (as well as the $\overline{\text{IP}}$ word in the R register). The correction program will then contain a Wait order with a suitable count number and an order Add. The divisor is thereby added to the part of the (negative) uncorrected remainder held in the $\overline{\text{IP}}$ bit positions. The sign bit, previously held in C, has been cleared by the execution of the Conditional Fill. As a result, the Add execution leaves the correct positive remainder in the $\overline{\text{IP}}$ but also leaves an overflow bit in C; that is $C=1$ after the execution of the order Add.

To remove the One-bit from flip-flop C a Conditional Fill order, which may conveniently be the inherited order, should be used to fill the succeeding instruction word of the program. The two branches of the program merge here; that is, this same succeeding instruction word would have been filled after the unsuccessful execution of Conditional Fill following the Divide if no correction had been needed. The correction program thus may consist of one instruction word, of the following form:

Wait, count number, Add, Wait, Count number, Blank, Blank, Blank.

If the programmer does not wish to make use of the remainder left by a particular Divide execution, he must still take care to deal appropriately with the sign bit of the uncorrected remainder which is left in C. One way of removing the unwanted bit left in C by the Divide is to end the instruction word containing the Divide order as follows:

. . . , Cond. Fill, Wait, (23), (Fill)

Here the last order, Fill, is shown in parentheses to indicate that it may well be the inherited order.

After a simple Divide operation has been completed by the (possible) addition of the divisor to the $\overline{\text{IP}}$-word, a 40-bit number-word representing the remainder is left by the division process. The representation is in the same positive number system as that in which the less significant half of the dividend was previously held.

INPUT-OUTPUT DEVICES (a) *Input keys*.—In the previous chapters, the execution of those orders were described which involve strictly internal operation of the computer, and which particularly control the traffic of bits with or without modification and either within the R register or between M and R registers. In the following there shall now be described with what type of orders it is possible to control the traffic of data bits from the outside into the computer. One of the input systems employed is a keyboard. This keyboard is not shown in detail, but only illustrated as a block 41. For purposes of describing this general purpose computer, the configuration of the keyboard and the specific meaning of each individual key is entirely immaterial. The principal purpose of this keyboard, however, can be explained and briefly described as follows:

There are provided altogether five switches 411, 412, 413, 414 and 415. Each of the keys of the keyboard is capable of closing a predetermined combination of such switches while leaving the rest of them open. It is advisable not to make use of the combination "none," i.e., not to assign a key to a situation in which this depression of that key does not close any contact. Thus, there are available altogether thiry-one different combinations. Of course, only one key at a time may be depressed.

Irrespective of any other possible used, in most instances, it is advisable and meaningful to use ten keys to represent the numerical decimal numbers 0 through 9. It is principally immaterial as to how these decimal numbers are "translated" by means of the five switches 411–415. However, a switch-code format should be selected which facilitates conversion of any decimal, multi-digit number into a binary number.

The principal purpose of these keys and of these switches is to permit the programming of the computer in such a manner that the execution of the program can be influenced from the outside. The insertion of any program into the computer will be described below. It should be mentioned that input keying is basically a supplement to the principal programming, since it is possible to program the computer to perform desired operations completely automatically without additional data input. This, however, is not always desirable.

For example, if the computer is to be operated as a desk calculator, it would be cumbersome if all numbers to be used in calculations had to be inserted into the computer as part of its program, as is usually required for the operation of a general purpose computer. Thus, for purposes of operating the computer as a desk calculator, the program should only include a master program in the form of suitably assembled instruction words circulating in the M register. This master program may also include numbers needed for word format conversion. Data numbers (variables) should be insertable into the computer by means of a keyboard.

It may also be desirable to use keys as control switches in such a manner that depressing of a key causes execution of a particular part of a program held in the M register. The varieties existing as to the utilization of keys are infinite and this aspect is not a part of the invention, since the invention is exclusively concerned with "hardware," but it is an important aspect of the invention that, as will be described in the following, there is a possibility of "manually" influencing and manipulating the data content circulating in registers.

There are now provided altogether five input orders, which are short orders, and each one is identified by an $\overline{XY}$ configuration while distinguished from each other by combinations of V, W and Z as shown in FIGURE 6. Each of these five orders can be regarded as a "test order" which designation means the following: Such an order is shifted into order register V–Z, during order cycling and held therein for one R cycle. Depending on the order code, a selected one of the switches 411–415 is tested individually. Any switch is thus tested as a result of executing the respectively assigned test order. The network of FIGURE 17 illustrates the execution of all five test orders.

There are thus provided five "and" gates 421 through 425 individually responding to the decoded test order codes. Each one of these gates has a second input which becomes true when the respectively associated one of the switches 411–415 is closed, but which remains false as long as the switch is open. All of these "and" gates feed a common "or" gate 426 furnishing one input to an "and" gate 427 which is open by a timing signal $\overline{I}$ to restrict the execution of any Test order to the $\overline{I}$-word period during which Test order is held in the V–Z register 50.

The output of the gate 427 is used to set the flip-flop C. It must be presumed here, that flip-flop C is reset prior to the execution of this Test order. In other words, the flip-flop C is set whenever the respectively addressed switch is found to be closed during execution of this Test order, but the flip-flop C remains reset whenever the respectively addressed switch is not closed.

In earlier chapters, there has been described how the state of flip-flop C can be used in various ways to influence the course of a program. One of these makes use of the Conditional Fill order which does, or does not, depending on the state of flip-flop C, cause a new instruction word to be set into the $\overline{IP}$ register. The Conditional Fill order also causes the resetting of C, thus "clearing" it for another similar use. By the use of the test orders and of Conditional Fill, a program may be divided into many branches. Which of these many branches is followed at a particular time depends on the switches tested, and may thus be determined by the depression of a key of the keyboard.

The single orders Add and Subtract provide another way of making use of a bit held in flip-flop C, since the prior state of this carry/borrow flip-flop contributes to the arithmetic result obtained. A program might, for example, contain five test orders each followed by an Add order for the purpose of counting the number of closed switches among the five tested.

The single shift order provides a convenient means for "storing away" a bit held in C. It places that bit in the least significant bit position of the $\overline{I}$P word in the R-register and moves each bit of the prior content to the next more significant position. The most significant bit of the prior content is "shifted out" into flip-flop C where it remains after the execution. A program might, for example, contain the five test orders, each followed by a single shift order. In that way, a five-bit "key code" identifying the key which currently is depressed is shifted into the $\overline{I}$P positions of the R register. It might then be recorded into the M line, for use at some later time. Alternatively, it might be subjected to some arithmetic manipulations, as for example, to distinguish two classes of key depressions, say the "digit keys" from all others.

It may be seen from the foregoing discussion that the process of introducing data and commands via the keyboard proceeds under the control of the full computer program held in its memory, and is in fact an essential part of that program. The description of five switches operated by a keyboard is intended as an illustrative example. More generally, it may be stated that the five test orders provide means by which the computer, under the control of its program, may "interrogate" its environment to determine the values of five binary variables.

(b) *The loading mode*.—The loading mode is used for the purpose of "loading" the memory; that is, of bringing into it the instruction words and number words of various kinds which are to be used in the course of the computing activities to be carried out at later times when the computer is in its "computing mode."

"Loading mode" and "computing mode" are mutually exclusive operating conditions of the computer. As was briefly mentioned above, the computing mode is defined by the circumstance $V+\overline{E}$, the loading mode is defined by the complement of this signal, or $\overline{V}E$. During the computing mode, flip-flop V holds an order code bit, or, during order cycling, instruction word bits pass through this flop-flop (and the other order register flip-flops). During order cycling (see FIGURE 5), $\overline{E}=1$, so that in the computing mode the signal $V+\overline{E}$ is true irrespective of the bit value held at any instance in flip-flop V. During single order execution there still *is* $\overline{E}=1$, so that the computing mode signal is independent of the order V-bit-code value. Double and long orders bring about the condition $E=1$, but all double and long orders have codes with $V=1$, so that again the signal $V+\overline{E}$ is true. No other orders have yet been described so that indeed order cycling and execution of all orders as described maintain the condition $V+E$, and thus define the computing mode.

The loading mode cannot be entered by executing any of the orders as outlined above. There is one order not yet described which can, however, terminate the computing mode and this can be called an internal effect order defined by the code $\overline{VWXYZ}$. How this order can cause termination of the computing mode will be described below.

The loading mode, since entered into, will be maintained until terminated by resetting flip-flop E. During the loading mode as defined by signal $\overline{V}E$, order cycling is inhibited due to $E=1$. Furthermore, $\overline{V}=1$ means that any of the gates operating in execution of double and long orders are disabled, so that flip-flop E cannot be reset by operation of any of the circuits as described, and, as will be described below only a special circumstance marking the completion of a loading mode phase can bring about the departure from the loading mode. Thus, the system is endowed with the capability of maintaining either the computing mode or the loading mode and a changeover will occur only in special, well-defined situations prevented from occurring inadvertently or incidentally.

It should be noted that the "test" orders are included in the computing mode, even though their execution serves to monitor the state of externally operable switches. However, these switches have as their principal purpose to influence the execution of the program of the machine once that program has been inserted. The loading mode brings about the initial insertion of that program. Thus, the purpose and operation of these two input devices are quite distinct.

The activities of the loading mode are very different from those described earlier. In particular, in the loading mode the V–Z register is not used either to hold an order code or for the permuting of syllables of an instruction word and the flip-flops of this register are available for other uses. The use of flip-flop V has already been indicated: it is always in the reset state during the loading mode and that reset state is used in the formation of the signal $\overline{V}E$ which distinguishes the loading mode.

In FIGURE 6, there are also shown the "phase codes" of the loading mode; that is, the states of the flip-flops V, W, X, Y and Z, as well as the order codes as they are held in these same flip-flops in the computing mode. This does not, however, indicate any conflict since the state of flip-flop E serves to distinguish the two situations. In the computing mode, $\overline{E}=1$ is true at any time at which a single order code is standing in the V–Z register; while $E=1$ is true throughout the loading mode.

The loading mode is divided into eight "phases." Each phase has a characteristic activity of its own as will be described in the following: The three flip-flops X, Y and Z are used to distinguish these eight phases. The decoder 70 shown in FIGURE 18 accordingly produces the eight phase defining signals $X\overline{Y}\overline{Z}$, $\overline{X}\overline{Y}\overline{Z}$, etc., each of which indicates one of these phases. No important use is made of flip-flop W, which remains in its reset state throughout the period of occupancy of the loading mode. Flip-flop E also retains a constant condition, namely its set state, $E=1$, during occupancy of the loading mode. Moreover, that state contributes to the formation of the signal $\overline{V}E$ which marks the entire loading mode.

The eight phases of the loading mode are shown schematically in FIGURE 18*a*. Transitions between these phases, and also the processes of entry to, and departing from the loading mode, are represented by arrows. The functions of these eight phases will be indicated here very briefly, with reference to FIGURE 18*a*, in anticipation of the detailed description presented below.

The Initial phase of the loading mode is entered when power is first supplied to the machine. It is occupied for a sufficient time to permit clearing from the M line any pulses which may have been introduced by transient activities accompanying the turning-on of power. Then the Marker phase is entered, and occupied for exactly one R-cycle. During that time, a "marker block," consisting of 160 consecutive one-bits is set into the M line. At the same time, the R line is cleared of any circulating pulses and flip-flop B is set to provide a "marker bit."

From the marker phase, the Discriminate phase is entered, and is occupied for one, or for a few, R-cycles. (As indicated by the notations accompanying the arrows in FIGURES 18*a*, most of the phase changes occur at the ends of $\overline{I}GFP$-bit periods. Therefore, most phases are occupied for periods of time which are exact integral multiples of an R-cycle.) Nothing of importance occurs during this first occupancy of the Discriminate phase. After the occupancy of the Discriminate phase, the Load-R phase is entered and is occupied for exactly one R-cycle. It is helpful to note at this point that occupancy of the Reload phase, in which the clearing of the R line and the setting of a "marker" bit into flip-flop B are also performed, is also followed by a one R-cycle occupancy of the Load-R phase. In the Load-R phase, flip-flop B is inserted into the recirculation path of the R register, in a manner somewhat similar to that which has been described for the execution of the long shift order. Here, however, all bits held in the R register (and not just the P bits) undergo a shifting. The result of this activity is to place into the R register the bit previously held in flip-flop B (at the time now described that bit is the marker bit, having the value "one") and to leave in B one of the bits of the prior content of the R register (which at this time has the value "zero").

After this first departure from the Load-R phase, the Check-B phase is entered. Since, at the time under discussion, $B=0$, there follows an immediate departure from it (after one bit period) with entry to the Search-tape phase. In the period of time in which use is made of the loading mode, and in particular in the time immediately following application of power to the computer, an information-storage mechanism is being operated. That mechanism, which will be more fully described below, is here termed the "tape." It provides two signals, in alternate succession. These are called $t_+$ and $t_-$, respectively. On the first appearance of the signal $t_+$, departure from the Search-tape phase and entry to the Discriminate phase occurs.

The second occupancy of the Discriminate phase will now be described. This description will also serve for all subsequent occupancies, so long as the power supply is kept on. The Discriminate phase is occupied for a period of time which is, preferably, approximately one R-cycle. Departure from the Discriminate phase occurs, as has already been described, at a time $\overline{I}GFP$. Since entry to the Discriminate phase is not similarly strobed by such a signal, the period of occupancy of this phase is variable to some extent. A minimum period of occupancy of the Discriminate phase is enforced by a delay mechanism which will be described later. That minimum may conveniently be taken to be of the order of one R-cycle. During this second (or a subsequent), occupancy of the Discriminate phase, the signal $t_-$ might appear. If it does appear (before departure from the Discriminate phase), flip-flop B is set on, if not it remains off. The tape mechanism provides the signals $t_+$ and $t_-$ alternately and at such time intervals that the setting of flip-flop B during successive occupancies of the Discriminate phase does, or does not, occur in accordance with the program which is to be set into memory. In this way, an information bit, which may have either of the two values "zero" or "one" is left in flip-flop B at the time of departure from the Discriminate phase. In the succeeding Load-R phase, that information bit is shifted into the R register as described earlier.

After each of the first 160 departures from the Load-R phase, flip-flop B holds a zero bit. These derive from the 160 zero bits placed in the R register in the clearing of the R register during the occupancy of the Marker phase (or of the Reload phase). After the 161st departure from the load-R phase, however, flip-flop B holds a one-bit which derives from the "marker" bit placed in flip-flop B during occupancy of the Marker phase (or of the Reload phase). In the subsequent occupancy of the Check-B phase, the condition $B=1$ prevents the transition to the Search-tape phase. Throughout the repeated occupancies of the Check-B phase and of the Search-M phase which follow, the state of flip-flop B remains unaltered, thus continuing to prevent entry to the Search-tape phase. As a result, the Search-M phase is entered at the end of each R-cycle of occupancy of the Check-B phase; that is, at any time $\overline{I}GFP$ spent in the Check-B phase.

In each R-cycle, the M register presents 160 bits. Usually some of these bits have the value "zero," as indicated by the signal $\overline{M}$. Such a zero-bit causes departure from the Search-M phase, with return to the Check-B phase for the remainder of that R-cycle. Eventually, however, there will occur an R-cycle in which the "marker" block which was set into the M-line during occupancy of the Marker phase is presented by flip-flop M, so that the signal $\overline{M}$ fails to appear throughout an R-cycle so that the Search-M phase is still occupied at the time IGFP. As a result, departure from the loading mode with entry to the computing mode then occurs.

At the time of this entry to the computing mode, the R register has been completely filled with information bits, as determined by the temporal relationships of the signals $t_+$ and $t_-$ delivered by the tape mechanism. Among the 160 bits thus held in the R register are 40 bits circulating as $\overline{IP}$ word and thus constituting an instruction word. Following the entry to the computing mode, the orders together with any accompanying count numbers of this instruction word are obeyed—in accordance with the plans of the programmer who prepared the tape.

Usually, the execution of these orders will cause the recording into memory of several of the words held in the R register. Usually, also, the last order of this instruction to be executed is the internal effect order which when executed terminates the computing mode and re-establishes the loading mode. This order thereby becomes a phase code and the Reload phase will cause again the computer to be operatively coupled to the tape.

In the Reload phase, the R register is cleared and a "marker" bit is set into flip-flop B, just as in the Marker phase. After departure from the Reload phase, the Load-R phase is occupied for one R-cycle, in which the marker bit is shifted into the R register as has been described earlier. The subsequent loading of 160 information bits into the R register takes place in the same way as after the initial entry.

The entire loading procedure is, therefore, an alternation between the loading of 160 data bits into the R register, and the transfer of these data bits into the M register is a computing mode, whereby the instruction word (40 bits) previously loaded into the R register when executed causes the other 120 bits (or some of them) to be transferred into the M register. Upon completion of this transfer, the next group of 160 data bits is loaded into the R-register, etc. until the tape has been read completely whereupon the computer is considered programmed and will subsequently commence to execute the program.

The Reload order coupling computing mode and loading mode must be kept from the order register during normal operation, since subsequent to loading the computing mode should be maintained, and since any such order, if part of an instruction word, will terminate the computing mode. The last group of bits loaded into the R-line will in its instruction word portion not contain a Reload order, but an order which will lead to the execution of the desired program.

The performance of these activities of the loading mode will now be developed in detail with the aid of FIGURE 18.

When power is first applied to the computer, the loading mode is to be entered. There is provided an initial set line 201 which is energized during the first power application. It is used to set flip-flops E and X and to reset flip-flops V, W, Y and Z. Thus, the system is forced into the Initial phase of the loading mode. The immediate result of the application of this initial set signal is to establish signal coincidence at a gate 203 to provide the signal $\overline{V}$E as loading mode defining signal. As the various phases are established by the register 50, the decoder 70 is also used here. For purposes of simplification, it can be assumed that the loading mode phase codes include the signal $\overline{V}$E, so that the decoder 70 does not receive the output of gate 203. Thus, the decoder 70 will now furnish the signal $\overline{V}X\overline{Y}\overline{Z}E$.

During occupancy of the Initial phase, the recirculation of information in the M line which takes place in other phases of the loading mode is suppressed in that the decoded Initial phase code signal is passed to the inhibitor input 15 of gate 14. It thus appears that a false output is being applied to the input of M register to clear the M register. The recirculation of data in the M register, if any, is inhibited, thereby, so that the M register is effectively cleared.

The system stays in the Initial phase for a period of time sufficient to clear the M register. This period does not have to be accurately set, and it is required only that this period is not shorter than an M-cycle. The delay is metered by a delay device 204 which may be of any suitable construction, possibly a very simple one, of the electromechanical type, triggered by the decoded Initial phase code and providing a delayed gating signal to a gate 205. After this delay has elapsed, the gate 205 is gated open and awaits a signal defined as $\overline{I}GFP.\overline{V}E$ and developed at a gate 200. This signal is a timing control signal for the phase changes in the loading mode, and the resulting pulse train has the frequency of the R-cycles, phased precisely with the end of the $\overline{I}$-word period. The resulting output pulse furnished by gate 205 is applied to the flip-flop X as reset signal. The resetting of flip-flop X brings about the condition $\overline{XYX}$ which characterized the Marker phase.

The decoder 70 produces a signal indicated as $\overline{VXYZ}E$ during occupancy of the Marker phase. That signal is introduced into the M line input via the "or" gate 13, thus placing the "marker block" of 160 one-bits into the M line. The loading of these one-bits commences in the bit period immediately following the timing pulse $\overline{I}GFP$ which caused entry into the Marker phase in the first bit period of the I-word period following that timing signal. The Marker phase is occupied for exactly one R-cycle, so that exactly 160 one-bits are introduced to form the "marker" block.

Two other activities to be carried out in the Marker phase have been described earlier. These same two activities are also to be carried out in the reload phase. One of these activities is the clearing from the R line of any one-bits which may be circulating in it. That clearance is effected by the inhibitory input brought to the "and" gate 176 via "or" gate 206. This inhibition insures that only zero-bits are put into flip-flop R during the one R-cycle of occupancy of the Marker phase. The second activity in the Marker phase is the setting of flip-flop B to provide the "marker" bit. The decoder Marker phase is delivered via an "or" gate 202 to the set side input of flip-flop B.

The period of time for which the system remains in the Marker phase is critical and must be precisely one R-cycle. That duration is metered by detecting the $\overline{I}PFG$ timing signal produced by gate 200. A gate 230 responds to this timing signal and to the Marker phase code to turn the flip-flop Z on, thereby placing the Discriminate phase code into the V–Z register. Thus, the Marker phase is maintained for precisely one R-cycle which (1) necessarily suffices to clear the R register and, (2) during that period precisely 160 one-bits have been loaded into the M line to circulate therein. The 160 one-bits thereafter circulating in the M register are called the "marker" block.

The V–Z register 50 holds the Discriminate phase for a period of time which is primarily determined by a delay device 210. The duration of the delay as well as the purpose of the Discriminate phase will be discussed more fully below.

After the delay of device 210 has run out, the flip-flop Y is turned on and thereby the Load-R phase is established in register 50 defined by the code $\overline{VX}YZE$. The changeover is, again strobed by an $\overline{I}PFG$ pulse drawn from the gate 200. The activities of the Load-R phase will first be described with respect to the first occupancy of the phase since entry to the loading mode. Consideration of a second or subsequent occupancy of the Load-R phase will be deferred until the activities of the Search-tape phase have been discussed. The Load-R phase is maintained in register 50 for precisely one R-cycle. As soon as the Load-R phase is established, the flip-flop B is operatively coupled to the R register by means of a gate 211. Thus, as soon as the system turns to the Load-R phase, the marker bit in flip-flop B is copied into the R flip-flop for insertion into the R register.

Since the Load-R phase occurs immediately after the bit period $\bar{I}$PFG, the "one" marker bit in the flip-flop B is applied to the flip-flop R at the first bit period of the I-word period and held in the flip-flop R for insertion into the R'' line in the second bit period of the I-word period. It should be noted that presently no distinction between P and $\bar{P}$-bit periods has to be made. Two "and" gates 212 and 213 couple set and reset input sides of flip-flop B, respectively, to set and reset output sides of flip-flop Q, thereby establishing a shifting circulation in which the R register is enlarged by one position to hold 161 bits. The normal recirculation of the R-delay line is blocked during the Load-R phase in that the latter signal is also applied via the "or" gate 206 as inhibiting input to gate 176. The circuit is thus approximately analogous to the one shown in FIGURE 13 for the execution of the order long Shift and the shifting during multiplication and division operation orders. Of course, gates 212 and 213 also receive the Load-R gating signal. After departure from the Load-R phase, the flip-flop B is disconnected from the R register. The circulation now continues in the R register via open gate 176 and flip-flop B is decoupled therefrom (gates 212 and 213 are disabled) so that no shifting takes place. The marker bit remains in the second bit period position of the I-word period as circulating in the R register.

At the time of entry to the Load-R phase, the R-delay line is empty, since it was previously emptied during the Marker phase therefore, the flip-flop B will be reset at the beginning of the second bit period of the I-word period. After precisely one R-cycle, as marked by the respectively next time $\bar{I}$PFG, flop-flop X is turned on to establish the Check-B phase code in register 50. No other conditions exist for this phase change. At this instant, the "one" bit previously loaded into the R-line is applied to, but is not yet held in, the Q flip-flop.

During the Check-B phase, the content of flip-flop B is monitored, if $\bar{B}$ is true, as is the case presently, a new phase is established immediately in register 50 by turning flip-flop Y off, and thereupon the register 50 holds the Search-tape phase code. In particular, the flip-flop Y is turned off at the coincidence of a decoded Check-B signal and a $\bar{B}$ signal (gate 214). This changeover is not strobed by any timing signal since in this situation the Check-B phase needs to be occupied for but one bit period; if $\bar{B}=1$, the phase Search-Tape is established immediately. In both of the phases, Check-B and Search-Tape, the content of the R line circulates unchanged and the state of flip-flop B continues unchanged. In the situation now being described, flip-flop B remains reset during the one bit period of occupancy of the phase Check-B and also during the succeeding occupancy of Search-Tape.

Before proceeding to the description of the process involved in the loading of data proper, reference is made to FIGURES 19 and 20. FIGURE 19 illustrates a tape 220 bearing punched or inked marks 221 and 222. The tape 220 is wound on a suitable reel (not shown) and advanced in a conventional manner. It may also be an endless belt or even a small strip or film chip, or a card shifted, for example, manually into a reading device. The data are serially stored on the tape 220 in the following format:

Bit values are distinguished by the width of the marks on the tape 220 measured in the direction of tape extension and progression. The marks 221 are wide and the marks 222 are narrow; for reasons described below, the narrow marks on the tape represent binary value 1, the wide marks represent binary value 0. The marks may be contrast producing lines, perforations or the like. Such a tape strip, cord, etc. is advanced underneath a tape reader, such as a conventional photoelectric reader 223. The photoelectric reader output signal is a train of signal blocks of different widths. These signal blocks are differentiated to produce a double pulse train as shown in FIGURE 20. The pulses resulting from the differentiation of the leading edges of the reader output signals are called $t_+$, while the respective trailing edges are called $t_-$.

It can be seen that the marks 221 and 222 are distinguished in the pulse trains in that for the broad marks 221 the pulse $t_+$ is followed by a pulse $t_-$ after a relatively long delay, while for a mark 222 the pulse $t_+$ is succeeded by a pulse $t_-$ after a considerably shorter delay therefrom.

We now set up the following rules: the widths of the broad marks 221 and the tape speed at which the tape is advanced under the tape reader must be selected so that the respectively associated pulse pair $t_+$ and $t_-$ follow each other at an interval considerably in excess of the duration of the R-cycle, and for the narrow marks 222, the pulse pair $t_+$ and $t_-$ must follow each other at an interval which is shorter than the duration of an R-cycle.

Returning now to FIGURE 18, there is shown schematically the tape 220 and a tape pickoff or reading detector 223 having its output side connected to a differentiating stage and a phase splitter 224, so that an output line 225 will exclusively receive the $t_+$ pulses, while the line 226 will exclusively receive the $t_-$ pulses.

Mark reading will start when the first mark enters the pickoff device 223 and will, therefore, product a $t_+$ pulse which will occur when the system has already been in the Search-Tape phase for some time. As soon as the $t_+$ signal is received, it is fed to the flip-flop X to turn flip-flop X off, thereby terminating the Search-Tape phase, and a new phase code is established in register 50.

It is important to note that this control step occurs unsynchronized as far as the circulation in either R or M registers is concerned. No gating is required because if the Search-Tape code is not in the register 50 at the time of pulse $t_+$, an error has occurred which cannot be corrected internally, but the system has to be reloaded again, for example, at a different tape speed, or there is a faulty connection, etc. At detection of pulse $t_+$, the code Discriminate is re-established in register 50.

The question now is, when does the respectively associated pulse $t_-$ occur? It may be assumed for a first example that the pulse $t_-$ occurs at a time when the system is still in the Discriminate phase, which is an indication that the mark which produced this pulse pair $t_+$ and $t_-$ is a narrow one. The line 226 connects to an input gate 208, receiving the decoded Discriminate phase code signal for gating. Thus, in the stipulated case, a $t_-$ pulse will result in an output pulse produced by gate 208, which pulse is fed to the input set side of the flip-flop B and turns the same on. At the time of occurrence of the pulse $t_+$, the delay device 210 started to run, and after the end of the thus metered period the phase code Load-R will be established in register 50 which event is specifically strobed by an $\bar{I}$GFP signal.

Thus, the system enters the Load-R phase in the first bit period of the I-word period succeeding the last-mentioned $\bar{I}$GFP timing signal with flip-flop B containing a bit specifically defined by $B=1$. In this first bit period of this second occupancy of Load-R, a one bit is held in flip-flop Q which is a single marker bit "one" originally loaded into the R-delay line when the system entered the Load-R phase for the first time. As soon as the system is in the Load-R phase (for a second time), the bit in flip-flop B, which is now the first bit that has been read from the tape 220, is applied to gate 211. Since B is set, it verifies the statement above that the narrow marks 222 represent "one" bits. Gate 211 is open for the duration of the Load-R phase and in the first bit period a "one" bit is loaded into the flip-flop R to be held therein in the second bit period of the $\bar{I}$-word period. During the first bit period of this I-word period, the marker bit is in flip-flop Q, and since during the Load-R phase gates 212 and 213 are enabled, this marker bit is applied to the flip-flop B, thus providing another delay of the marker bit. The system now stays in the Load-R phase for precisely one R-cycle during which the initial information bit travels through the R line one bit period ahead of the marker bit.

After precisely one R-cycle, the Check-B phase is re-established again; specifically during the bit period succeeding the $\overline{I}$GFP pulse that terminated the Load-R phase. At that time, the flip-flop B is taken out of the circulation path of the R register and normal recirculation thereof is resumed. During the single bit period during which the Check-B phase code is in register 50, the flip-flop Q holds the first data bit, and as the flip-flop B is then out of the register, the register has resumed undelayed and unshifted bit circulation. Thus, at the bit period succeeding this $\overline{I}$GFP time, the flip-flop B necessarily holds the value 0, so that again the system stays in the Check-B phase only for one bit period, and then shifts back into the Search-tape phase to await the next $t_+$ signal.

This next $t_+$ signal again occurs unsynchronized as far as the sequence of R-cycles is concerned. It will now be assumed that the next bit represents a "zero" bit on the tape and is thus a broad mark 221. The Search-tape phase is terminated at the $t_+$ signal pertaining to this mark 221, and flip-flop B is turned off accordingly to establish the Discriminate phase in register 50. After the delay of device 210 has run and at the next following $\overline{I}$GFP strobing signal, the Load-R phase is put into register 50.

It now appears that the associated $t_-$ signal was not received while the system was in the Discriminate phase. Accordingly, as soon as the Load-R phase commences for the third time, the flip-flop B is still reset, which means that at that point the gate 211 applies a "zero" bit to flip-flop R and this "zero" bit is loaded as a zero bit into the R-delay line at the second bit period of the present I-word period. During the first bit period of this I-word period, the first "one" bit read from the tape will be in flip-flop Q. During the same bit period the "zero" tape bit held in B is applied to flip-flop R, while the initial R-line marker bit occupies the last space in the R-delay line proper. During the second bit period of the I-word period of this Load-R phase, the first tape bit "one" bit is held in flip-flop B. The initial marker bit is held in Q and applied to flip-flop B via gate 212, while the second data or tape bit, which is a zero bit, is held in flip-flop R and thus is applied to line R'' for loading. The initial marker bit will thus be shifted to the fourth bit position and the first and second tape bits will respectively occupy third and second positions in the R register.

The $t_-$ pulse will occur sometime later, but the Discriminate phase control gate 214 is already closed during the Load-R phase, and the failure of the $t_-$ pulse to appear during the Discriminate phase operates as bit value discrimination. Thus, the belated $t_-$ pulse is suppressed.

The system stays in the Load-R phase for one R-cycle. At the next $\overline{I}$GPF pulse, again no "one" bit is in the flip-flop B. Thus, at the Check-B phase, there still is $\overline{B}=1$ and immediately the Search-tape phase code is placed back into the register 50 to wait for the leading edge of the next $t_+$ signal from the tape 220.

This sequential loading of bits from the tape into the R-line continues, whereby the loading proper of any individual bit requires one R-cycle. During that one R-cycle, the bits which are then already in the R register are delayed by one bit position. It should be noted that this delay is different from that occurring in the execution of a Shift order. In the latter case, the delay produced was by one P-cycle, i.e., by two bit periods per R-cycle, and affected only the P-bits and not the $\overline{P}$-bits.

After each Load-R phase, first the Check-B phase is established and on still finding $\overline{B}=1$, this phase is maintained only for a single bit period and the system is shifted into the waiting state of the Search-Tape phase, so that subsequently the R register circulates without delay. Thus, the system alternates between asynchronously reading and receiving marks from the tape and synchronously loading same into the R-delay line.

The following rule can be stated as to the marker bit:

At the beginning of the first Load-R phase, i.e., in the first bit period, the marker bit is in Q, the first data bit is in B.

During the second occupancy of the data Load-R phase, the first data bit is in Q during the first bit period, and the marker bit is in Q during the second bit period.

Similarly, during the *n*th occupancy of the Load-R phase, the *n*th data bit is in B during the first bit period, while concurrently the ($n$—①) data bit is in Q and the marker bit is in Q during the *n*th bit period. It follows, that during the 160th Load-R phase, the 160th bit is in B during the first bit period, while concurrently the 159th data bit is in Q, so that the marker bit is in Q during the 160th bit period which is an $\overline{I}$GFP bit period and is, in fact, the last bit period of the Load-R phase during which the 160th data bit is loaded into the R register.

After precisely 160 data loading cycle (plus the loading cycle of the marker bit) which, of course, do not succeed each other uninterruptedly but are separated from each other, 160 bits have been read from the tape. At the end ($\overline{I}$GFP) of the R-cycle during the beginning of which the 160th data bit was loaded into the R register, the marker bit is held in flip-flop Q and thus applied to flip-flop B for transfer. The first tape bit is held in flip-flop B, the last (160th) tape bit is in the output transducer of the R-delay line. At this point, the initial marker (a "one" bit) which was set into the R-delay line has been delayed for 160 bit periods.

At the first bit period of the succeeding I-word period, th following situation is present: The marker bit is held in flip-flop B. The Check-B phase is established in register 50, now finding this marker "one" bit in flip-flop B. Thus, $\overline{B}$ is not true in this occupancy of the Check-B phase, which means that an immediate changeover to the Search-Tape phase does not occur. Finally, flip-flop B is removed from the R register, so that while the first tape bit is in flip-flop Q, the 160th bit is in flip-flop R, the circulatory path of the R register circumvents flip-flop B and thus eliminates the marker bit from the R register, and the circulation in the R register is confined to the 160 marks read from the tape.

The Check-B phase is maintained until the next $\overline{I}$GFP timing pulse appears. From the circuit in FIGURE 18, one can see that this pulse turns on flip-flop Z and this establishes the phase code Search-M in the V-Z register 50.

It must now be remembered that prior to the loading of any data read from the tape, a marker block, consisting of 160 consecutive one-bits were placed in the M register. It is to be understood that this marker block must be allowed to recirculate without change throughout the entire loading process. The marker block serves to provide a reference mark permitting the identification of a particular phase with respect to the M-cycle. The Search-M phase is used to bring about a departure from the loading mode, and entry to the computing mode. That change of mode is to occur at a time when the marker block has just been presented by flip-flop M for one complete R-cycle; that is, in two successive word periods, an I-word period followed by an $\overline{I}$-word period.

The search for the marker block is carried out by means of transitions between the two phases Check-B and Search-M. Throughout this process, flip-flop B remains in the set state, thus preventing a return to the Search-tape phase. Whenever the Check-B phase is occupied at the end of an R-cycle; that is, in a bit period $\overline{I}$GFP, a transition to the Search-M phase occurs. That transition is effected by the resetting of flip-flop Z by operation of a reset signal produced by the "and" gate 229. One input to gate 229 is the decoded signal representing the Check-B phase. The other is, of course, the strobing signal $\overline{I}$GFP.

The Search-M phase is occupied for a period of time which depends upon the bits emerging from the M line and presented by flip-flop M during the R-cycle following entry to this phase. This period of time can be as short as one bit period, or as long as the full R-cycle. In any bit period of this occupancy, the presentation of a zero-bit by flip-flop M, as indicated by the signal $\overline{M}=1$, causes a return to the Check-B phase. It is to be noted that gate 231 is not strobed by any timing signal such as P, $\overline{P}$, $\overline{I}$GFP, or the like and, therefore, that circuit can effect the termination of occupancy of the Search-M phase in any bit period in which flip-flop M holds a zero-bit. More precisely, the first such zero-bit causes such termination.

The first utilization of the Search-M phase following the turning-on of power to the computer occurs after the processes described earlier have loaded 160 bits from the tape into the R register. At that time, the marker block, consisting of 160 consecutive one-bits, is circulating in the M register. Otherwise, however, the M register holds only zero-bits. In anticipation of the later discussion, it may be noted here that this "cleared" condition of the M register does not occur in later uses of the Search-M phases, those following one or more returns to the loading mode via the Reload phase. At these later times, the "parts" of the M-cycle which initially held zero-bits are filled with information bits in accordance with the program being placed in memory. It is, however, a requirement imposed upon the programmer that the marker block must remain undisturbed until after the last use of the loading mode. Moreover, the information bits placed in memory must not include any block of consecutive one-bits which is so long that it could be mistaken for the marker block.

After the R register has been loaded with a group of 160 bits provided by the tape ,the Check-B phase is entered with a one-bit held in flip-flop B as already described. The time at which this occurs is unsynchronized with respect to the circulation of bits in the M register. Thus, the length of time occupied in the process of searching for the marker block is uncertain. It may be only a few R-cycles, or it may be as long as two M-cycles. The fact that this time may be greater than one M-cycle may appear paradoxical, however, it can be understood as follows: Since the number of word period in one M-cycle is an odd number, the marker block does not always appear in its entirety in a single R-cycle, defined as an I-word period together with the following $\overline{I}$-word period. Instead, it may appear in an $\overline{I}$-word period together with the following I-word period. These two forms of presentation occur alternately. Only the former is the situation being sought for, as the Search-M phase is entered at the beginning of an I-word period.

It can be seen from the foregoing discussion that the search for the marker block typically involves an entry to the Search-M phase at the beginning of each R-cycle, usually with a return to the Check-B phase after a few bit periods. Only during the sought-for presentation of the marker block does the Search-M phase remain occupied until the end of an R-cycle; that is, until the appearance of the signal $\overline{I}$GFP. The appearance of the signal during occupancy of the Search-M phase marks the end of the search process and brings about a transition from the loading mode into the computing mode. This transition is effected by the resetting of flip-flop E. The "and" gate 215 detects the coincidence of the timing signal $\overline{I}$GFP with the signal indicating occupation of the Search-M mode and provides a reset side input signal to the flip-flop E.

The discussion presented above shows how any desired set of 160 information bits transferred from the tape is loaded into the R register and then the computing mode is entered at a time which is precisely determined with respect to the time of appearance of the marker block. The 160 bits loaded into the R register may be regarded as forming four words, each of 40 bits.

It is not important what three of these words represent and they will differ from case to case. It is significant, however, that the fourth word, held as the $\overline{I}$P word, is an instruction word, to be effective immediately as an instruction word. After entry to the computing mode, this instruction word provides the orders and count numbers which control the computer's activities for a short time thereafter. The other 120 bits, constituting three words, will normally be intended for placement in memory; that is, in the M-register, by means of Record orders included in the instruction word. The instruction word is also likely to contain one or more Wait orders, with accompanying count numbers, which serve to determine the particular memory locations into which these three words will be placed.

Since the full memory capacity of the M-register is considerably greater than three words, many repetitions of the process described above will usually be required for the loading of an entire program. It is, therefore, usually the case that the last order to be executed, of those orders which form the instruction-word part of the load placed in the R register, is the Internal Effect order called Reload.

The re-entry of the system from the computing mode into the loading mode will thus be controlled by this Internal Effect order called Reload-$\overline{V}\overline{W}\overline{X}Y\overline{Z}$ which by operation of order cycling enters the V–Z register. This order has as its function the termination of the computing mode and the re-establishment of the loading mode; specifically by turning the flip-flop E on again, so that again the condition $\overline{V}$E is re-established ($\overline{V}$ is a part of this signal). Reload is the only order which, on one hand, can circulate through the R-register and register 50; and which enables the system autonomously to establish the $\overline{V}$E condition, as soon as the order has been detected. Thus, Reload is both an order code and a phase code.

The execution of the sub-routine of loading the 120 bits from the R register into the M register should not take longer than two M-cycles, which is a few milliseconds. This, however ,is a matter of program organization and may thus take as little as three R-cycles. For example, if the P-bits are shifted into the M register by executing a double Record order (2 R-cycles) and if the $\overline{I}\overline{P}$ bits are shifted into the M register by executing a single Record-$\overline{P}$ order, one needs only three R-cycles. The time elapsing from loading the last one of the first 160 tape bits up to the time in which the system leaves the loading mode may also be at most two M-cycles; which means that the spacing, or gap, of successive groups of 160 bits on the tape 220 simply has to be sufficiently large so that this gap will be traversed upon continued tape movement during a period of time which is somewhat in excess of a period of time which may be no larger than four M-cycles.

After the order Reload has been shifted into the V–Z register this order is executed by turning flip-flop E on, to thereby establish the Reload phase of the loading mode. This re-entry into the loading mode is phased and strobed so as to occur after an $\overline{I}$GFP-bit period. In the Reload phase the R register is completely cleared since the Reload signal is applied to the inhibiting input of gate 176. Also, flip-flop B is set. The Reload phase is maintained for precisely one R-cycle.

The codes are so selected that only flip-flop Z has to be turned on to re-establish the phase-code Load-R in register 50; which, of course, will occur synchronously with an $\overline{I}$GFP timing pulse. Once the system has entered the Load-R phase, the same operation as aforedescribed will proceed in that first a single marker bit is loaded into the R register; then, after an R-cycle, the Check-B phase code is maintained for one bit period (finding $\overline{B}=1$), then the Search-Tape code is established and the next $t_+$ pulse is searched for.

Thus, in summary, loading is carried out by executing the following sub-routine controlled externally as well as internally: Initial→Marker (loading of 160 one bits into M and clearing R register)→Discriminate (at first just a delay)→Load-R (to shift content of B into R)→Check-B (to detect filled condition of R)→Search-Tape (detecting leading edge of tape bit)→Discriminate (to detect occurrence or non-occurrence of trailing edge of tape bit within specified time and to set corresponding bit into B)→Load-R (shift bit read from tape from B into R line) → Check-B → Search-Tape → Discriminate → Load-R→ . . . (until 160 bits are loaded into R)→Check-B (finding R line full)→Search-M (to detect beginning of the 160 marker bits set during Marker phase into M line)→Check-B (wait for some part of one R-cycle)→ Search-M→Check-B→Search-M . . . Search-M (finding marker, waiting for one R-cycle)→exit from loading mode. Re-entry is had at Reload (clear R register, set marker bit into B)→Load-R→Check-B→Search-Tape, etc.

It will now be appreciated why 160 "one" bits are used in the marker block. After any word has been loaded into the M-register, it may frequently occur that during the "Search-M" phase, a "one" bit is detected so that the "Search-M" phase is maintained for a single bit period; but this and other "one" bits may pertain to data words, and soon, a zero will appear in the flip-flop M causing the system to shift back into the Check-B phase. This will always occur prior to an $\overline{I}$GFP timing pulse as long as there have not appeared 160 consecutive "one" bits.

Should it happen at a time $\overline{I}$GFP that $M=0$ is true for the first time in an R-cycle of the Search-M phase, a difficulty could occur at this time as to the response of flop-flops E (reset input) and Z (reset input) because Z is to be turned off by any zero-bit ($\overline{M}=1$) during the Search-M phase. On the other hand, occurrence of any zero bit in M during the Search-M phase establishes resetting conditions for flip-flop E during the IGFP bit period. There is, therefore, imposed on the programmer a condition requiring him to avoid causing 160 or 159 one-bits succeeded by a zero bit to circulate in the M-line so as to appear in flip-flop M for an $\overline{I}$- and a succeeding I-word period. This is a very minor limitation since such a compilation of "one" bits would include two instruction words consisting of nothing but Multiply orders, each succeeded by a count number having the value 31 or 30. Such an instruction word would not be useful.

When the loading process is nearly completed and departure from the loading mode takes place for the last time, a final load is held in the R register. This includes, as usual, an instruction word and three other words. It may be presumed that these three other words are intended to be recorded into memory. At this time, in contrast with previous departures from the loading mode, it is no longer necessary to preserve the marker block since no further use of the loading mode is expected. Accordingly, the three words held in the R register for transfer to the M register may very conveniently be recorded in the memory locations of the marker block. Therefore, these memory locations need not all go to waste. The instruction word of this last R-load will differ from its predecessors in another way as well, namely in not having an internal effect order. Instead, it may be presumed to end with a fill order. The execution of that fill order may be regarded as marking the end of the tiner loading process and the beginning of the execution of the program which has thus been loaded.

(*c*) *Output devices.*—In the previous chapters it was described how data can be fed into the computer. These input devices such as switches (FIGURE 17) and the loading mode control circuit network (FIGURE 18) are specifically designed for enabling the computer to receive bits individually or in a serial-by-bit format presentation. Each one of the switches defines the value of one bit and is interrogated (tested) individually and in a sequence strictly determinable by the programmer.

The loading mode causes data to be loaded into the R register for subsequent immediate and initial processing thereof, such as the loading of such data into the M line, provided the data are presented in a format suitable for this purpose. Thus, the tape is presumed to hold (store) data bits in a serial-by-bit format and organized in the same interleaved word format used for organization of the bits and words when circulation in the R register (and later in the M register) as IP, I$\overline{P}$, $\overline{I}$P and $\overline{IP}$ words. The tape is further presumed to hold the data bits in 160-bit blocks, four words in each block and in the format as described. Such words "written" on the tape in this format can be identified already here as IP, I$\overline{P}$, $\overline{I}$P, and $\overline{IP}$ words with regard to their subsequent circulation in the R-register.

Any different presentation of data words to be loaded requires external conversion into this required format. Inasmuch as the data to be loaded into the computer during the computing mode are the result of extensive work done by the programmer no reason exists that these data cannot be presented to the computer in the format adapted for immediate use by the loading mode control circuit as outlined above. It will be recalled that the loading mode is primarily destined to feed a program into the computer, and this program will predominantly include instruction words, i.e., order code assemblies; any numbers included in this program will have fixed values serving primarily for format conversion and scaling and thus constituting portions of the program. Current data for calculations will be fed into the computer via the test switches. Interrogation of the test switches and utilization of the test switch outputs rests primarily with the programmer.

The situation is somewhat different for data withdrawal. As the general case, there is no program withdrawal from a computer nor any withdrawal en bloc of the entire content of the M and/or R delay lines, i.e., there is no need for an un-loading mode. This includes the case in which the computer is used to calculate or compile a different program, for example, for a different machine. For output operations only discrete data withdrawal is of interest resulting from the processing of data fed into the computer preferably via the test switches. The optional but rare case that current input data are also fed into the computer via the loading mode does not change the general case as far as the data withdrawal is concerned, because during the loading mode the computer will receive predominantly orders and count numbers as the means to operate the machine. The additional inputting of current data does not require a separate mode of operation; accordingly, data withdrawal does likewise not require a separate mode.

The computer proper itself is not equipped with means which cause a specific type of presentation of processed data for external use and evaluation because there is no preferred form for such presentation. Processed data, for example, computation results obtained by the computer will be needed usually immediately so that they should be presented in the most suitable form. This, in turn, will depend largely on what the results do represent and in what specific form presentation is needed. For example, such data may be needed to be presented in printed and legible form, or on a display panel, or as a graph, or as control operation in real time operation such as production process control, analog simulation or in an encoded and printed form for production of a file tape, cards, etc.; whatever external device is used, it will require a special adapter circuit. Such adapter circuit will be required to respond to computer issued signals representing the externally usable signal and such signals will then be interpreted as specific, external control signals.

From the code chart in FIGURE 6 it can be seen, that the computer is capable of issuing five "external effect" orders E1 to E5. This number is by no means critical and is rather the result of availability of order codes: all order code bit combinations not used otherwise are available as External Effect orders. It is conceivable, that more than five test orders are required in case five switches are not enough to represent distinguishing codes to be fed into the computer via the keyboard. On the other hand, less than five test orders and switches may suffice in other cases. It is simply a matter of expediency to provide for sufficient decoders which are individually capable of responding to ten external communication orders, some of them are alloted for use as Test orders, the remaining ones will then be available as External Effect orders or vice versa.

The decoders which are available for external use respond to codes which are available to the programmer as orders which when executed produce externally available signals.

Out of these five external effect orders, there are three codes: $\overline{VWX}YZ$; $\overline{V}W\overline{X}Y\overline{Z}$; and $\overline{V}W\overline{X}YZ$ which have $\overline{V}=1$ in common. Three externally accessible output gates 451, 452 and 453 respond to these codes respectively and restrict the response to an $\overline{I}$ word period for a situation $\overline{E}=1$, so that they cannot be executed during the loading mode, and they will be executed as single orders during the $\overline{I}$ word period succeeding the I word period at the end of which one of them was set into order register 50.

The external device they control in the illustrated example will be described below. Two other order codes, not yet "used up" are V $\overline{WX}Y(Z+\overline{Z})$. Inasmuch as $\overline{X}=1$ and $\overline{W}=1$, they will not cause any response of the double order control gate 58 or the long order control gate 57, so that also these two orders can be treated as two external effect orders. This case is representatively included in FIGURE 21. For utilization of these two external effect order codes the signal $\overline{E}$ is not needed. If these two effect orders are to be treated as double or long orders, E must be used. FIGURE 21 now illustrates further, how with the aid of these short external effect orders an electric typewriter can be controlled. The adapter circuit network here is an electronic decade counter 510, which may be of any one of many commercially available types. It is provided with an advance input and a reset input, to which are brought the output signals of gates 451 and 452, respectively. These signals become true during the periods of execution of the External Effect orders, E1 and E2, respectively. The decade counter can remain stable in any one of its ten states, "zero," "one," etc. A true signal at its Advance input causes a switching to the next succeeding state; from "zero" to "one," from "one" to "two," etc. One such advance in the state of the decade counter is produced by each execution of the External Effect order, E1. A true signal brought to the Reset input of the decade counter causes it to assume its "zero" state, whatever its state may have been previously. That resetting takes place on each execution of an External Effect order, E2.

The decade counter 510 is provided with ten output channels which deliver current individually to the ten solenoids, 500, 501 . . . 509. Current is delivered to only one of these solenoids, as determined by the state of the decade counter. If it is in the "zero" state, current may be delivered to solenoid 500, if in the state "one" current may be delivered to solenoid 501, etc. The energization of one of these solenoids is additionally dependent upon the true state of the output signal of gate 453 which is a consequence of the execution of the External Effect order E3. A "pulse-stretching" circuit 511 extends the period of time for which the output signal of gate 453 remains true, and, therefore, for which the selected solenoid is energized.

The energizing of one of the solenoids, 500, 501 . . . 509 causes the actuation of one of ten keys of a typewriter 511, and thereby causes the typing of one of the ten decimal digit symbols, 0, 1 . . . 9. Thus, the true state of the output signal of gate 453 causes the typing of the symbol 0 if the decade counter is in its "zero" state, of the symbol 1 if it is in the "one" state, etc. This suffices to control the typewriter, and it is now up to the programmer to provide for these three orders to appear in register 50 in the desired sequence at specific instances. Utilization of the circuit shown in FIGURE 21 requires further that the computer is programmed to provide any result to be printed in such a format that it can be interpreted as a decimal number. Here it is important to remember that all numbers are calculated in the computer in a strictly binary format. In the following it will thus be explained first how a binary number can be converted into a decimal number and thereafter it will be explained how such number will be printed.

In the following description it will be necessary to refer to and identify words held in the M-register. It will be recalled, that in the present example, 90-words are held in the M-register. One M cycle lasts 45 word periods with two words being presented by flip-flop M during each word period. At the end of the loading mode, the last "one" bit of the 160 marker bits is set into the M-register and the loading mode is terminated. At this instant, a new M cycle is started. Hence, this particular instant is selected to start counting M cycles, and to count and identify word periods within an M cycle. Thus, the first word period after termination of the loading mode is word period one ($W_P$-1). The next one is word period two ($W_P$-2), etc. The P-word presented by flip-flop M in the word period one is called W-1, and the $\overline{P}$ word presented during the same word period is W-$\overline{1}$.

A subroutine for the conversion of a number into the decimal system and its typing, with the use of an electric typewriter, is shown in schematic form in FIGURE 22. Each of the boxes of that figure represents an instruction word. Inside the box are shown the orders of that instruction word, together with count numbers and explanatory notes. It is assumed that at the time of entry to this subroutine the number to be typed (after conversion) is held as the $\overline{IP}$ word in the R-register prior to conversion, and also that an appropriate "tally number" is held in the memory location called "*w*–18" as will be further described in the following. It is also assumed that the number to be typed is a positive integer smaller than $10^9$, and that it is to be typed in an (uninterrupted) sequence of nine decimal digits. It is further assumed that the carriage of the typewriter is in the correct position for the beginning of the typing process. Various other assumed preconditions for the performance of this number conversion and typing subroutine will become evident in the discussion which follows.

Entry to this subroutine is made by the filling of its first instruction word which is shown in the box at the upper left-hand side of FIGURE 22. That instruction word is assumed to be held in memory; that is, in the M-register, in the memory location *w*–$\overline{1}$; that is in the $\overline{P}$-bits presented in word-period one. The second order of this instruction word is a Conditional Fill. In the event that this order is executed "successfully" it fills the instruction word held in memory location *w*–$\overline{7}$, as indicated by the arrow leading to the second box. In the event that this Conditional Fill is not successful then the remaining orders shown in the first box are executed. The last order shown there is the order Fill which causes another filling of this same instruction word. Thus this first instruction word provides a "cycle" in the program, as is indicated by the arrow leading from the end of the box back to its beginning. All of the orders of this first instruction word are thus executed repeatedly until a successful execution of the Conditional Fill order occurs, thus causing a "breaking out" from the cycle.

A somewhat similar cycle is formed by the third box, marked *w*–$\overline{11}$. In this case, however, it is the *successful* execution of the Conditional Fill order which causes another repetition, while an unsuccessful execution constitutes "breaking out."

There is also a larger cycle, which makes use of the five instruction words *w*–$\bar{1}$, *w*–$\bar{7}$, *w*–$\overline{11}$, *w*–$\overline{15}$, and *w*–$\overline{13}$. The fourth instruction word, *w*–$\overline{15}$, has a Conditional Fill order the successful execution of which leads back (via the fifth box) to the first box again. Here again, it is the unsuccessful execution of the Conditional Fill which constitutes an escape from the cycle.

The number of executions of these second and third cycles are determined by two words held in memory, in the memory locations *w*–8 and *w*–18, respectively. (These are P-words.) The number held in *w*–8 determines the number of executions of *w*–$\overline{11}$ in each traversal of the "major cycle" consisting of all five boxes. The number initially held in *w*–18, determines the number of these traversals of this major cycle, as will be explained in detail in the following. This number, initially held in *w*–18, is a copy of the number held in memory location *w*–16; thus memory location *w*–16 is the "permanent" storage location for that number. This copy held in *w*–18 is "used up" in the course of execution of the printing subroutine and, therefore, it must be restored to its original value before the subroutine can be used again. That is done immediately after break-out from the major cycle as in indicated in the bottom part of the box marked *w*–$\overline{15}$.

In each execution of the major cycle one decimal digit of the number originally held as the $\overline{\text{I}}$P word in the R-register is determined and is typed. Since, by hypothesis, the typing of nine digits is desired the number placed in memery location *w*–16, for copying into *w*–18, is chosen so as to produce nine traversals of the major cycle. Here, and in the following, the execution of the most important part of the activties of a cycle is described as a "traversal." It is to be understood, however, that the ninth traversal of the major cycle differs form the earlier eight since the "break-out" occurs before the entire "cycle" is completed.

The second cycle of this subroutine, that one which makes use of instruction word *w*–$\overline{11}$, is introduced for the purpose of dissipating a small period of time after each key-stroke of the typewriter is initiated. Without this delay there would exist the danger that the signals which produce these key-strokes would be delivered more rapidly than the typewriter can accept them. The appropriate length for this delay period will, of course, depend on the properties of the typewriter. The value specified for the content of memory location *w*–8 corresponds to a delay of approximately one-tenth of one second. It is to be understood, of course, that this value is introduced only as an example and that quite different values may be appropriate, depending on the properties of the typewriter chosen.

The number of traversals of the first cycle of the subroutine, that one making use of instruction word *w*–1, is not chosen by the programmer but rather depends on the number which is being transformed into decimal form and typed. In each major cycle of the subroutine the number of traversals of this first cycle depends on the value of the decimal digit which is about to be typed. If that digit has the value zero, then break-out occurs in the first execution of the orders of *w*–$\bar{1}$. If it has the value one, then break-out occurs in the second execution; etc. Thus the number of traversals of this first cycle is "data-dependent," in contrast with the second and third cycles which have fixed, predetermined numbers of traversals.

As stated above, three External Effect orders are used in this conversion and printing subroutine; namely E1, E2, and E3. To facilitate the understanding of the detailed description of the execution of the printing subroutine, which will be presented below, the effects of these three orders will now be described with reference to FIGURE 22.

At the time of entry to this subroutine; that is, at the time of first filling of instruction word *w*–$\bar{1}$, there is held in the R-register as $\overline{\text{I}}$P-word a number which will be denoted N. N is, by hypothesis, a positive integer represented in simple binary expansion by the 40 bits of that register. More specifically, N is represented by 40 bits of which the least significant has the position value unity; that is, $2^0$, the second least significant has the position value $2^1$, etc., while the most significant bit has the position value $2^{39}$. It is also assumed that N is smaller than $(10^9)_{\text{decimal}}$; that is to say, N is smaller than ten to the ninth power. Accordingly, it can be represented in the decimal system by nine decimal digits, which will be denoted $n_8, n_7 \ldots n_0$. Specifically, $$N = n_8 \cdot 10^8 + n_7 \cdot 10^7 + \ldots + n_1 \cdot 10^1 + n_0 \cdot 10^0$$

Here the symbol 10 represents, of course, the number ten. Each of the nine decimal digits is, of course, an integer which may have any one of the values zero through nine, but is not permitted to exceed the value nine. It is well known that there exists one and only one such representation for any integer N smaller than $10^9$. It is the purpose of the subroutine to determine and to type these nine digits in succession, starting with $n_8$ and concluding with $n_0$.

The first order of instruction word *w*–$\bar{1}$ is the single order, Subtract. This order is shifted into the V–Z register in word period 3(*w.p.*–3) and is executed in ***w.p.*–4**. It causes the subtraction from the prior $\overline{\text{I}}$P-word in the R-register of the P-word presented by M during *w.p.*–4. That word will be denoted *w*–4. (It is customary to enclose in parentheses the symbol representing a memory location to provide a symbol representing the *content* of that memory location, thus the number subtracted would customarily be denoted (*w*–4). Here the parentheses will be used only when it is necessary to emphasize that distinction.) In memory location *w*–4 there is stored the constant, $10^8$; that is, ten to the eighth power. This is, of course, held as a binary integer in the same representation as has been described for the number N. Its value is the following:

(*w*–4) = $10^8$ = 00000 00000 00010 11111 01011 11000 01000 00000

This number is subtracted from N during word period 4. In the event that N is at least as great as $10^8$, the result will be a positive number which is left as the new $\overline{\text{I}}$P-word at the end of that word period and the "borrow bit" left in flip-flop C will have the value zero. Consequently, the Conditional Fill order which is the second order of instruction word *w*–$\bar{1}$ is not "successful" and the remaining orders of *w*–$\bar{1}$ are then executed. The third order of *w*–1 is the External Effect order, E1, which has the effect of advancing the state of the decimal counter as has been described earlier. It is to be assumed that at the time of initial entry into the subroutine the decimal counter was in its "zero" state and therefore this advance brings it into its "one" state. The remaining orders are a Wait and a Fill order. The duration of the Wait, as determined by its count number, is so chosen that the instruction word which is brought into the R register ($\overline{\text{IP}}$) by this Fill order is *w*–1, the same instruction word which was filled to begin the subroutine. The sequence of activities shown in the first box of FIGURE 22 is then performed again.

In the same way the full set of orders *w*–$\bar{1}$ may be executed a second time, then a third, etc. In each such full traversal of this cycle the $\overline{\text{I}}$P number held in R-register is reduced by $10^8$. At the first filling of *w*–$\bar{1}$ that number was N, at the second it is $N-10^8$, at the third it is $N-2\cdot 10^8$, etc. In each traversal, also, the state of the decimal counter is advanced by one thus providing an indication of the number of full traversals which have taken place.

The number of full traversals of the *w*–$\bar{1}$ cycle cannot be indefinitely great since the progressive reduction of ($\overline{\text{I}}$P) must eventually leave a result which is smaller than $10^8$. More particularly, since N was by hypothesis smaller than $10^9$ that situation will occur after no more than nine full traversals. The number of full traversals is, in fact, precisely $n_8$. (It is to be remembered that $n_8$ may have the value zero, in which case there are no full traversals at this time.) The $n_8$-times repeated reduction of N by $10^8$ leaves in the $\overline{\text{I}}$P-register the number $$N-n_8\cdot 10^8=n_7\cdot 10^7+ \ . \ . \ . \ +n_0\cdot 10^0$$

This number is a positive integer (it may, however, be zero) which is no larger than the decimal number $9999999=10^8-1$. Thus it is necessarily smaller than $10^8$. The subtraction of $10^8$ from this number, performed under control of the first order of $w$–$\overline{1}$, must therefore yield a negative result.

As has been discussed earlier, the result obtained by the subtraction of two positive integers may be regarded as a signed 41-bit number; of which the sign-bit, of position value $-2^{40}$, is left in C following the execution. The negativeness of the result obtained in this "excess" subtraction of $10^8$ (that performed after the $n_8$ full traversals) is indicated by the condition $C=1$ after its execution. That condition permits the "successful" execution of the Conditional Fill order which is the second order of the $w$–$\overline{1}$ instruction word, thus breaking out of the first cycle. This successful execution brings the instruction word $w$–$\overline{7}$ into the R register as $\overline{\text{IP}}$ word. It also causes the clearance of the one-bit from flip-flop C. At this time the state of the decimal counter 510 correctly indicates the desired first digit, $n_8$. The first order of instruction word $w$–$\overline{7}$ is the External Effect order E3. This order, as already described, causes the typing of $n_8$ by the typewriter. Then, after a Wait, the number $10^8$ is Added to ($\overline{\text{I}}$P). This addition approximately reverse the effects of the "excess" subtraction and leaves in the R-register the $\overline{\text{I}}$P number word.

$$(\overline{I}P)=n_7\cdot 10^7+n_6\cdot 10^6+ \ . \ . \ . \ +n_0\cdot 10^0$$

This reversal is only approximate in the sense that the addition does not leave the correct sign-bit in flip-flop C to correspond to this positive number, but rather leaves it in the condition $C=1$. The overflow bit thus left in C does not cause any disturbance and it is not to be regarded as a part of the number ($\overline{\text{I}}$P).

The number ($\overline{\text{I}}$P) as shown above becomes an $\overline{\text{I}}$P-word upon executing the order Exchange which is the fourth order (and the fifth syllable) of the instruction word $w$–$\overline{7}$. It is placed there to serve as the multiplicand in a Multiply operation to be performed subsequently. The fifth order of $w$–$\overline{7}$ is Bring-P, which brings the number found in memory location $w$–8 into the R delay line as $\overline{\text{I}}$P word. That number determines the number of repetitions of the cyclic process to follow which serves to provide a time delay during which the solenoid and typewriter actions may continue. Since the desirable length of this delay depends on the properties of the typewriter, the value of the constant placed in $w$–8 will not be specified. The sixth order of $w$–$\overline{7}$ is a Fill order which brings instruction word $w$–11 into the R register as $\overline{\text{IP}}$ word and thereby to initiate the "waiting cycle" controlled by it.

The activities of this waiting cycle are shown in the third box of FIGURE 27. Principally they consist of a suitable Wait and the Adding of the same constant, ($w$–8), which was previously placed into the R-register as $\overline{\text{I}}$P word. If that addition results in an overflow, which we may consider to be the "usual" result, then the Conditional Fill order which follows the Add order is successful and the same instruction word, $w$–$\overline{11}$, is filled again for another traversal. After the desired time delay the addition of $w$–8 fails to produce an overflow, the Conditional Fill is then unsuccessful, and the Fill order which follows it causes the filling of instruction word $w$–$\overline{15}$.

The first order of $w$–$\overline{15}$ is Bring-P. It brings into the R-register the content of memory location $w$–18 as $\overline{\text{I}}$P word. In anticipation of the later part of this discussion the number found there will be described as the initial content of $w$–18 and denoted ($w$–18)$_{\text{init.}}$ It has the following value:

($w$–18)$_{\text{init.}}$=11111 111000 00000
00000 00000 00000 00000 00000

It should be noted that the eight most significant bits of this number have the value "one," while the ninth bits has the value "zero." The remaining bits are of no importance. The second order is E2 which resets the decimal counter to its zero state. It is to be understood that by the time this resetting occurs the flow of current through the (previously) selected solenoid should have come to an end.

After an appropriate waiting period a (single) Shift order is executed, and then a Conditional Fill order. The single Shift order has the effect of leaving in flip-flop C the most significant bit of ($\overline{\text{I}}$P), which has the value One. Consequently, the Conditional Fill is successful and the instruction word $w\overline{13}$ is placed in the R register as $\overline{\text{I}}$P word for subsequent execution of the orders thereof.

After a Blank order, which serves only to provide a delay by one R-cycle, the (single) order Record-P is executed. Its effect is to return to memory location $w$–18 the number, ($\overline{\text{I}}$P), which was earlier taken from it. More precisely, the number thus returned to $w$–18 is a once-shifted form of ($w$–18)$_{\text{init.}}$ and therefore has only seven rather than eight most significant one-bits. In subsequent traversals of the major cycle of the subroutine this number is progressively shifted, so as to have six most significant one-bits, then five, etc. until none is left. It is the purpose of this number to meter the number of decimal digits which remain to be formed and typed.

The third order of $w$–$\overline{13}$ is Bring-P (double). Its execution places the contents of memory locations $w$–20 and $w$–21 into the R-register as $\overline{\text{I}}$P and IP words respectively. The numbers held in these two memory locations are as follows:

($w$–20)=00000 00000 00000
00000 00000 00000 00000 00000

($w$–21)=10100 00000 00000
00000 00000 00000 00000 00000

The four most significant bits of ($w$–21) will be regarded as representing the integer "ten"; its other bits are not of interest. These four bits form the multiplier in the following operation. The same double Bring order serves to clear to zero the $\overline{\text{I}}$P word.

The fourth order of $w$–$\overline{13}$ is Multiply. It is not, however, a simple Multiply operation which makes use of 40 bits of multiplier. Rather its count number is such that only four steps of the multiply process are carried out. Accordingly, only four multiplier bits are used. These are the four most significant bits of the number $w$–21 and have the values; "one," "zero," "one," and "zero," in the order mentioned. The net effect of this process is the multiplication by ten of the multiplicand which was previously placed into the R-register as $\overline{\text{IP}}$ word (by the Order Exchange). The product is the $\overline{\text{I}}$P word in the R-register at the end of the period of execution. (The product is necessarily so small that it may be described by the 40 bits of this register. Its non-zero bits cannot extend into the "more significant half," i.e. the IP-word.) The value of the multiplicand, the $\overline{\text{IP}}$ word, has been described earlier. The product, namely ten times that multiplicand, which is formed in the $\overline{\text{I}}$P-register has the value;

$$(\overline{I}P)_{2nd}=n_7\cdot 10^8+n_6\cdot 10^7+ \ . \ . \ . \ +n_0\cdot 10^1$$

After a suitable waiting period the instruction word $w$–$\overline{1}$ is again placed into the R-register to begin a second traversal of the major cycle of the subroutine. The $\overline{\text{I}}$P number word held in the R-register at that time has the value shown above, and for that reason it has been marked with the subscript "2nd."

It is to be noted that $(\overline{I}P)_{2nd}$ has a form very similar to that of N. It differs from N in that $n_8$ has disappeared, its place having been taken by $n_7$. Similarly $n_6$ has taken the place of $n_7$, $n_5$ of $n_6$, etc. Zero has taken the place of $n_0$; that is, there is no term in $(\overline{I}P)_{2nd}$ which is of the form $n \cdot 10^0$.

The activities of the second full traversal of the major cycle are very similar to those of the first. They lead to the formation and typing of the decimal digit $n_7$. At the end of this second traversal the $\overline{I}P$ number word held in the R-register has the value:

$$(\overline{I}P)_{3rd}=n_6\cdot 10^8+n_5\cdot 10^7+ \ . \ . \ . \ +n_0\cdot 10^2$$

The number held in memory location w–18 is also changed by this second traversal of the major cycle in that the number of "most" significant "one-bits" is then reduced from seven to six.

Similarly, in the third traversal of the major cycle the digit $n_6$ is formed and typed and the number of one-bits in w–18 is reduced to five, etc. After eight full traversals of the major cycle the digits $n_8$, $n_7$, $n_6$ . . . $n_1$ have been typed and all of the one-bits initially held in w–18 have been shifted out of it. At that time the major cycle is entered again and the ninth digit of N is formed and typed in the same manner as were its earlier, more significant, decimal digits. An important difference appears, however, during the execution of the instructions of the instruction word w–$\overline{15}$. Just as had happened earlier, the number w–18 is brought into the R-register as $\overline{I}P$ word and (after resetting of the decimal counter) a single Shift order is executed. This Shift execution, however, does not leave flip-flop C on and therefore the following Conditional Fill order is—for the first time—unsuccessful. As a result the remaining orders of w–$\overline{15}$ are executed. These are Bring-P (single), and Record-P (single). The effect of these two orders is to put the content of w–16 as $\overline{I}P$ word into the R-register and to place a copy of that number into w–18. As has been indicated earlier, w–16 is the "permanent" storage location for the number which has been described as $(w\text{–}18)_{init.}$ Copying it into memory location w–18 serves to provide (more precisely, to restore) the conditions necessary for a subsequent use of this subroutine. After this restoration of the status quo ante a Fill order causes the filling of an instruction word held in w–$\overline{21}$ to begin the activities subsequent to the execution of this subroutine.

These subsequent activities will not be regarded as parts of this subroutine, and will therefore not be described here. It is to be noted, however, that if the typewriter used for the recording of the nine decimal digits representing the number N is of a conventional type, then it may be presumed that a "carriage return" operation will be required before a subsequent use of this subroutine. The performance of this carriage return, in consequence of the execution of a fourth External Effect order, E4, can easily be understood on the basis of the foregoing description.

I claim:

1. A data processing system, comprising:
a storage means having a plurality of cylically stepwise accessible pairs of storage locations for respectively storing a pair of data words, each word including a plurality of bits, and the bits of the two words being stored in an interleaved-by-bit format;
an operating register for holding individual data words of individual particular significance, also in an interleaved-by-bit format;
processing means for processing individual data words in said operating register in steps which are synchronized to the stepwise change of access to pairs of said storage locations; and
transfer means for transferring a data word to be processed to said operating register from but one storage location of a pair, identified by the number of process steps previously performed.

2. In a data processing system, a first circulating register having a long circulating period and storing items of information, in an interleaved-by-bit format wherein alternating bits pertain to different items;
a second circulating register having a short circulating period and storing items of information classified in quantity information and control information also in an interleaved-by-bit format;
processing means for coupling said registers to each other for transfer of information items in a serial-by-bit format for periods of time commencing at instants apart by periods of time determined by the control information in said second register as integral multiples of a fixed period of time periods; and
means for recirculating the respectively interleaved bits in either register without transfer.

3. In combination with a data processing system, a storage means having a plurality of accessible storage locations, with pairs of locations holding their respective bit content in interleaved-by-bit relationship;
a first temporary register for holding a plurality of control codes, each code defined by bits, and holding additional information bits interleaved with the control code defining bits;
a second temporary register for holding an individual control code;
means for coupling the first register to the second register for exchanging a control code held in the second register for one of the control codes held in the first register; and
circuit means responsive to a particular control code when held in the second register for coupling said first register to said memory to load another group of control codes from a location of the storage means and into the first register, without interfering with the bits interleavedly held in the memory.

4. The combination as set forth in claim 3, comprising, in addition, externally accessible switching means:
first circuit means connected to be responsive to the state of the switching means; and
second circuit means connected to the first circuit means for controlling effectiveness of the circuit means responding to the particular control code in response to the state of the switching means as sensed by the first circuit means.

5. The combination set forth in claim 4, and comprising third circuit means responsive to a second particular control code when held in the second register for enabling the first circuit means to become responsive to the state of the switching means.

6. In a data handling device, a circulating register holding items of information which represent number information and control information, and which circulate in a serial-by-bit format with alternating bits pertaining to different items of information;
first means responsive to control information for providing control signals in response thereto;
second means connected to the first means for processing the number information in response to the control signals and as the number information passes through a particular location of said circulating register; and
third means connected for providing to the first and second means control and number information respectively and distinguishing between control information and number information as well as among distinct number information by the time of presentation at said location in units of alternating bit presentation periods.

7. A general purpose digital computer, comprising:
a register which includes a delay line, first means for setting bits organized in words into the delay line in a serial-by-bit format, said register including second means responsive to the serial emergence of such bits after having travelled through the delay line, and including third means for coupling the first and second means to present the emerged bits for recirculation;

timing means providing first timing signals to distinguish among the words as presented for recirculation in the serial by bit format and providing second timing signals to organize the bits of two words to be presented in an interleaved format;

a static register for holding operation codes and providing a distinguishing control signal for the duration of a code in the static register;

control means responsive to the code as held in said static register and further responsive to said timing means to control the said duration as integral multiples of said word distinguishing first timing signals, the period from the setting of any one code into said static register to the subsequent removal of any other code from the static register held subsequently therein being also an integral multiple of said first timing signals; and processing means responsive to particular ones of said control signals, said first and said second timing signals for selectively receiving from said delay line and discharging thereto words, and processing such words selectively during and subsequently to any transfer thereof from the delay line to the processing means.

8. In a processing system, a recirculating memory for storing a plurality of bits organized in data words, such bits passing through means permitting bit and word recording and retrieval; with alternating bits pertaining to different words;

processing means including first means for temporarily storing a word that has a plurality of operating codes, including second means for temporarily storing each one of said codes and further including third means responsive to the one code as currently stored in said second means to characteristically process any word held in said processing means, such processing including the transfer of any word between said memory and said processing means; and control means responsive to the code held in said second means to control the duration of the period for which such code is held in said second means, and to meter the period between any two word transfers in periods of time required for processing other than such word transfer, in between two word transfers.

9. In a general purpose computer processing data represented by bits, there being a clock defining periodically recurring bit periods, the combination comprising:

a delay line including means responsive to information bits emerging from the delay line and being connected to the clock for setting such bits again into the delay line to provide recirculation of such information bits in response to recurring bit periods as defined by the clock;

a static register having a plurality of stages for temporarily storing operating order codes;

decoder means responsive to the state code held during predeterminable periods in said register and providing code distinguishing output signals;

circuit means for temporarily connecting said register to said delay line to receive therefrom a new order code and to discharge thereto an order code previously held by the static register; and circuit means individually responsive to said code distinguishing signals to modify the recirculation of information in said delay line.

10. In a general purpose computer processing data represented by bits, there being a clock defining periodically recurring bit periods, the combination, comprising:

a recirculating register which includes means connected to the clock for setting bits into the register at a rate determined by periodical bit periods, further including means for receiving bits after having travelled through the reigster, and providing said received bit for reinsertion into the register thereby establishing a recirculating period;

first circuit means enabled during predetermined periods of time for branching off said register a plurality of bits for temporary storage and decoding;

second circuit means for periodically intermittently withdrawing bits from said receiving means during periods of time other than said predetermined periods and processing such bits for modified reinsertion into said register, while permitting unmodified recirculation of the bits interspaced in the withdrawn bits; and third circuit means for controlling the activities of said second circuit means in response to the decoded plurality of temporarily stored bits.

11. A general purpose computer for processing digital data represented by bits, there being clock means defining periodically recurring bit periods, comprising:

timing means connected to said clock and defining a first train of alternating timing signals each having a duration that is an integral multiple of and is larger by at least one order of magnitude than a bit period, and defining a second train of alternating timing signals each having the duration of a bit period;

a static register having *n* stages with *n* being in excess of two but less than the number of second train timing signals during any first train timing signal;

first, long and second, short recirculating registers for individually recirculating data bits, said registers having circulating periods which are integral multiples of the duration of a first train timing signals;

first circuit means repeatedly responsive to a group of timing signals that includes one type of first train and one type of second train timing signals, for divesting *n* bits emerging from the second recirculating register for passage into said static register as substitution for the previous content of said static register, said previous content and the remaining bits to which said first circuit means is responsive being recirculated in said second register; and means responsive to the bit combination held in said static register during periods when said first circuit means are disabled, to modify the circulation of bits in at least one of said recirculating registers and in groups of bits defined by their presentation for recirculation during particular combinations of first and second train timing signals.

12. A computer of the general purpose type;

means defining periodically recurring bit periods;

a first and a second recirculating delay line having substantially differing lengths, each delay line including input means for setting bits sequentially into such delay line at a rate determined by periodic bit periods, each delay line further including output means for receiving bits that have travelled through such delay line;

fiirst and second circuit means for coupling the input means of each delay line to its output means to establish recirculating registers with the circulatory period of the long, first delay line being an integral multiple of half the circulatory period of the short, second delay line;

a static register providing a plurality of distinguishing state signals; and third circuit means responsive to the state signal as provided currently by said static register to characteristically modify the bits as they are set into at least one of said delay lines, and including first control means responsive to a first plurality of state signals effective to cause transfer of bits that emerge from one delay line to the other one, further including second control means responsive to a second plurality of state signals that affect only the bits set into the short delay line, said third circuit means further including third control means which include at least some of said first and second control means and being responsive to a third plurality of state signals which include at least some of said first and second pluralities of state signals and causing modifications of bits to be set into a delay line only for every other bit period while said first and second circuit means maintain unmodified recirculation for the respective interleaved bits.

13. In a general purpose computer processing data represented by bits, there being a clock defining periodically recurring bit periods, the combination comprising:

a delay line including means for receiving individual data bit for passage into the delay line, one bit each during a bit period, and including additional means responsive to the emergence of such bit after having traveled through the delay line for a duration that is a fixed integral of bit periods;

timing means connected to said clock and defining a train of alternating first and second timing signals each having a duration that is an integral multiple of and is larger by at least one order of magnitude than a bit period, and defining a train of alternating third and fourth timing signals each having the duration of a bit period;

a static register having *n* stages, with *n* being in excess of two but less than the number of third timing signals during a first timing signal;

first circuit means repeatedly responsive to a group of timing signals that include first and third timing signals for divesting *n* bits emerging from the delay line and passing them into said stating register as substitution for the previous content of said register, said previous content and the remaining bits to which said first circuit means is responsive being recirculated in said delay line; and second circuit means characteristically responsive to the content of the static register during the respective succeeding second timing signals and being responsive to bits that have emerged from the delay line to set such bits into the delay line during said second timing signals and third timing signals, while causing a new string of bits to recirculate during the respective interleaved appearing fourth timing signals.

14. In a general purpose computer processing data represented by bits, there being a clock defining periodically recurring bit periods the combination comprising:

a delay line including means for receiving individual data bits for passage into the delay line one bit each during a bit period, and including additional means responsive to the emergence of such bit after having traveled through the delay line for a duration that is a fixed integral of bit periods;

timing means connected to said clock and defining a train of alternating first and second timing signals each having a duration that is an integral multiple of and is larger by at least one order of magnitude than a bit period, and defining a train of alternating third and fourth timing signals each having the duration of a bit period;

a static register having *n* stages with *n* being in excess of two but less than the number of third timing signals during a first timing signal;

first circuit means repeatedly responsive to a group of timing signals that include first and third timing signals, for divesting *n* bits emerging from the delay line and passing them into said stating register and substituting the previous content of said register for recirculation in said delay line, while recirculating the remaining bits to which said first circuit means is responsive;

second circuit means for inhibiting operation of said first circuit means during the respective second timing signal;

third circuit means responsive to the combination of bits held in the static register to control effectiveness of said second circuit means, and to permit control operations to be performed for one second timing signal and the respective succeeding, first timing signal; and fourth circuit means concurrently responsive with said third circuit means for causing recirculation of emerged bits during third timing signals while substituting a new string of bits to be set into the delay line during the respective interleaved fourth train timing signals.

15. In a general purpose computer processing data represented by bits, there being a clock defining periodically recurring bit periods, the combination, comprising:

a delay line including means for receiving individual data bits for passage into the delay line one bit each during a bit period, and including additional means responsive to the emergence of such bits after having travelled through the delay line for a duration that is a fixed integral of bit periods;

timing means connected to said clock and defining a first train of alternating timing signals each having a duration that is an integral multiple of and is larger by at least one order of magnitude than a bit period, and defining a second train of alternating timing signals each having the duration of a bit period, there being four groups of timing signals distinguished from each other by the two types of first train and the two types of second train timing signals;

a static register having *n* stages with *n* being in excess of two but less than the number of timing signals of each of said groups;

first circuit means repeatedly responsive to a group of timing signals that includes one type of first train and one type of second train timing signals for divesting *n* bits emerging from the delay line and passing them into said stating register and substituting the previous content of said register for recirculation in said delay line while recirculating the remaining bits to which said first circuit means is responsive;

second circuit means for inhibiting operation of said first circuit means for a predetermined number of first train timing signals, such number determined by a bit combination presented to recirculation during said one type of first train timing signals and said one type of second train timing signals;

third circuit means concurrently operating with said second circuit means and causing the unmodified setting of bits emerging from said delay line during said one group of timing signals, while modifying said number representing bits prior to recirculation during said one type of first and second train timing signals; and fourth circuit means for causing a new string of bits to be set into the delay line during at least one other group of timing signals.

16. In a general purpose computer for processing data represented by bits, there being a clock defining periodically recurring bit periods, the combination, comprising:

a delay line including means for receiving individual data bits for passage into the delay line, one bit each during a bit period and including additional means responsive to the emergence of such bit after having travelled through the delay line for a duration that is a fixed integral multiple of bit periods;

first circuit means connected to said delay line to establish a recirculating register by individually setting bits which emerged from the delay line back into it, thereby establishing a circulating period for such bit;

a static register for storing an order code defined by a plurality of bits;

second circuit means for coupling said static register to said delay line for preselected, recurring periods of time separated by other periods of time, to withdraw from said delay line bits defining order codes and for loading such bits into said static register, each order code to be held in said static register for at least one other period of time that succeeds the period of loading; and circuit means responsive to the order held in said static register to manipulate the setting of bits into said delay line characteristically for bits during alternating bit periods thereby overriding the recirculation caused by said first circuit means during at least one other period of time.

17. In a general purpose computer for processing data represented by bits, there being a clock defining periodically recurring bit periods, the combination, comprising:

a delay line including means for receiving individual data bits for passage into the delay line, one bit each during a bit period, and including additional means responsive to the emergence of such bit after having travelled through the delay line for a duration that is a fixed integral multiple of bit periods;

first circuit means connected to said delay line to establish a recirculating register by individually setting bits which emerged from the delay line back into it, thereby establishing a circulating period for such bit;

a static register for storing an order code defined by a plurality of bits;

second circuit means for coupling said static register to said delay line for preselected, recurring, first periods of time separated by other, second periods of time, for withdrawing from said delay line bits defining order codes, and loading such bits into said static register, each order code to be held in said static register for at least one second period of time that succeeds the first period of loading;

third circuit means responsive to particular phases within the first periods of time when recurring, to cause counting of the number of recurring other second periods since loading of one of a particular class of orders into said static register, said third circuit means disabling said second circuit means for the duration of counting and to retain said one order in said static register;

fourth circuit means for characteristically processing bits as they emerge from said delay line prior to re-insertion of processed bits in lieu of the emerging bits to be processed during the period of disabling of said second circuit means; and fifth circuit means responsive to a particular counting result to re-enable said second circuit means.

18. In a general purpose computer for processing data represented by bits, there being a clock defining periodically recurring bit periods, the combination, comprising:

a delay line including means for receiving individual data bits for passage into the delay line, one bit each during a bit period and including additional means responsive to the emergence of such bit after having travelled through the delay line for a duration that is a fixed integral multiple of bit periods;

first circuit means connected to said delay line to establish a recirculating register by individually setting bits which emerged from the delay line back into it, thereby establishing a circulating period for each bit;

a static register having *n* stages for storing an order code having *n* bits;

second circuit means for coupling said static register to said delay line for alternating bit periods and during periods of time each equal to half a circulating period to change the content of said static register during such periods of time, thereby concurrently disabling said first circuit means for those alternating bit periods while maintaining said first circuit means enabled during the bit periods in between;

third circuit means for metering disabling periods of time for said second circuit means as multiples of half a circulating period; and fourth circuit means for manipulating the setting of bits into said delay line at alternate bit periods at least during part of said disabling periods.

19. In a data handling device, a processor capable of performing a plurality of different operations;

a static register for storing a code signal that determines the type of operation to be performed;

a circulating register for holding data, there being means processing such data in characteristic steps pursuant to some of said operations, said circulating register holding also a count number for a particular class of codes when individually in said static register;

circuit means for incrementing said count number for each cycle of circulation;

means for causing repetition of the operation steps as determined by the code held in the static register for each cycle of incrementation; and means for withdrawing a code from said static register when said count number has been incremented to a particular number.

20. In a general purpose computer for processing data represented by bits, there being a clock defining periodically recurring bit periods, the combination, comprising:

a delay line including means for receiving individual data bits for passage into the delay line, one bit each during a bit period, and including additional means responsive to the emergence of such bit after having travelled through the delay line for a duration that is a fixed integral multiple of bit periods;

a static register having a plurality of stages for temporarily storing order code bits;

circuit means for temporarily coupling said delay line to said register to load bits emerging from said delay line and to shift bits previously held in said register into said delay line for recirculation;

circuit means controlling the period during which order code bits are held in said register in response to the code held therein in multiples of a units of a time period that is a fixed multiple of said bit periods;

decoding means responsive to any code when held in said register during the time when said circuit means is disabled and providing a control signal in response thereto and representative thereof; and circuit means individually responsive to said control signals to manipulate the setting of bits into said delay line in logic-functional relation to the order code held in said register.

21. In a general purpose computer processing data represented by bits, there being a clock defining periodically recurring bit periods, the combination, comprising:

a delay line including means responsive to information bits emerging from the delay line for setting such bits again into the delay line to provide recirculation of such information bits;

a static register having a plurality of stages for temporarily storing operation state codes;

decoder means responsive to the state code held during predeterminable periods in said register and providing code distinguishing output signals;

circuit means for temporarily connecting said register to said delay line to receive therefrom a new state code and to discharge thereto a state code previously held by the static register; and signal means individually responsive to a plurality of code distinguishing signals to rearrange the order of recirculation of information in said delay line in a noncyclic pattern.

22. A general purpose computer for processing digital data represented by bits, there being clock means defining periodically recurring bit periods, comprising:

first and second recirculating registers each recirculating groups of bits defining data words of similar length, the bits of respective two words circulate in alternating, interleaved relationship;

a static register for temporarily storing operating code signals;

first circuit means for operatively connecting said static register to said first recirculating register during a first mode of operation, for shifting state code signals as portions of a word circulating in said first recirculating register, into said static register;

second circuit means for controlling the content of said static register independently from any particular bit combinations held in said recirculating registers in a second mode of operation;

third circuit means responsive to the state code signal currently held in said static register for controlling the duration of retaining such state code signals in said static register individually for each state code signal in the first mode of operation, and in groups of state code signals in the second mode of operation as fixed integral multiples of the recirculation period of said first recirculating register; and fourth circuit means responsive to the state code signal currently held in said static register to characteristically modify bits circulating in at least one of said registers, during any of said modes, but permitting transfer of bits in between the two registers only in the first mode.

23. In a general purpose computer processing data represented by bits, there being a clock defining periodically recurring bit periods, the combination, comprising:

a recirculating register capable of recirculating bit signals;

a static register for temporarily storing state code signals, such state codes defining order codes during a first mode of operation and loading phase codes during a second mode of operation;

first circuit means for coupling said static register to said recirculating register in said first mode of operation for changing the order code in said static register;

second circuit means operative in said first mode of operation when said two registers are decoupled and responsive to the order code when held in said static register to process bits circulating in said recirculating register;

third circuit means responsive to a particular order when held in said static register to place the system into the second mode of operation during which coupling of said static register to said recirculating register is prevented;

fourth circuit means operative during said second mode of operation to control the phase codes held in said static register;

fifth circuit means responsive to the phase code held on said static register to transfer externally presented bits into said recirculating register; and means including said fourth and fifth circuit means responsive to the state of filling said recirculating register to terminate said second mode of operation.

24. In a general purpose computer for processing data represented by bits, there being a clock defining periodically recurring bit periods, the combination, comprising;

means for presenting data in a serial by bit format but asynchronously in relation to said clock periods;

a delay line including means for receiving individual data bits for passage into the delay line, one bit each during a bit period, and being responsive to the emergence of such bit after having travelled through the delay line for a duration that is a fixed integral multiple of bit periods;

first circuit means connected to said delay line to establish a recirculating register by individually setting bits which emerged from the delay line back into it, thereby establishing a circulating period for such bit;

a static register having for storing a state code defined by a plurality of bits;

second circuit means for providing distinguishing signals for two different operational modes, effective in that only in the first mode said static register is operatively connectible to said delay line as temporary extension thereof;

third signal means responsive to the signal identifying the second mode for synchronizing said asynchronous presentation of data bits to said circulating period, by sequentially loading such asynchronously presented data bits into said delay line at a rate determined by its circulating period.

25. In a general purpose computer for processing data represented by bits, there being a clock defining periodically recurring bit periods, the combination, comprising;

a delay line including means responsive to the emergence of a bit after having travelled through the delay line for a duration that is a fixed integral multiple of bit periods;

means responsive to externally produced and serially presented information bits;

a static register to hold a code signal;

first circuit means for controlling the setting of bits into said delay line;

second circuit means responsive to a first plurality of code signals held in said register to cause an externally produced bit to be set into said delay line by said first circuit means;

third circuit means for controlling said static register to repeat said plurality of code signals until said delay line is loaded;

fourth circuit means for coupling said static register to said delay line for shifting code signals from the former into the latter subsequently to completion of loading; and fifth circuit means sequentially responsive to the code signals shifted into said static register to process the bits as they emerge from the delay line.

26. In a general purpose computer processing data represented by bits, there being a clock defining periodically recurring bit periods, the combination, comprising:

a delay line including means for receiving individual data bits for passage into the delay line one bit each during a bit period, and including additional means responsive to the emergence of such bit after having travelled through the delay line for a duration that is a fixed integral multiple of bit periods;

timing means connected to said clock and defining a first train of alternating timing signals each having a duration that is an integral multiple of and is larger by at least one order of magnitude than a bit period, and defining a second train of alternating timing signals each having the duration of a bit period, there being four groups of timing signals distinguished from each other by the two types of first train and the two types of second train timing signals;

a static register having *n* stages with *n* being excess of two but less than the number of timing signals of each of said groups;

first circuit means responsive to a first group of said groups of timing signals for divesting bits emerging from the delay line during the periods of response of said first circuit means, and passing them into said register and causing the previous content of said register to be recirculated in the delay line;

second circuit means responsive to the combination of bits currently held in the static register and further responsive to bits emerging from said delay line during at least one other group of timing signals and causing recirculation of such bits; and third circuit means concurrently responsive to said second circuit means for causing a new string of bits to be set into the delay line during still at least one other group of timing signals.

27. The combination set forth in claim 26, and including means to form said new string of bits from bits previously held in said delay line.

28. The combination set forth in claim 26, and including means to form said new string of bits out of one group of said recirculated bits.

29. The combination set forth in claim 26, and including means to form said new string of bits from bits previously held in said delay line and not recirculated and from a second string of bits previously held in the delay line and also recirculated.

30. The combination set forth in claim 26 and including further a second delay line serially presenting groups of bits distinguishable by said four types of timing signals, said new string of bits being derived from said second delay line.

31. The combination set forth in claim 30, there being means to combine bits emerging from said first delay line with the bits concurrently presented by said second delay line to form said new string of bits.

32. In a general purpose computer processing data represented by bits, there being a clock defining periodically recurring bit periods, the combination, comprising:

a delay line including means for receiving individual data bits for passage into the delay line, one bit each during a bit period, and including additional means responsive to the emergence of such bit after having travelled through the delay line for a direction that is a fixed integral multiple of bits periods;

first circuit means responsive to periodically intermittently emerging bits, including a first group of bits (*a*) and a second, succeeding group of bits (*d*);

registered means repeatedly connectible to said delay line to withdraw therefrom a number of bits pertaining to the group of bits (*d*), the rate of repetition being an integral multiple of the period during which all bits (a) and (d) have emerged from the delay line;

control means responsive to bits withdrawn and held in the register when disconnected from said delay line, to provide control signals representative of the bit combination held in the register;

means responsive to the control signals to present a sequence of bits (*b*) in dependence upon the particular control signal developed, such bits (*b*) being presented serially and concurrently with the response of said first circuit means to bits (*a*);

second circuit means for combining a bit (*a*) with a bit (*b*) and forming a bit (*c*) in accordance with a logic relationship;

third circuit means for combining two bits (*a*) and (*b*), respectively succeeding the bits forming a bit (*c*) with that bit (*c*) the relation $a \neq b \neq c$, to form a resulting bit; and means for setting said bits (*a*) and the resulting bits in interleaving relationship into said delay line.

33. The combination set forth in claim 32, said control signal responsive means including means for operating said second circuit means selectively to form carry and borrow bits (*c*) depending upon the bit combination held in said register.

34. The combination set forth in claim 33, comprising, in addition, a second delay line, also having means to load individual data bits, one each during a bit period and having means responsive to the emergence of such bit after having travelled through the second delay line, and said control signal responsive means including particular means responsive to a particular control signal to present as sequence of bits (*b*) the bits emerging from second delay line concurrently with the presentation of bits (*a*) by said first circuit means.

35. The combination set forth in claim 32, said control signal responsive means in response to at least one particular control signal drawing said sequence of bits (*b*) from the delay line, with a bit (*b*) emerging therefrom alternatingly with and respectively prior to a bit of the groups of bits (*a*) and (*d*), the resulting bit formed with the inclusion of a bit (*b*) being set into the delay line subsequently to a bit (*a*) or (*d*) which succeeded the latter bit (*b*) at the time of emerging from the delay line.

36. The combination set forth in claim 35 and including means responsive to a particular control signal to operate said second circuit means to form carry bits (*c*).

37. The combination set forth in claim 35 and including means responsive to a particular control signal to operate said second means to selectively form carry or borrow bits (*c*).

38. The combination set forth in claim 32 and including means responsive to a particular sequence of bits within group (*d*) as they emerge from the delay line to control the duration of disconnection of said register means and of effectiveness of said control means as providing a particular control signal, for controlling concurrent operation of said second, third and last means.

39. In a general purpose computer processing data represented by bits, there being a clock defining periodically recurring bit periods, the combination, comprising:

a delay line including means for receiving individual data bits for passage into the delay line one bit each during a bit period, and including additional means responsive to the emergence of such bit after having travelled through the delay line for a duration that is a fixed integral multiple of bit periods;

first circuit means responsive to bits (*a*) emerging periodically intermittently from said delay line;

means for presenting a sequence of bits (*b*) respectively concurrently with the response of said first circuit means to a bit (*a*);

second circuit means for combining a bit (*a*) with a bit (*b*) and forming a bit (*c*) in accordance with a logic relationship;

third circuit means for combining two bits (*a*) and (*b*) respectively succeeding the bits forming a bit (*c*) with that bit (*c*) in accordance with the relation ($a \neq b \neq c$), to form a resulting bit; and means for setting said bits (*a*) and the resulting bits in intermittent relationship into said delay line for recirculation.

40. In a general purpose computer processing data represented by bits, there being a clock defining periodically recurring bit periods, the combination, comprising:

a delay line including means for receiving individual data bits for passage into the delay line, one bit each during a bit period, and including additional means responsive to the emergence of such bit after having travelled through the delay line for a duration that is a fixed integral multiple of bit periods;

first circuit means responsive to every other bit as it emerges from said delay line;

means for providing a sequence of bits and presenting them serially and concurrently with the response of said first circuit means to emerging bits;

second circuit means for serially combining bit by bit a bit of a first plurality of said first circuit responding bits with a bit of said sequence in accordance with a first logic relationship, and forming a resulting bit;

third circuit means for serially combining bit by bit a bit of the first plurality, a bit of said sequence and a resulting bit formed of two bits respectively preceding the latter first plurality bit and the later sequence bit, in accordance with a second logic relationship and forming a recirculating bit; and circuit means for setting said recirculating bits into the delay line as substitution of the bits to which said first circuit is responsive, and for concurrently causing unmodified recirculation of the bits emerging from the delay line in inter-spaced relationship with said first circuit means responsive bits.

41. The combination set forth in claim 40, said second circuit means forming a carry bit, said third circuit means performing an addition.

42. The combination set forth in claim 40, said second circuit means forming a borrow bit, said third circuit means performing a subtraction.

43. In a general purpose computer processing data represented by bits, there being a clock defining periodically recurring bit periods, the combination, comprising:

a delay line including means for receiving individual data bits for passage into the delay line, one bit each during a bit period, and including further means responsive to the emergence of such bit after having travelled through the delay line for a duration that is a fixed integral multiple of bit periods;

timing means connected to said clock and defining a first train of alternating timing signals each having a duration that is an integral multiple of and is larger by at least one order of magnitude than a bit period, and defining a second train of alternating timing signals each having the duration of a bit period, there being four groups of *m* timing signals each and distinguished from each other by the two types of first train and the two types of second train timing signals.

a static register having *n* stages with *n* being in excess of two but less than number of timing signals of each of said groups;

selective circuit means for controlling recirculation of bits that emerge from the delay line by setting them again into the delay line, said selective circuit means responsive to permit recirculation of bits in groups as identified by said groups of timing signals at times of presentation of such bits for recirculation;

first circuit means responsive to a first group of *m* timing signals each being defined by concurrence of one one type of first train and of one type of second train timing signals, the number of said second train timing signal per first train timing signal being an integral multiple of *n*, and causing said delay line to be coupled to said static register, thereby modifying the recirculation of bits of said latter group in that the *n* bits held in the static register are sequentially set into the delay line, *m-n* bits of said latter group are recirculated at a delay of *n* second train timing signal cycles, as compared with unmodified recirculation caused normally by said selective means, while *n* bits of said latter group as it emerged from the delay line are retained in said static register at the end of the first train timing signal of first circuit means response;

second circuit means operatively enabled subsequent to said end to disable said selective circuit means as to recirculation of at least one other group of bits and causing substitution of a different string of bits in characteristic response to the bit combination then held in the static register; and control means responsive to the latter bit combination to control disability of said first circuit means for periods being multiples of first train timing signal cycles.

44. The combination set forth in claim 43, said control means including first means for incrementing a number presented for recirculation during a particular phase of said first group of timing signals, and second means responsive to a particular incremented count number to reenable said first circuit means.

45. The combination set forth in claim 44, said second means being additionally responsive to a code bit held in said static register for determination of said particular number.

46. In a general purpose computer processing data represented by bits, there being a clock defining periodically recurring bit periods, the combination, comprising:

a delay line including means for receiving individual data bits for passage into the delay line, one bit each during a bit period, and including additional means responsive to the emergence of such bit after having travelled through the delay line for a duration that is a fixed integral multiple of bit periods;

a memory capable of serially presenting bits;

a static register having n stages for storing an order code having n-bits;

first circuit means for coupling said register to said delay line for a first period of time to withdraw an order code from said delay line and setting such order code into said static register;

second circuit means responsive to a particular one of said order codes when held in said static register at the end of said first period of time, causing bits alternatingly emerging subsequently from said delay line during a second period of time to be combined with bits concurrently presented by said memory, the resulting bit being inserted into said delay line; and circuit means including said first circuit means for removing said order code from said static register at the end of said second period of time.

47. In a general purpose computer processing data represented by bits, there being a clock defining periodically recurring bit periods, the combination, comprising:

a delay line including means for receiving individual data bits for passage into the delay line, one bit each during a bit period;

first circuit means connected to said delay line to be responsive to bits as they emerge from the delay line, there being a first group of bits, and a second group of bits, with the bits of the two groups appearing in interleaved relationship so that said first circuit means receives bits sequentially which pertain to alternating groups;

second circuit means connected to said first circuit means and being responsive to the bits of said first group and setting them into said delay line in like sequence; and third circuit means serially responsive to the bits of said second group and setting said second group bits into said delay line, with a second group bit emerging prior to a first group bit being set into the delay line subsequently to the latter first group bit.

48. In a general purpose computer for processing data represented by bits, there being a clock defining periodically recurring bit periods, the combination, comprising:

a delay line including means for receiving individual data bits for passage into the delay line, one bit each during a bit period, including additional means and responsive to the emergence of such bit after having travelled through the delay line for a duration that is a fixed integral multiple of bit periods;

first circuit means connected to said delay line to establish a recirculating register by individually setting bits which emerged from the delay line back into it, thereby establishing a circulating period for such bit;

a static register for storing an order code defined by a plurality of bits;

second circuit means responsive to a particular code when held in said static register for disabling said first circuit means; and third circuit means responsive concurrently with said second circuit means for distinguishing between two groups of bits as they emerge from the delay line in interleaved relationship and changing the order of sequentially emerging bits pertaining to the different groups before resetting them into said delay line.

49. In a general purpose computer processing data represented by bits, there being a clock defining periodically recurring bit periods, the combination, comprising:

a delay line including means for receiving individual data bits for passage into the delay line, one bit each during a bit period, and including additional means responsive to the emergence of such bit after having travelled through the delay line for a duration that is a fixed integral multiple of bit periods;

first circuit means connected to said delay line to establish a recirculating register by individually setting bits which emerged from the delay line back into it, thereby establishing a circulating period for each bit;
second circuit means operatively connected in between said delay line and said first circuit means for enlarging the circulating period for every other bit that emerges from the delay line, by two bit periods per recirculation, respectively interleaved bits bypassing said second circuit means for recirculation;
third means for enabling said second circuit means for a predetermined number of circulating periods; and
means for disabling the connection between said second circuit means and said delay line for one bit period during each circulating period to prevent double insertion of any bit into said delay line during any one circulating period.

50. In a general purpose computer processing data represented by bits, there being a clock defining periodicially recurring bit periods, the combination comprising:
a delay line including means for receiving individual data bits for passage into the delay line, one bit each during a bit period, and including additional means responsive to the emergence of such bit after having travelled through the delay line for a duration that is fixed integral of bit periods;
first circuit means for causing a first and second plurality of bits to be recirculated in the delay line after their respective emergence from the delay line, thereby defining a circulating period;
second circuit means responsive to bits emerging from the delay line in intermittent time relationship with the bits of the first and second pluralities;
third circuit means for sequentially forming carry-bits of the first plurality of bits as presented serially for recirculation and of the bits to which said second circuit means are responsive;
fourth circuit means for providing bits for setting into said delay lines in intermittent relationship to the recirculation of said first and second plurality of bits by respectively additively combining a carry bit, a first plurality bit and a bit to which said second circuit means are responsive, such latter bit emerged prior to said first plurality bit from the delay line, whereby a bit set by said fourth circuit into the delay line is being set subsequently to the recirculation of the latter, first plurality bit it includes in its formation; and
fifth circuit means for controlling the effectiveness of said second, third and fourth circuit means in response to a quantity represented by bits of said second plurality.

51. In a general purpose computer having clocking means defining periodically recurring bit periods, the combination comprising:
a delay line;
means for setting a first and a second group of bits into said delay line in interspaced, alternating relationship, respectively during alternating bit periods;
means responsive to said first group of bits as they emerge from the delay line and delaying each bit by two bit periods;
means responsive to said second group of bits as they emerge from the delay line and feeding them to said setting means for recirculating;
processing means for serially combining a portion of said delayed bits of said first group with a portion of said second group of bits in accordance with a serial arithmetic process rule and feeding the resulting bits serially to said setting means, for said setting means to set the resulting bits as part of said first group then set into the delay line in interleaved relationship to the recirculation of the bits of said second group; and
means responsive to a second portion of said second undelayed recirculated group of bits, such second portion representing a count number, and incrementing the count number before recirculation in each recirculation cycle, for metering the duration of operation of said processing means.

52. In a general purpose computer processing data represented by bits, there being a clock defining periodically recurring bit periods, the combination comprising:
a delay line including means for receiving individual data bits for passage into the delay line, one bit each during a bit period, and including additional means responsive to the emergence of such bit after having travelled through the delay line for a duration that is a fixed integral multiple of bit periods;
first circuit means for causing a first and second plurality of bits to be recirculated in the delay line after their respective emergence from the delay line, thereby defining a circulating period;
second circuit means responsive to additional bits emerging from the delay line in intermittent time relationship with the bits of the first and second pluralities;
third circuit means responsive to said first plurality of bits and to the additional bits to which said second cricuit means is responsive to sequentially form resulting bits to be recirculated in said delay line intermittently with the recirculated bits of said first and second pluralities; and
fourth circuit means responsive to several of bits of said second plurality as they emerge from said delay line to control the duration of effectiveness of said second and third circuit means.

53. A recirculating register for holding four different words of similar binary format, a first one thereof representing a multiplier, a second one thereof a multiplicand, a third one thereof a group of codes including a number, a fourth word being a resulting number;
first means for shifting said resulting number representatively for a multiplication by two for each recirculating cycle, and for concurrently shifting said multiplier word with sequential suppression of one bit per recirculating cycle;
second means for detecting the bit value of each suppressed bit per recirculation cycle and for causing said multiplicand be added serially to said resulting number, once per recirculation cycle and only when the detecting bit value is —one—; and
means for controlling the duration of operation of said first and third means in dependence upon the number in said third word.

54. In a general purpose computer for processing data represented by bits, there being a clock defining periodically recurring bit periods, the combination, comprising:
a delay line including means for receiving individual data bits for passage into the delay line, one bit each during a bit period, and having additional means responsive to the emergence of such bit after having travelled through the delay line for a duration that is a fixed integral multiple of bit periods;
first circuit means for distinguishing between a first group of bits ($a$), a second succeeding group of bits ($b$), and a third group of bits ($c$) preceding as a whole the second group of bits ($b$) as they emerge from said delay line in seiral-by-bit formats, bits ($a$) and ($c$) being interleaved;
second circuit means for causing said first group of bits ($a$) to recirculate in said delay line for each bit to circulate at a fixed recirculating period;
third circuit means for delaying said second and third groups of bits as they emerge from said delay line by an additional delay period to correspond to a binary multiplication by two, all but one bit of said group being also recirculated, while one bit ($b$) per recirculation period is suppressed;
means for serially adding the bits ($a$) of said first group to the third group of bits ($c$) before recirculation but subsequent to the additional delay thereof, for each suppressed one-bit of said group ($b$); and means for controlling the number of circulations of the third group commensurate with number of bits of the first group ($a$).

55. In a general purpose computer for processing data represented by bits, there being a clock defining periodically recurring bit periods, the combination, comprising:

a delay line including means for receiving individual data bits for passage into the delay line, one bit each during a bit period, and having additional means responsive to the emergence of such bit after having travelled through the delay line for a duration that is a fixed integral multiple of bit periods;

first circuit means for distinguishing between a first group of bits ($a$), and a second group of respectively interleaved bits as they emerge from said delay line in serial-by-bit formats;

second circuit means for causing said first group of bits ($a$) to recirculate in said delay line for each bit to circulate at a fixed recirculating period;

third circuit means for delaying said second group of bits ($b$) as they emerge from said delay line by an additional delay period to correspond to a binary multiplication by two;

fourth circuit means for serially adding to or subtracting from the second group of bits ($b$) subsequent to the additional delay thereof, the bits ($a$) of said first group during each circulation cycle, there being bits of group ($b$) not affected by said addition or subtraction due to the difference in size of the groups, and forming a quotient bit as well as a sign bit, such sign bit to determine adding or subtraction in the next cycle;

means for storing said sign bit through the next cycle;

means for inserting quotient bits as bits ($b$) that are not affected by such addition and subtraction; and means for controlling cyclic repetition of operation of said fourth circuit means for a duration predeterminable and commensurate with the initial difference in bit numbers of groups ($a$) and ($b$).

56. In a general purpose computer for processing digital data represented by bits, comprising:

means for providing external communication with said computer for the transfer of bits into and out of said computer;

a delay line including means responsive to information bits emerging from the delay line for setting such bits again into the delay line to provide recirculation of such information bits;

a static register having a plurality of stages for temporarily storing operation order codes;

decoder means responsive to the state code held during predeterminable periods in said register and providing code distinguishing output signals;

timing control means operating synchronously with the recirculation of said delay line for connecting said delay line to said static register for fixed periods of time separated from each other in time by periods which are integral multiples of the total of said fixed periods of time, thereby causing communication between said delay line and said static register to change the code of the latter;

processing means responding characteristically to predetermined codes when held in the static register to process determined groups of said information bits when outside of said delay line; and signal means responsive to other codes when held in the static register to cause communication between said processing means and said external means.

57. In a general purpose computer processing data presented by bits, there being a clock defining periodically recurring bit periods, the combination, comprising:

a delay line including means responsive to information bits emerging from the delay line for setting such bits again into the delay line to provide recirculation of such information bits;

a static register having a plurality of stages for temporarily storing operation state codes;

externally accessible decoder means responsive to a plurality of order codes held individually during predeterminable periods in said register and providing code distinguishing output signals, one signal per order code;

circuit means for temporarily connecting said register to said delay line to receive therefrom a new order code and to discharge thereto an order code previously held by the static register, said delay line holding a plurality of codes in like format; and signal means responsive to other codes when held in said static register to modify the recirculation of information in said delay line in accordance with the content of the delay line as serially presented for recirculation when said circuit means is disabled.

58. In a general purpose computer, the combination, comprising:

processing means including means for performing arithmetic operation by serially combining strings of bits, such processing means further including overflow responding means participating in said arithmetic operations for carry and borrow operations;

a temporary storage means for holding at least one of said string of bits processed by said processing means;

external switching means including addressably switching state monitoring means interrogated by said processing means; and circuit means for transferring the result of the switching state interrogation serially and in steps to said overflow condition responding means.

59. In a general purpose computer for processing data represented by bits, there being a clock defining periodically recurring bit periods, the combination, comprising:

a delay line including means for receiving individual data bits for passage into the delay line, one bit each during a bit period, and including additional means responsive to the emergence of such bit after having travelled through the delay line for a duration that is a fixed integral multiple of bit periods;

first circuit means connected to said delay line to establish a recirculating register by individually setting bits which emerged from the delay line back into it, thereby establishing a circulating period for such bit;

a static register having $n$ stages for storing an order code defined by $n$ bits;

second circuit means modifying the operation of said first circuit means for temporarily coupling said static register to said register for exchanging the order codes held individually therein;

a plurality of externally operable switching means;

third circuit means responsive to the switching state of said switches and further responsive to testing signals resulting from particular test order codes when held in said static register, there being one such code per distinguishable switching means;

fourth circuit means for monitoring the response of said third circuit means to each testing signal as dependent upon the switch state of the respectively associated switching means; and fifth circuit means responsive to the content of said monitoring means for modifying the operation of said first circuit means in a manner characteristically determined by order codes held in said delay line at the time a test order code is in said register.

60. In a general purpose computer processing data represented by bits, there being a clock defining periodically recurring bit periods, the combination, comprising:

a memory for storing a plurality of data including order codes and numbers;

a delay line including means to receive individual data bits for passage into the delay line, one bit each during a bit period, and to be responsive to the emergence of such bit after having travelled through the delay line for a duration that is a fixed integral multiple of bit periods;

first circuit means connected to said delay line to establish a recirculating register by individually setting bits which emerged from the delay line back into it, thereby establishing a circulating period for each bit, there being a plurality of order code bit combinations that are recirculated in said delay line;

a static register for storing an order code, there being circuit means for exchanging the order code for another one held in said delay line;

second circuit means responsive to a plurality of particular codes when in said register, to combine two strings of bits in accordance with a serial-by-bit arithmetic operation, at least one of said strings of bits being drawn from said emerging bit responsive means of said delay line, the other string, if any, being derived from said memory;

third circuit means responsive to overflow conditions of said second circuit means including carry and borrow bits; and control means responsive to said overflow conditions at the end of an arithmetic operation for controlling the exchange of order code sequences as held in said delay line, for other order sequences held in said memory.

61. In a general purpose computer processing data represented by bits, there being a clock defining periodically recurring bit periods, the combination, comprising:

a first and second delay line, each including means to load individual data bits into the respective delay line, one each for a bit period and to be responsive to the emergence of said bit;

first and second circuit means respectively coupled to said first and second delay lines to recirculate a bit by loading it back into the line from which it emerged;

third and fourth circuit means, said third circuit means controlling the setting of a bit that emerged from said first delay line, into said second delay line, said fourth circuit means controlling the setting of a bit that emerged from said second delay line, into said first delay line;

first control means for enabling said third circuit means for a plurality of separated bit periods thereby concurrently disabling said first circuit means, while maintaining said first circuit means enabled for bit periods interleaved in said bit periods of said plurality;

second control means for enabling said fourth circuit means for a like plurality of separated bit periods thereby concurrently disabling said second circuit means, while maintaining said second circuit means enabled for bit periods interleaved in said latter plurality of bit periods; and means for selectively enabling said first and said second control means during different periods of time of similar duration.

62. In a general purpose computer for processing data represented by bits, there being a clock defining periodically recurring bit periods, the combination, comprising:

a short and long delay line each including means for receiving individual data bits for passage into the delay line, one bit each during a bit period and including additional means responsive to the emergence of such bit after having travelled through the delay line for a duration that is a fixed integral multiple of bit periods;

circuit means for each of said delay lines to respectively establish recirculating registers by individually setting bits which emerged from a delay line back into it, thereby establishing respectively short and long circulating periods for bits;

a static register having $n$ stages for storing an order code having $n$ bits;

order shifting control circuit means for coupling said static register to said short delay line for alternating bit periods and during periods of time each equal to half a circulating period to change the content of said static register during such periods of time, thereby concurrently disabling the circuit means causing bit circulation in the short delay line only for those alternating bit periods while maintaining this circuit means enabled during the bit periods in between; and circuit means responsive to a particular class of orders when held in said static register, for coupling the output side of one of said delay lines to the input side of the respective other delay line for a period equal to half a circulating period of said short delay line succeeding the period of placing one of said orders of said particular class into said static register, and for alternating bit periods, to copy a plurality of bits from one delay line into the other.

63. In a general purpose computer for processing data represented by bits, there being a clock defining periodically recurring bit periods, the combination, comprising:

a short and a long delay line each including means for receiving individual data bits for passage into the delay line, one bit each during a bit period and including additional means responsive to the emergence of such bit after having travelled through the delay line for a duration that is a fixed integral multiple of bit periods;

circuit means for each of said delay lines to respectively establish recirculating registers by individually setting bits which emerged from a delay line back into it, thereby establishing respectively short and long circulating periods for bits;

a static register having $n$ stages for storing an order code having $n$ bits;

order shifting control circuit means for coupling said static register to said short delay line for alternating bit period and during periods of time each equal to half a circulating period to change the content of said static register during such periods of time, thereby concurrently disabling the circuit means causing bit circulation in the short delay line only for those alternating bit periods while maintaining this circuit means enabled during the bit periods in between; and circuit means, responsive to a particular class of orders when held in said static register, for coupling the output side of one of said delay lines to the input side of the respective other delay line for a period equal to one full circulating period of said short delay line succeeding the period of placing one of said orders of said particular class into said static register, and for alternating bit periods to copy a plurality of bits from one delay line into the other.

References Cited

UNITED STATES PATENTS

| | | | |
|---|---|---|---|
| 3,278,907 | 10/1966 | Barry et al. | 340—172.5 |
| 3,231,867 | 1/1966 | Bartlett et al. | 340—172.5 |
| 3,223,981 | 12/1965 | Fischer | 340—172.5 |
| 3,156,815 | 11/1964 | Smeltzer | 235—164 |
| 3,145,369 | 8/1964 | Perschy | 340—173 |
| 3,094,609 | 6/1963 | Weiss | 235—157 |
| 2,978,680 | 4/1961 | Schulte | 340—172.5 |
| 2,876,352 | 3/1959 | Schneider | 250—27 |

ROBERT C. BAILEY, *Primary Examiner.*

GARETH D. SHAW, *Assistant Examiner.*